(12) United States Patent
Kumar et al.

(10) Patent No.: US 12,346,812 B2
(45) Date of Patent: Jul. 1, 2025

(54) QUERY OPTIMIZATION FOR DEEP CONVOLUTIONAL NEURAL NETWORK INFERENCES

(71) Applicant: The Regents of the University of California, Oakland, CA (US)

(72) Inventors: Arun Kumar, San Diego, CA (US); Supun Nakandala, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 313 days.

(21) Appl. No.: 17/784,620

(22) PCT Filed: Feb. 5, 2021

(86) PCT No.: PCT/US2021/016958
§ 371 (c)(1),
(2) Date: Jun. 10, 2022

(87) PCT Pub. No.: WO2021/159023
PCT Pub. Date: Aug. 12, 2021

(65) Prior Publication Data
US 2023/0042004 A1 Feb. 9, 2023

Related U.S. Application Data

(60) Provisional application No. 62/971,862, filed on Feb. 7, 2020.

(51) Int. Cl.
*G06N 3/08* (2023.01)
*G06F 16/2453* (2019.01)
(Continued)

(52) U.S. Cl.
CPC .......... *G06N 3/08* (2013.01); *G06F 16/24535* (2019.01); *G06V 10/751* (2022.01);
(Continued)

(58) Field of Classification Search
CPC .... G06V 10/751; G06V 10/759; G06V 10/82; G06V 20/41
See application file for complete search history.

(56) References Cited

U.S. PATENT DOCUMENTS 9,721,203 B1 *  8/2017  Young ................. G06N 3/0464
11,816,185 B1 * 11/2023  Roth .................. G06V 10/7753
(Continued)

OTHER PUBLICATIONS

Ordookhanians et al. "Demonstration of Krypton: optimized CNN inference for occlusion-based deep CNN explanations", Proceedings of the VLDB Endowment, vol. 12, Issue 12 pp. 1894-1897, Aug. 1, 2019 (Year: 2019).*
(Continued)

*Primary Examiner* — Chan S Park
*Assistant Examiner* — Sebastian-Sy Vuchi Ngo
(74) *Attorney, Agent, or Firm* — FisherBroyles, LLP

(57) ABSTRACT

A method may include generating views materializing tensors generated by a convolutional neural network operating on an image. Determining the outputs of the convolutional neural network operating on the image with a patch occluding various portions of the image. The outputs being determined by generating queries on the views that performs, based at least on the changes associated with occluding different portions of the image, partial re-computations of the views. A heatmap may be generated based on the outputs of the convolutional neural network. The heatmap may indicate the quantities to which the different portions of the image contribute to the output of the convolutional neural network operating on the image. Related systems and articles of manufacture, including computer program products, are also provided.

18 Claims, 37 Drawing Sheets

(51) Int. Cl.
G06V 10/75 (2022.01)
G06V 10/82 (2022.01)
G06V 20/40 (2022.01)

(52) U.S. Cl.
CPC ............ *G06V 10/759* (2022.01); *G06V 10/82* (2022.01); *G06V 20/41* (2022.01)

(56) References Cited

U.S. PATENT DOCUMENTS

| | | | |
|---|---|---|---|
| 2018/0025257 A1* | 1/2018 | van den Oord | G06F 18/2113 375/240.14 |
| 2019/0156274 A1 | 5/2019 | Fisher et al. | |
| 2021/0135625 A1* | 5/2021 | Deng | G06V 10/774 |
| 2021/0158096 A1* | 5/2021 | Sinha | G06N 3/045 |
| 2021/0397170 A1* | 12/2021 | Zhou | H01L 22/20 |
| 2022/0391621 A1* | 12/2022 | Chen | G06V 20/52 |
| 2023/0048386 A1* | 2/2023 | Wang | G06T 7/0004 |

OTHER PUBLICATIONS

Muneeb ul Hassan, "VGG16—Convolutional Network for Classification and Detection", Nov. 20, 2018, Retrieved from Internet at < https://neurohive.io/en/popular-networks/vgg16/ > (Year: 2018).*

"Cafee Model Zoo." (Available at http://caffe.berkeleyvision.org/model_zoo.html).

"Torch Vison Models." (Available at http://web.archive.org/web/20211026122306/https://github.com/pytorch/vision/tree/master/torchvision/models).

Arbabzadah, F. et al. "Identifying individual facial expressions by deconstructing a neural network." In German Conference on Pattern Recognition, arXiv preprint arXiv:1606.07285, 2016.

Buckler, M. et al. "EVA2: Exploiting Temporal Redundancy in Live Computer Vision." arXiv preprint arXiv:1803.06312, 2018.

Cavigelli, L. et al. "CBinfer: Change-Based Inference for Convolutional Neural Networks on Video Data." In Proceedings of the 11th International Conference on Distributed Smart Cameras, pp. 1-8. ACM, 2017.

Chetlur, S. et al. "cuDNN: Efficient Primitives for Deep Learning." arXiv preprint arXiv:1410.0759, 2014.

Chirkova, R. et al., "Materialized views," Foundations and Trends in Databases, 4(4):295-405, 2012.

Deng, J. et al. "ImageNet: A Large-Scale Hierarchical Image Database." In Computer Vision and Pattern Recognition, 2009. CVPR 2009. WE Conference on, pp. 248-255. Ieee, 2009.

De Vries, S.E.J. et al. "The projective field of a retinal amacrine cell." Journal of Neuroscience, 31(23):8595-8604, 2011.

Garofalakis, M.N. et al. "Approximate query processing: Taming the terabytes." In VLDB, pp. 343-352, 2001.

Goodfellow, I. et al. "Deep learning, vol. 1." MIT press Cambridge, 2016.

Gupta, A. et al. "Maintenance of materialized views: Problems, techniques, and applications." IEEE Data Eng. Bull., 18(2):3-18, 1995.

He, K. et al., "Deep residual learning for image recognition," In Proceedings of the IEEE Conference on Computer Vision and Pattern Recognition, pp. 770-778, 2016.

He, Y. "Channel Pruning for Accelerating Very Deep Neural Networks." Proceedings of the IEEE international conference on computer vision. 2017.

Islam, M.T. et al. "Abnormality detection and localization in chest x-rays using deep convolutional neural networks." arXiv preprint arXiv:1705.09850, 2017.

Jung, K.-H. et al. "Deep learning for medical image analysis: Applications to computed tomography and magnetic resonance imaging." Hanyang Medical Reviews, 37(2):61-70, 2017.

Kang, D. et al. "NoScope: Optimizing Neural Network Queries over Video at Scale." Proceedings of the VLDB Endowment, 10(11):1586-1597, 2017.

Kermany, D.S. et al. "Identifying medical diagnoses and treatable diseases by image-based deep learning." Cell, 172(5):1122-1131, 2018.

Kingma, D. P. et al., "Adam: A method for stochastic optimization." arXiv preprint arXiv:1412.6980, 2014.

Le, W. et al. "Scalable Multi-Query Optimization for SPARQL." In Data Engineering (ICDE), 2012 IEEE 28th International Conference on, pp. 666-677. IEEE, 2012.

Lee, K.J. "AI device for detechting diabetic retinopathy earns swift FDA approval." American Academy of Opthamology (Available at https://www.aao.org/headline/first-ai-screen-diabetic-retinopathy-approved-by-f) Apr. 12, 2018.

Levy, A.L. et al. "Answering queries using views." In Proceedings of the fourteenth ACM SIGACT-SIGMOD-SIGART symposium on Principles of database systems, pp. 95-104. ACM, 1995.

Luo, W. et al. "Understanding the effective receptive field in deep convolutional neural networks." In Advances in neural information processing systems, pp. 4898-4906, 2016.

Marko, K. "Radiologists are often in short supply and overworked—deep learning to the rescue." (Available at https://diginomica.com/radiologists-often-short-supply-overworked-deep-learning-rescue). Dec. 19, 2017.

Miller, T. "Explanation in artificial intelligence: Insights from the social sciences." arXiv preprint arXiv:1706.07269, 2017.

Mohanty, S.P. et al. "Using deep learning for image-based plant disease detection." Frontiers in plant science, 7:1419, 2016.

Moons, B. et al. "A 0.3-2.6 tops/w precision-scalable processor for real-time large-scale convnets." In VLSI Circuits (VLSI-Circuits), 2016 IEEE Symposium on, pp. 1-2. IEEE, 2016.

Motamedi, M. et al. "Resource-Scalable CNN Synthesis for IoT Applications." arXiv preprint arXiv:1901.00738, 2018.

Nikolic, M. et al. "Linview: incremental view maintenance for complex analytical queries." In Proceedings of the 2014 ACM SIGMOD international conference on Management of data, pp. 253-264. ACM, 2014.

Ribeiro, M.T. et al. "Why Should I Trust You? Explaining the Predictions of Any Classifier." NAACL HLT 2016 (2016): 97.

Russakovsky, O. et al. "Imagenet large scale visual recognition challenge." International Journal of Computer Vision, 115(3):211-252, 2015.

Sellis, T.K. "Multiple-Query Optimization." ACM Transactions on Database Systems (TODS), 13(1):23-52, 1988.

Selvaraju, R.R. et al. "Grad-cam: Visual explanations from deep networks via gradient-based localization." In 2017 IEEE International Conference on Computer Vision (ICCV), pp. 618-626. IEEE, 2017.

Simonyan, K. et al. "Deep inside convolutional networks: Visualising image classification models and saliency maps." arXiv preprint arXiv:1312.6034, 2013.

Simonyan, K. et al., "Very deep convolutional networks for large-scale image recognition." arXiv preprint arXiv:1409.1556, 2014.

Sundararajan, M. et al. "Axiomatic attribution for deep networks." arXiv preprint arXiv:1703.01365, 2017.

Szegedy, C. et al. "Rethinking the inception architecture for computer vision." In Proceedings of the IEEE Conference on Computer Vision and Pattern Recognition, pp. 2818-2826, 2016.

Voigt, P. et al. "The EU General Data Protection Regulation (GDPR), vol. 18." Springer, 2017.

Wang, Y. et al. "Deep neural networks are more accurate than humans at detecting sexual orientation from facial images." Journal of personality and social psychology, 114(2):246, 2018.

Wang, Z. et al. "Image quality assessment: from error visibility to structural similarity." IEEE transactions on image processing, 13(4):600-612, 2004.

Zeiler, M.D. et al. "Visualizing and understanding convolutional networks." In European conference on computer vision, pp. 818-833. Springer, 2014.

Zhao, W. et al. "Incremental view maintenance over array data." In Proceedings of the 2017 ACM International Conference on Management of Data, pp. 139-154. ACM, 2017.

(56) References Cited

OTHER PUBLICATIONS

Zintgraf, L. M. et al. "Visualizing deep neural network decisions: Prediction difference analysis." arXiv preprint arXiv:1702.04595, 2017.

* cited by examiner

|  | Full Inference | Inc. Inference (speedup) |
|---|---|---|
| Theoretical TFLOPs | 53.4 | 9.3 (5.8X) |
| CPU Time | 42.1 min | 9.4 min (4.4X) |
| GPU Time | 42 s | 41 s (1.0X) |

FIG. 27

QUERY OPTIMIZATION FOR DEEP CONVOLUTIONAL NEURAL NETWORK INFERENCES

RELATED APPLICATION

This application is a national stage entry of Patent Cooperation Treaty Application No. PCT/US2021/016958filed Feb. 5, 2021, entitled "QUERY OPTIMIZATION FOR DEEP CONVOLUTIONAL NEURAL NETWORK INFERENCES," which claims priority to U.S. Provisional Application No. 62/971,862, entitled "SYSTEM AND METHOD FOR FASTER DEEP CONVOLUTION NEURAL NETWORK EXPLANATIONS" and filed on Feb. 7, 2020, the disclosure of which is incorporated herein by reference in its entirety.

STATEMENT OF GOVERNMENT SPONSORSHIP

This invention was made with government support under DK114945 awarded by the National Institutes of Health. The government has certain rights in the invention.

TECHNICAL FIELD

The subject matter described herein relates generally to machine learning and more specifically to the optimization of convolutional neural network inferences.

BACKGROUND

Machine learning models may be trained to perform a variety of cognitive tasks including, for example, object identification, natural language processing, information retrieval, and speech recognition. A deep learning model such as, for example, a neural network, may be trained to perform a classification task by at least assigning input samples to one or more categories. The deep learning model may be trained to perform the classification task based on training data that has been labeled in accordance with the known category membership of each sample included in the training data. Alternatively and/or additionally, the deep learning model may be trained to perform a regression task. The regression task may require the deep learning model to predict, based at least on variations in one or more independent variables, corresponding changes in one or more dependent variables.

SUMMARY

Systems, methods, and articles of manufacture, including computer program products, are provided for query optimized occlusion-based explanations (OBE). In some example embodiments, there is provided a system that includes at least one processor and at least one memory. The at least one memory may include program code that provides operations when executed by the at least one processor. The operations may include: generating one or more views materializing one or more tensors generated by a convolutional neural network operating on an image; determining a first output of the convolutional neural network operating on the image with a patch occluding a first portion of the image, the first output being determined by generating a first query on the one or more views, the first query performing, based at least on a first change associated with occluding the first portion of the image, a first partial re-computation of the one or more views; and generating, based at least on the first output, a first heatmap indicating a first quantity to which the first portion of the image contributes to an output of the convolutional neural network operating on the image.

In some variations, one or more features disclosed herein including the following features can optionally be included in any feasible combination. The operations may further include: determining a second output of the convolutional neural network operating on the image with the patch occluding a second portion of the image, the second output being determined by generating a second query on the one or more views, the second query performing, based at least on a second change associated with occluding the second portion of the image, a second partial re-computation of the one or more views; and generating, based at least on the second output, the first heatmap to further indicate a second quantity to which the second portion of the image contributes to the output of the convolutional neural network operating on the image.

In some variations, the performing of the first query and the second query may be batched.

In some variations, the first change may correspond to a size of the patch occluding the first portion of the image, a size of a filter kernel associated with the convolutional neural network, and a size of a stride associated with the filter kernel.

In some variations, the first partial re-computation may be performed by at least propagating the first change through successive layers of the convolutional neural network.

In some variations, the operations may further include: limiting, to a threshold quantity, a quantity of elements each layer of the convolutional neural network affected by the propagation of the first change, the limiting generating an approximation of an output at each layer of the convolutional neural network.

In some variations, the operations may further include: generating, based on one or more sample images, an approximate heatmap and an exact heatmap at a plurality of different threshold values; and determining, based at least on an index measuring a difference between the approximate heatmap and the exact heatmap, the threshold value.

In some variations, the operations may further include: generating, at a first stride size, a second heatmap; identifying, based at least on the second heatmap, one or more regions of the image exhibiting a largest contribution to the output of the convolutional neural network operating on the image, a quantity of the one or more regions being proportional to a threshold fraction of the image; and determining, at a second stride size, the first output, the second stride size being smaller than the first stride size such that the first heatmap generated based on the first output has a higher resolution than the second heatmap.

In some variations, the threshold fraction is specified by one or more user inputs, and wherein the first stride size is determined based on a target speedup specified by the one or more user inputs.

In some variations, the first partial re-computation of the one or more views may be limited to the first change associated with occluding the first portion of the image.

In another aspect, there is provided a method for query optimized occlusion-based explanations (OBE). The method may include: generating one or more views materializing one or more tensors generated by a convolutional neural network operating on an image; determining a first output of the convolutional neural network operating on the image with a patch occluding a first portion of the image, the first output being determined by generating a first query on the one or more views, the first query performing, based at least on a first change associated with occluding the first portion of the image, a first partial re-computation of the one or more views; and generating, based at least on the first output, a first heatmap indicating a first quantity to which the first portion of the image contributes to an output of the convolutional neural network operating on the image.

In some variations, one or more features disclosed herein including the following features can optionally be included in any feasible combination. The method may further include: determining a second output of the convolutional neural network operating on the image with the patch occluding a second portion of the image, the second output being determined by generating a second query on the one or more views, the second query performing, based at least on a second change associated with occluding the second portion of the image, a second partial re-computation of the one or more views; and generating, based at least on the second output, the first heatmap to further indicate a second quantity to which the second portion of the image contributes to the output of the convolutional neural network operating on the image.

In some variations, the performing of the first query and the second query may be batched.

In some variations, the first change may correspond to a size of the patch occluding the first portion of the image, a size of a filter kernel associated with the convolutional neural network, and a size of a stride associated with the filter kernel.

In some variations, the first partial re-computation may be performed by at least propagating the first change through successive layers of the convolutional neural network.

In some variations, the method may further include: limiting, to a threshold quantity, a quantity of elements each layer of the convolutional neural network affected by the propagation of the first change, the limiting generating an approximation of an output at each layer of the convolutional neural network.

In some variations, the method may further include: generating, based on one or more sample images, an approximate heatmap and an exact heatmap at a plurality of different threshold values; and determining, based at least on an index measuring a difference between the approximate heatmap and the exact heatmap, the threshold value.

In some variations, the method may further include: generating, at a first stride size, a second heatmap; identifying, based at least on the second heatmap, one or more regions of the image exhibiting a largest contribution to the output of the convolutional neural network operating on the image, a quantity of the one or more regions being proportional to a threshold fraction of the image; and determining, at a second stride size, the first output, the second stride size being smaller than the first stride size such that the first heatmap generated based on the first output has a higher resolution than the second heatmap.

In some variations, the first partial re-computation of the one or more views may be limited to the first change associated with occluding the first portion of the image.

In another aspect, there is provided a computer program product that includes a non-transitory computer readable medium storing instructions. The instructions may cause operations when executed by at least one data processor. The operations may include: generating one or more views materializing one or more tensors generated by a convolutional neural network operating on an image; determining an output of the convolutional neural network operating on the image with a patch occluding a portion of the image, the output being determined by generating a query on the one or more views, the query performing, based at least on a change associated with occluding the portion of the image, a partial re-computation of the one or more views; and generating, based at least on the output, a heatmap indicating a quantity to which the portion of the image contributes to an output of the convolutional neural network operating on the image.

Systems, methods, and articles of manufacture, including computer program products, are provided for query optimized object recognition in videos (ORV). In some example embodiments, there is provided a system that includes at least one processor and at least one memory. The at least one memory may include program code that provides operations when executed by the at least one processor. The operations may include: generating one or more views materializing one or more tensors generated by a convolutional neural network operating on a frame of a video; determining a first output of the convolutional neural network operating on a first subsequent frame of the video to identify an object in the video, the output being determined by at least generating a first query on the one or more views, the first query performing, based at least on a first change in the first subsequent frame, a first partial re-computation of the one or more views; and determining, based at least on the output of the convolutional neural network, a label identifying the object in the video.

In some variations, one or more features disclosed herein including the following features can optionally be included in any feasible combination. The operations may further include: processing a second subsequent frame of the video by at least generating a second query on the one or more views, the second query performing, based at least on a second change in the second subsequent frame, a second partial re-computation of the one or more views.

In some variations, the performing of the first query and the second query may be batched.

In some variations, the operations may further include: comparing the base frame and the first subsequent frame to identify one or more portions of the first subsequent frame that differ from the base frame, the one or more identified portions including at least a threshold quantity of pixels; and In some variations, the operations may further include: in response to the changed region exceeding a threshold fraction of a size of the base frame, setting the first subsequent frame as the base frame.

In another aspect, there is provided a method for query optimized object recognition in videos (ORV). The method may include: generating one or more views materializing one or more tensors generated by a convolutional neural network operating on a frame of a video; determining a first output of the convolutional neural network operating on a first subsequent frame of the video to identify an object in the video, the output being determined by at least generating a first query on the one or more views, the first query performing, based at least on a first change in the first subsequent frame, a first partial re-computation of the one or more views; and determining, based at least on the output of the convolutional neural network, a label identifying the object in the video.

In some variations, one or more features disclosed herein including the following features can optionally be included in any feasible combination. The operations may further include: processing a second subsequent frame of the video by at least generating a second query on the one or more views, the second query performing, based at least on a second change in the second subsequent frame, a second partial re-computation of the one or more views.

In some variations, the performing of the first query and the second query may be batched.

In some variations, the operations may further include: comparing the base frame and the first subsequent frame to identify one or more portions of the first subsequent frame that differ from the base frame, the one or more identified portions including at least a threshold quantity of pixels; and In some variations, the operations may further include: in response to the changed region exceeding a threshold fraction of a size of the base frame, setting the first subsequent frame as the base frame.

In another aspect, there is provided a computer program product that includes a non-transitory computer readable medium storing instructions. The instructions may cause operations when executed by at least one data processor. The operations may include: generating one or more views materializing one or more tensors generated by a convolutional neural network operating on a frame of a video; determining an output of the convolutional neural network operating on a subsequent frame of the video to identify an object in the video, the output being determined by at least generating a query on the one or more views, the query performing, based at least on a change in the first subsequent frame, a partial re-computation of the one or more views; and determining, based at least on the output of the convolutional neural network, a label identifying the object in the video.

In another aspect, there is provided an apparatus for query optimized occlusion-based explanations (OBE). The apparatus may include: means for generating one or more views materializing one or more tensors generated by a convolutional neural network operating on an image; means for determining an output of the convolutional neural network operating on the image with a patch occluding a portion of the image, the output being determined by generating a query on the one or more views, the query performing, based at least on a change associated with occluding the portion of the image, a partial re-computation of the one or more views; and means for generating, based at least on the output, a heatmap indicating a quantity to which the portion of the image contributes to an output of the convolutional neural network operating on the image.

In another aspect, there is provided an apparatus for object recognition in videos (ORV). The apparatus may include: means for generating one or more views materializing one or more tensors generated by a convolutional neural network operating on a frame of a video; means for determining an output of the convolutional neural network operating on a subsequent frame of the video to identify an object in the video, the output being determined by at least generating a query on the one or more views, the query performing, based at least on a change in the first subsequent frame, a partial re-computation of the one or more views; and means for determining, based at least on the output of the convolutional neural network, a label identifying the object in the video.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein.

Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 27 depicts a table illustrating the runtimes and theoretical floating point operation (FLOP) counts for full inference and incremental inference for running object recognition for videos (ORV), in accordance with some example embodiments;

When practical, similar reference numbers denote similar structures, features, or elements.

DETAILED DESCRIPTION

Figure 1:
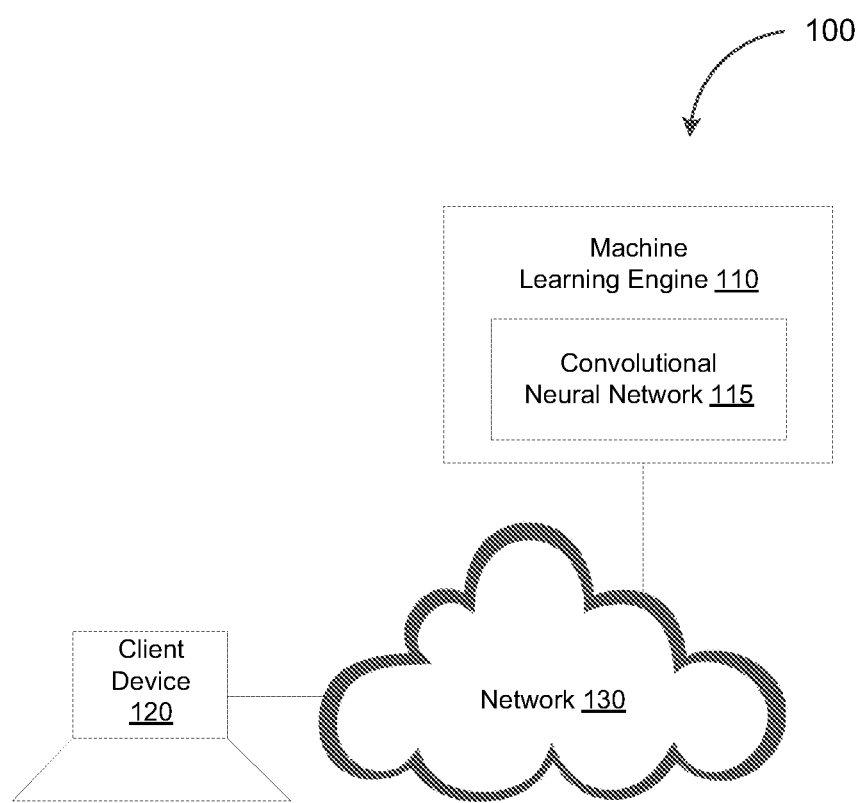
FIG. 1 depicts a system diagram illustrating an example of a machine learning system, in accordance with some example embodiments.

Deep machine learning may offer state-of-the-art accuracy for many analytical tasks. For example, convolutional neural networks (CNNs), a type of deep machine learning model, may be especially adept at performing analytical tasks on images, videos, and time series data. Convolutional neural networks may therefore be suitable for a variety of application domains including, for example, healthcare, agriculture, image search and recommendation, species monitoring, security, sociology, and/or the like. However, convolutional neural network inference may consume significant time and computational resource. For instance, inferences performed using a VGG16 (OxfordNet) convolutional neural network requires 15 gigaflops of computations. Moreover, many analytical tasks involving convolutional neural networks require repeated convolutional neural network inferences, amplifying the computational cost and latency. For this reason, the adoption of convolutional neural networks may be especially unwieldy for interactive and/or resource-constrained settings such as mobile, browser, and edge devices. The adoption of convolutional neural networks may also be excessively costly for regular server and cloud settings.

In some example embodiments, a machine learning engine may apply one or more query optimization techniques to reduce the computational cost associated with convolutional neural network inferences. For example, the machine learning engine may perform convolutional neural network inferences as queries that reuse, for each convolutional neural network inference, as much of the results of previous computations as possible. As such, query-based convolutional neural network inferences may be performed for tasks that require repeated convolutional neural network inferences on slightly modified inputs. For instance, query-based convolutional neural network inferences may be performed for the analytical task of occlusion-based explanation (OBE) in which an explanation of a convolutional neural network, such as a heatmap, is generated to identify regions of an input (e.g., an image) responsible for an output (e.g., a label classifying the image) of the convolutional neural network. Alternatively and/or additionally, query-based convolutional neural network inferences may be performed for the analytical task of object recognition in video (ORV) in which a convolutional neural network operates to identify an object over multiple frames of a video.

To perform the task of occlusion-based explanation (OBE), the machine learning engine may perform convolutional neural network inferences on an image with a patch occluding different portions (e.g., pixels) of the image. For example, the machine learning engine may perform a first convolutional neural network inference on the image with a patch occluding a first portion of the image and a second convolutional neural network inference on the image with the patch occluding a second portion of the image. The machine learning engine may further track changes in the output of the convolutional neural network when different portions of the image are occluded with the patch. For instance, occluding the first portion of the image may have more effect on the output of the convolutional neural network than occluding the second portion of the image. Accordingly, the machine learning engine may generate a heatmap having different representations (e.g., colors, symbols, and/or the like) for the first portion of the image and the second portion of the image in order to indicate that the first portion of the image is more (or less) responsible for the output of the convolutional neural network than the second portion of the image. Because the task of occlusion based explanation (OBE) requires multiple convolutional neural network inferences on slightly modified versions of the image, the machine learning model may perform query-based convolutional neural network inferences to minimize the overhead associated with the repeated inferences.

The machine learning engine may, as noted, also perform convolutional neural network inferences to accomplish the task of object recognition in videos (ORV). Machine learning enabled object recognition in videos may be especially popular due to the mass deployment of video cameras in applications such as security surveillance, traffic monitoring, wild animal and livestock tracking, and/or the like. In object recognition in videos, each frame of a video may be treated as an individual image. A convolutional neural network may be trained to process each frame of the video to identify an object appearing in the video. For example, the trained convolutional neural network may perform single object recognition over a fixed-angle camera video feed. As such, the convolutional neural network may perform multiple inferences over largely identical video frames, which is why the machine learning engine may apply query-based convolutional neural network inferences to the task of object recognition in videos (ORV) to minimize the computational overhead associated with the task.

Convolutional neural network inferences are already computationally expensive but tasks such as occlusion based explanation (OBE) and object recognition in videos (ORV) may be especially computationally inefficient by requiring large quantities of redundant re-inference requests on largely identical inputs. For example, performing occlusion based explanation on a single image may require approximately 500,000 re-inference requests and can take hours on graphic processing unit (GPU) even though the input of each re-inference request only differ by a few occluded pixels. Increasing computational hardware in an effort to decrease the latency associated with performing redundant re-inferences may be especially wasteful. As such, in some example embodiments, query-based convolutional neural network inferences aim to accelerate tasks such as occlusion based explanation and object recognition in videos by minimizing computational redundancy.

Database techniques, such as incremental view maintenance (IVM), multi-query optimization (MQO), and approximate query processing (AQP), may be applied to minimize the computational redundancy associated with repeated convolutional neural network inferences. Instead of treating a convolutional neural network as a "blackbox," each layer of the convolutional neural network may be treated as a "query." Akin to how a relational query converts relations to other relations, a convolutional neural network layer may convert tensors (e.g., multidimensional arrays) into other tensors. Tasks such as occlusion based explanation and object recognition in videos may therefore be treated as a set of tensor transformation queries with incrementally updated inputs.

FIG. 1 depicts a system diagram illustrating an example of a machine learning system 100, in accordance with some example embodiments. Referring to FIG. 1, the machine learning system 100 may include a machine learning engine 110 and a client device 120. As shown in FIG. 1, the machine learning engine 110 and the client device 120 may be communicatively coupled via a network 130. The client device 120 may be a computing device such as, for example, a smartphone, a personal computer, a tablet computer, a wearable apparatus, and/or an Internet-of-Things (IoT) appliance. The network 130 may be a wired network and/or a wireless network including, for example, a local area network (LAN), a virtual local area network (VLAN), a wide area network (WAN), a public land mobile network (PLMN), the Internet, and/or the like.

Referring again to FIG. 1, the machine learning engine 110 may include a convolutional neural network 115 trained to perform one or more analytical tasks such as, for example, occlusion-based explanation (OBE), object recognition for videos (ORV), and/or the like. For example, the convolutional neural network 115 may perform the one or more analytical tasks in response to receiving, from the client device 120, a request including one or more inputs. Moreover, the convolutional neural network 115 may process the one or more inputs to generate one or more corresponding outputs, which may be sent to the client device 120. For instance, the one or more inputs from the client device 120 may include a single image for the task of occlusion-based explanation (OBE) or multiple images forming the video frames of a video for the task of object recognition for videos (ORV). For occlusion-based explanation (OBE), the one or more outputs may include a heatmap identifying how much each region of the input image contributes to the output of the convolutional neural network. Alternatively, for object recognition for videos (ORV), the output may include a label identifying the object present in the input video.

Figure 2A:
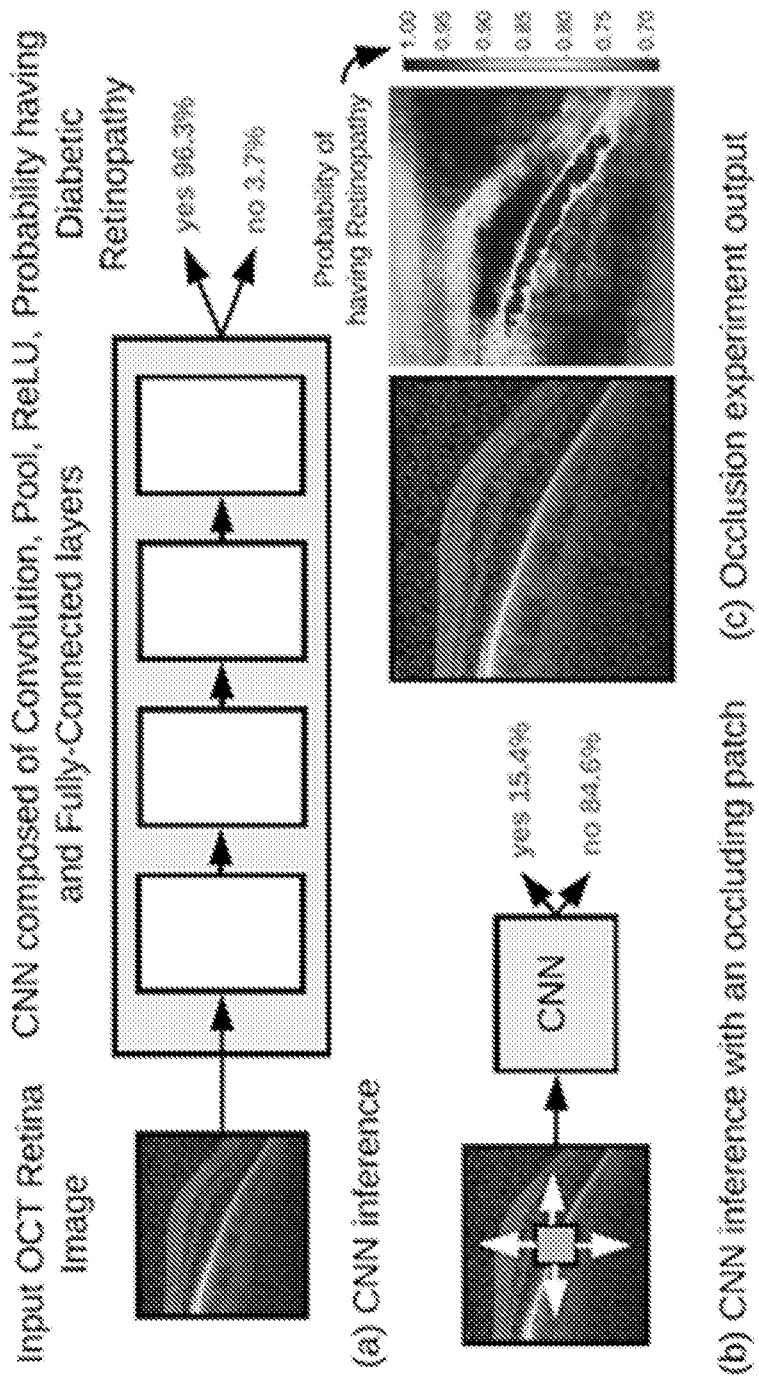
FIG. 2A depicts an example of using a convolutional neural network (CNN) to predict diabetic retinopathy in an optical coherence tomography (OCT) scan, in accordance with some example embodiments.

FIG. 2A depicts an example of using the convolutional neural network 115 to predict diabetic retinopathy in an optical coherence tomography (OCT) scan, in accordance with some example embodiments. Referring to FIG. 2A, in (a) the convolutional neural network 115 may be used to predict diabetic retinopathy in an optical coherence tomography (OCT) scan with (b) showing that occlusion parts of the image changes the prediction probability and (c) showing the heatmap that is produced by moving the occluding patch.

In some example embodiments, the performance of the convolutional neural network 115 performing the task of occlusion-based explanation may be optimized by incremental inferences. For example, the tensors produced by the convolutional neural network 115 may be materialized to form "views." Instead of responding to each re-inference request by rerunning each inference from scratch, each re-inference request may be treated as an incremental view maintenance (IVM) query on the "views" formed by the materialized tensors of the convolutional neural network 115. Computational redundancy may be minimized by rewriting the incremental view maintenance (IVM) queries to reuse the materialized views as much as possible and to re-compute only what is necessary. Such rewrites are non-trivial because they are tied to the complex geometric data flows of the layers of the convolutional neural network 115, which may be formalized to create an algebraic rewrite framework. A "static analysis" routine may be performed to determine beforehand the savings in computational resources. In addition, multiple re-inference requests may be batched to reuse the same materialized views, thus achieving multi-query optimization (MQO) in the form of batched incremental inferences. A graphic processing unit (GPU) optimized kernel may be used for executing these batched incremental inferences.

Where some degradation in the visual quality of the heatmaps generated as a result of occlusion-based explanation (OBE), one or more approximate inference optimizations may be applied to further reduce the runtime associated with the task. These optimizations may build upon the incremental inference optimization to trade off heatmap quality in a user-tunable manner. The first approximate optimization, projective field thresholding, exploits the internal semantics of the convolutional neural network 115. The second approximate optimization, adaptive drill-down, exploits the semantics of the task of occlusion-based explanation (OBE) and the way heatmaps are typically consumed. An intuitive automated parameter tuning technique may further enable users to adapt to these optimizations.

Figure 2B:
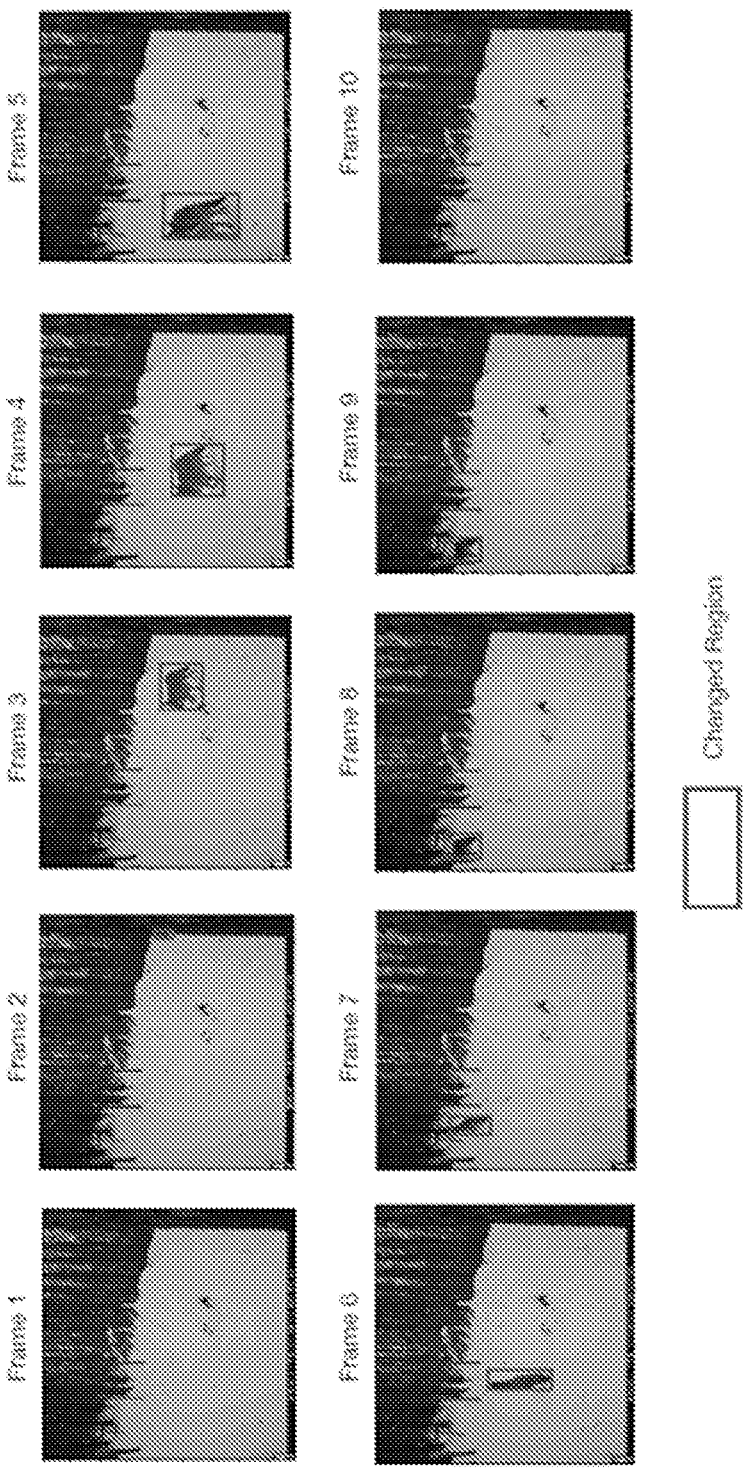
FIG. 2B depicts examples of video frames from a video, in accordance with some example embodiments.

The task of object recognition in videos (ORV) may be similar to the task of occlusion-based explanation (OBE) in that object recognition in videos may also be treated as a sequence of occluded images, with the image being the background of the video and occlusions being generated by a moving object. Because the camera angle is fixed, based on some pixel-wise threshold, it may be reasonable to assume the background to be fixed for a given quantity of time. As such, the task of object recognition in videos (ORV) may be approximated as an extension of occlusion-based explanation (OBE). By taking the bounding box of the occluding object as the occluding patch, the same incremental inference infrastructure developed for occlusion-based explanation may also be used to perform object recognition in videos. For example, FIG. 2B shows sample video frames obtained from a trail camera video that is sampled at a rate of 1 frame per second. The first frame shows the stationary background with subsequent frames showing the arrival of an object (e.g., an animal) into the scene and the corresponding changed region. The convolutional neural network 115 may be trained to identify the object (e.g., the animal) that is present in the video frames.

Figure 3:
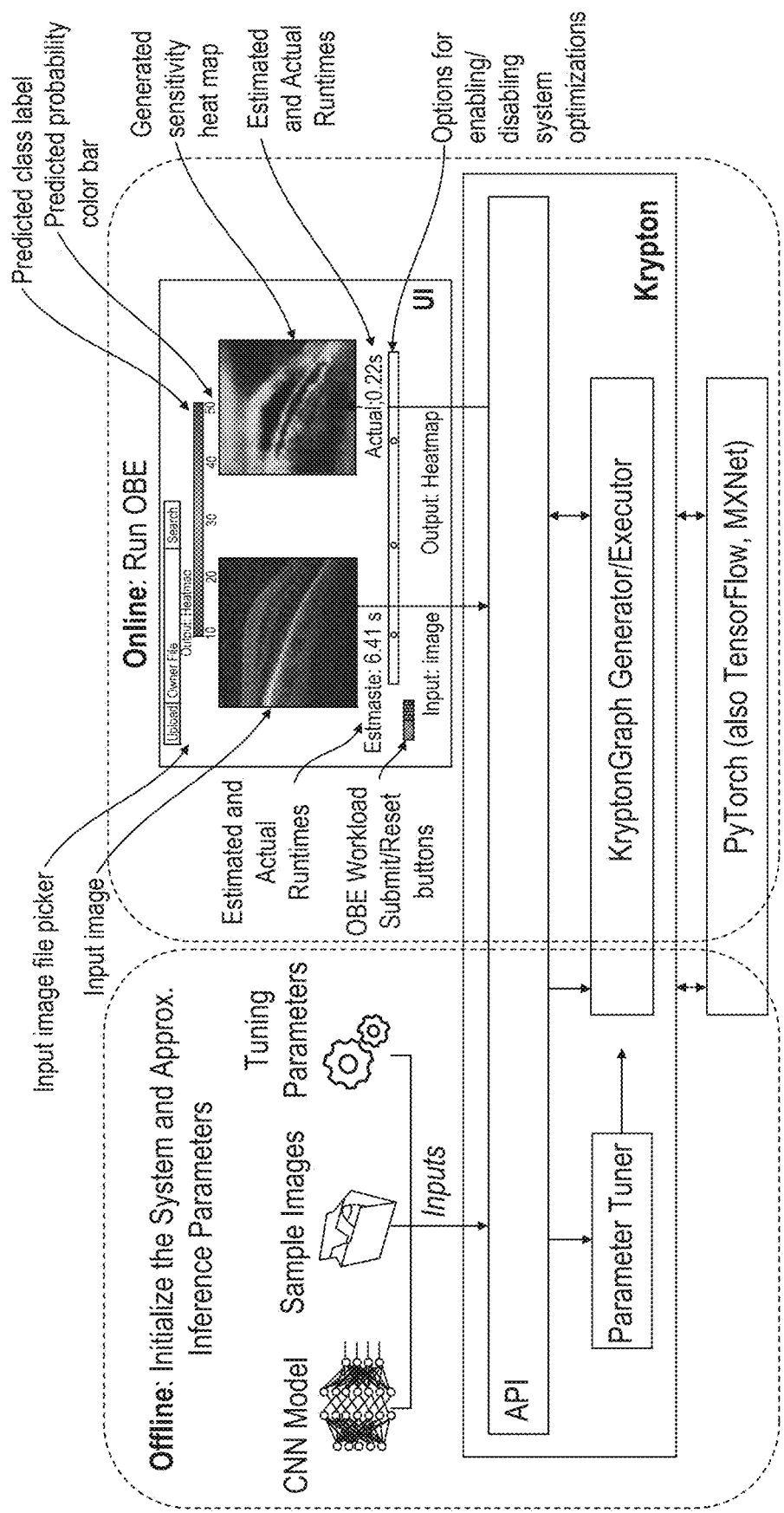
FIG. 3 depicts a schematic diagram illustrating an example of the architecture of a machine learning engine, in accordance with some example embodiments.

FIG. 3 depicts a schematic diagram illustrating an example of the architecture of the machine learning engine 110, in accordance with some example embodiments. The machine learning engine 110 may be associated with an offline setup phase and an online execution phase. It should be appreciated that the object recognition in videos (ORV) task may utilize the online phase but not the offline setup phase. As shown in FIG. 3, the machine learning engine 110 may include an application programming interface (API), a parameter tuner, a graph generator and executor, and a user interface (UI). During the offline setup phase (e.g., for occlusion-based explanation (OBE), the machine learning engine 110 may accept inputs including, for example, an arbitrary convolutional neural network model (e.g., the convolutional neural network 115), sample of images from the occlusion-based explanation application (e.g., a batch of optical coherence tomography (OCT) scans), tuning parameters (e.g., occlusion patch size, stride for the occlusion patch, quality metrics for approximate inference), and/or the like.

By analyzing the convolutional neural network 115, the machine learning engine 115 may generate a graph (e.g., a directed acyclic graph (DAG) of incremental inference operators. The parameter tuner may use the sample of images and parameters to tune approximate inference subjected to user defined quality metrics. During the online phase, a user at the client device 120 may provide, using the user interface, an input image for running occlusion-based explanation (OBE) to the machine learning engine 110. After executing the occlusion-based explanation (or the object recognition in videos) using the graph executor, the machine learning engine 110 may return a heatmap identifying regions of the input image responsible for the output of the convolutional neural network 115 (or a predicted class label for the object in the video).

The problem of occlusion based explanation (OBE) and the corresponding assumptions are stated as followed, which also formalizes the dataflow of the layers of a convolutional neural network such as the convolutional neural network 115. Table 1 below includes the relevant notation.

TABLE 1

| Symbol | Meaning |
| --- | --- |
| F | Given deep CNN; input is an image tensor; output is a probability distribution over class labels |
| L | Class label predicted by f for the original image $I_{img}$ |
| $T_{:l}$ | Tensor transformation function of layer l of the given CNN f |
| P | Occlusion patch in RGB format |
| $S_P$ | Occlusion patch striding amount |
| G | Set of occlusion patch superimposition positions on $I_{img}$ in (x,y) format |
| M | Heatmap produced by the OBE workload |
| $H_M, W_M$ | Height and width of M |
| $\circ_{(x,y)}$ | Superimposition operator. A $\circ_{(x,y)}$ B, superimposes B on top of A starting at (x, y) position |
| $I_{:l}$ ($I_{:img}$) | Input tensor of layer l (Input Image) |
| $O_{:l}$ | Output tensor of layer l |
| $C_{I:l}, H_{I:l}, W_{I:l}$ | Depth, height, and width of input of layer l |
| $C_{O:l}, H_{O:l}, W_{O:l}$ | Depth, height, and width of output of layer l |
| $K_{conv:l}$ | Convolution filter kernels of layer l |
| $B_{conv:l}$ | Convolution bias value vector of layer l |
| $K_{pool:l}$ | Pooling filter kernel of layer l |
| $H_{K:l}, W_{K:l}$ | Height and width of filter kernel of layer l |
| $S_{:l}; S_{x:l}, S_{y:l}$ | Filter kernel striding amounts of layer l; $S_{:l}$ = ($S_{x:l}, S_{y:l}$), strides along width and height dimensions |
| $P_{:l}; P_{x:l}, P_{y:l}$ | Padding amounts of layer l; $P_{:l}$ = ($P_{x:l}, P_{y:l}$), padding along width and height dimensions |

For a convolutional neural network f with a sequence (or directed acyclic graph (DAG)) of layers l, each of which has a tensor transformation function $T_{:l}$, an image $I_{img}$ may be given for which the occlusion-based explanation (OBE) is desired with the class label L predicted by f on $I_{img}$, an occlusion patch P in RGB format, and occlusion patch stride $S_P$. A set of patch positions G may be constructed either automatically or manually with a visual interface interactively. The occlusion-based explanation workload may include producing a 2-D heatmap M in which each value corresponds to a position in G and has the predicted probability for label L by the convolutional neural network f on the occluded image $I'_{x,y:img}$ (i.e., superimpose occlusion patch on image) or zero otherwise. More precisely, the occlusion-based explanation workload may be expressed by the following logical statements:

$$W_M = \lfloor (\text{width}(I_{img}) - \text{width}(P) + 1)/S_P \rfloor \quad (1)$$

$$H_M = \lfloor (\text{height}(I_{:img}) - \text{height}(P) + 1)/S_P \rfloor \tag{2}$$

$$M \in \mathbb{R}^{H_M \times W_M} \tag{3}$$

$$\forall (x,y) \in G: \tag{4}$$

$$I'_{x,y:img} \leftarrow I_{img} \circ_{(x,y)} P \tag{5}$$

$$M[x,y] \leftarrow f(I'_{x,y:img})[L] \tag{6}$$

Statements (1) and (2) calculate the dimensions of the heatmap M. Statement (5) superimposes P on $I_{:img}$ with its top left corner placed on the (x,y) location of $I_{:img}$. Statement (6) calculates the output value at the (x, y) location by performing CNN inference for $I'_{x,y:img}$ using f and picks the prediction probability of L. Statements (5) and (6) may be performed independently for every occlusion patch position in G. In the non-interactive mode, G may be initialized to $G = [0, H_M) \times [0, W_M)$. Intuitively, this represents the set of all possible occlusion patch positions on $I_{:img}$, which yields a full heatmap. In the interactive mode, the user may manually place the occlusion patch only at a few locations at a time, yielding partial heatmaps.

A convolutional neural network, such as the convolutional neural network 115, may be organized as layers of various types, each of which transforming one tensor (e.g., a multidimensional array that is typically 3-D) into another tensor. The convolution layer may use image filters from graphics to extract features, but with parametric filter weights (learned during training). The pooling layer may subsample features in a spatial-aware manner, the batch-normalization layer may normalize the output tensor, the non-linearity layer may apply an element-wise non-linear function (e.g., ReLU), and the fully-connected layer may include an ordered collection of perceptrons.

The output tensor of a layer can have a different width, height, and/or depth than the input tensor of the layer. An image may be viewed as a tensor, e.g., a 224×224 RGB image is a 3-D tensor with a width and height of 224 and a depth of 3. A fully-connected layer may converts a 1-D tensor (or a "flattened" 3-D tensor) into another 1-D tensor. For simplicity of exposition, the layers of a convolutional neural network may be grouped into 3 main categories based on the spatial locality of how they transform a tensor: (1) transformations with a global context, e.g., Fully-Connected, (2) transformations at the granularity of individual elements, e.g., ReLU or Batch Normalization, and (3) transformations at the granularity of a local spatial context, e.g. Convolution or Pooling.

FIG. 4 depicts a simplified illustration of the key layers of a convolutional neural network such as the convolutional neural network 115. The highlighted cells show how a small local spatial context in the first input may propagate through subsequent layers including, for example, (a) a convolution layer (for simplicity sake, bias addition is not shown), (b) a ReLU non-linearity layer, and (c) a pooling layer (max pooling). Relevant notation is explained in Table 1.

Figure 5:
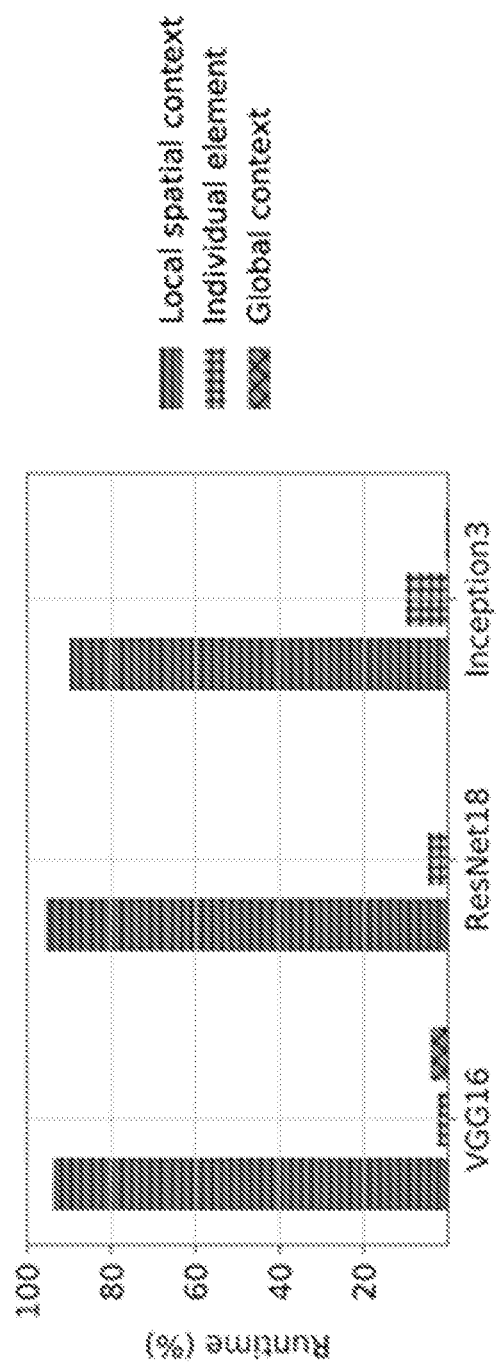
FIG. 5 depicts a graph illustrating a runtime distribution for different families of convolutional neural network layers, in accordance with some example embodiments.

The global context granularity layers may convert the input tensor holistically into an output tensor without any spatial context, typically with a full matrix-vector multiplication. Fully-connected may be the only layer of this type. Since every element of the output will likely be affected by the entire input, such layers do not offer a major opportunity for faster incremental computations. However, fully-connected layers typically arise infrequently, if at all, and only as the last layer(s) in a deep convolutional neural network. As such, as shown in FIG. 5, global context granularity layers typically account for a negligible fraction of the total computational cost and runtime. Optimizations may therefore be achieved with little focus on such layers.

Figure 4A:
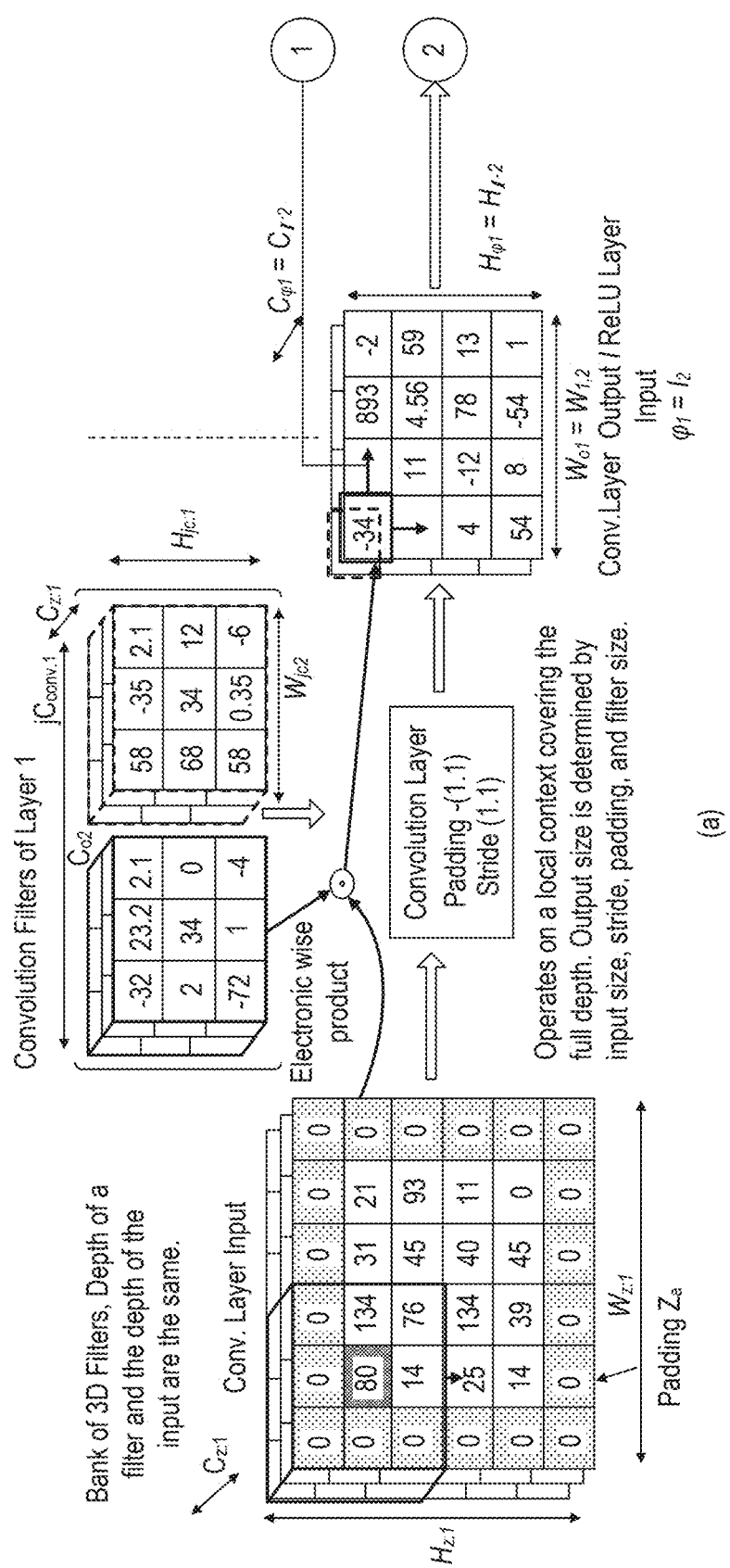
FIG. 4 depicts an example of a convolutional neural network, in accordance with some example embodiments.
Figure 4B:
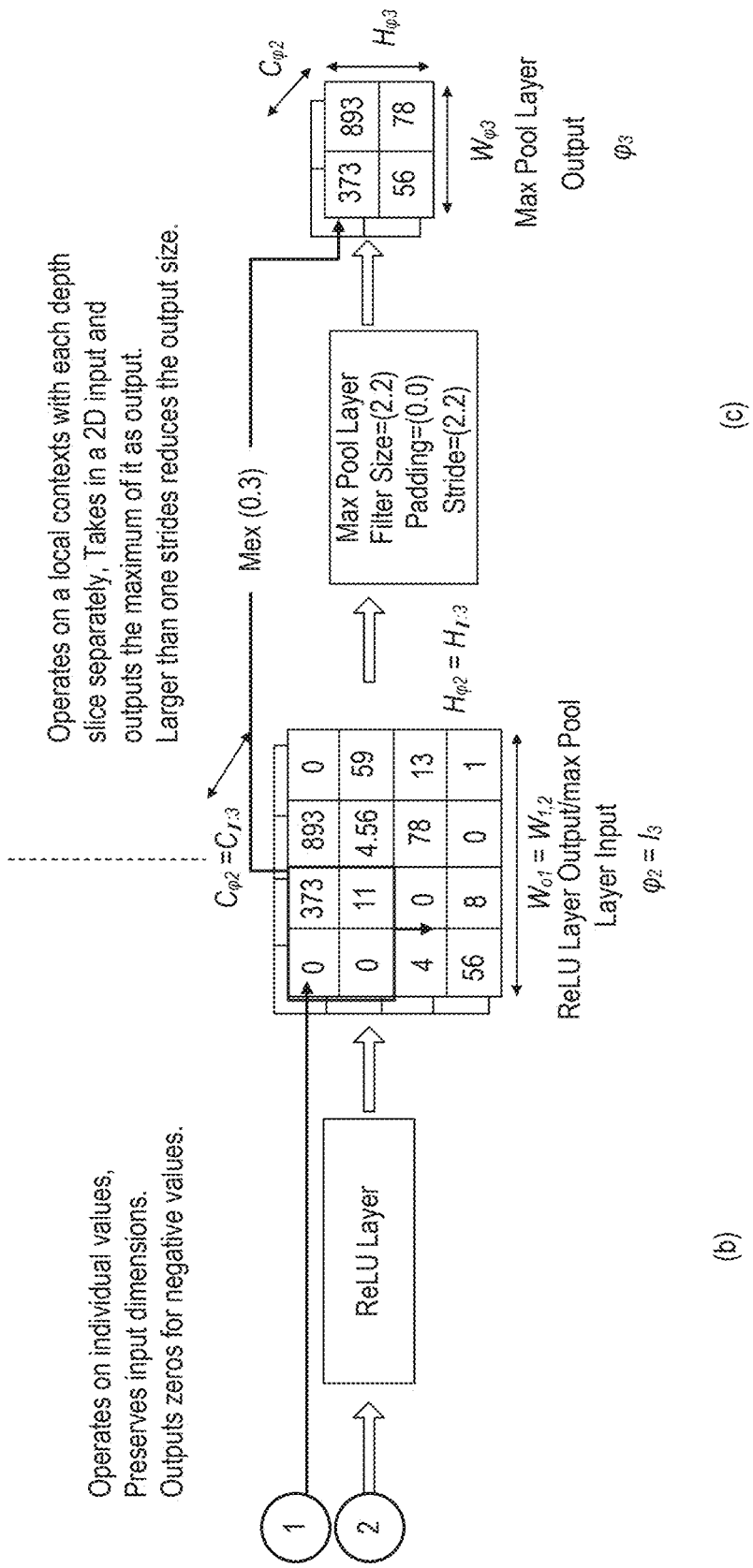

Individual element granularity layers may apply a "map( )" function on the elements of the input tensor, as shown in FIG. 4(b). Thus, the output of an individual element granularity layer may have the same dimensions as the input. Non-linearity layers (e.g., with ReLU) fall under this category. The computational cost of such layers may be proportional to the "volume" of the input tensor (product of the dimensions). If the input is incrementally updated, only the corresponding region of the output will be affected. Accordingly, incremental inference for such layers may be straightforward. As shown in FIG. 5, the computational cost of the incremental computation is proportional to the volume of the updated region and is typically a small fraction of the overall computation cost.

Local spatial context granularity layers may perform weighted aggregations of slices of the input tensor, called local spatial contexts, by multiplying them with a filter kernel (a tensor of weights). Thus, input tensors and output tensors can differ in width, height, and depth. If the input is incrementally updated, the region of the output that will be affected is not straightforward to ascertain but requires non-trivial and careful calculations due to the overlapping nature of how filters get applied to local spatial contexts. Both convolution layers and pooling layers fall under this category. As shown in FIG. 5, such layers typically account for the bulk of the computational cost of deep convolutional neural network inferences (over 90%). Thus, enabling incremental inference for such layers in the context of occlusion-based explanation may be key to increasing the computational efficiency and reducing the latency of the task.

A convolution layer l of the convolutional neural network f may have $C_{O:l}$ 3-D filter kernels arranged as a 4-D array $K_{conv:l}$, with each having a smaller spatial width $W_{K:l}$ and height $H_{K:l}$ than the width $W_{I:l}$ and height $H_{I:l}$ of the input tensor $I_{:l}$ but the same depth $C_{I:l}$. During inference, $c^{th}$ filter kernel may be "strided" along the width and height dimensions of the input to produce a 2-D "activation map" $A_{:c} = (a_{y,x:c}) \in \mathbb{R}^{H_{O:l} \times W_{O:l}}$ by computing element-wise products between the kernel and the local spatial context and adding a bias value as per Equation (7) below. The computational cost of each of these small matrix products may be proportional to the volume of the filter kernel. All the 2-D activation maps are then stacked along the depth dimension to produce the output tensor $O_{:l} \in \mathbb{R}^{C_{O:l} \times H_{O:l} \times W_{O:l}}$. FIG. 4(a) presents a simplified illustration of this layer.

$$a_{y,x:c} = \sum_{k=0}^{C_{I:l}} \sum_{j=0}^{H_{K:l}-1} \sum_{i=0}^{W_{K:l}-1} K_{conv:l}[c, k, j, i] \times \tag{7}$$

$$I_{:l}\left[k, y - \left\lfloor \frac{H_{K:l}}{2} \right\rfloor + j, x - \left\lfloor \frac{W_{K:l}}{2} \right\rfloor + i\right] + B_{conv:l}[c]$$

The pooling layers may behave essentially like the convolution layers but with a fixed (not learned) 2-D filter kernel $K_{pool:l}$. These kernels may aggregate a local spatial context to compute its maximum or average element. But unlike the convolution layers, the pooling layers of the convolutional neural network f may operate independently on the depth slices of the input tensor. The pooling layer may take as input a 3-D tensor $O_l$ of depth $C_{I:l}$, width $W_{I:l}$, and height $H_{I:l}$. Moreover, the pooling layer may produce as output a 3-D tensor $O_{:l}$ with the same depth $C_{O:l} = C_{I:l}$ but a different width of $W_{O:l}$ and height $H_{O:l}$. The filter kernel is typically strided over more than one pixel at a time. Thus, $W_{O:l}$ and $H_{O:l}$ are usually smaller than $W_{I:l}$ and $H_{I:l}$, respectively. FIG. 4(c) presents a simplified illustration of this layer. Overall, the convolution layers and the pooling layers of the convolutional neural network f may have a similar dataflow along the width and height dimensions, while differing on the depth dimension. Since occlusion-based explanation (OBE) only concerns the width and height dimensions of the image and subsequent tensors, we can treat both these types of layers in a unified manner in order to optimize the performance of the task.

For convolution layers and pooling layers, $W_{O:l}$ and $H_{O:l}$ may be determined by $W_{I:l}$ and $H_{I:l}$, $W_{K:l}$ and $H_{K:l}$, and two other parameters that are specific to that layer: stride $S_{:l}$ and padding $P_{:l}$. Stride is the number of pixels by which the filter kernel is moved at a time; it can differ along the width and height dimensions: $S_{x:l}$ and $S_{y:l}$, respectively. In practice, most convolutional neural networks, such as the convolutional neural network 115, may have $S_{x:l}=S_{y:l}$. Typically, $S_{x:l} \leq W_{K:l}$ and $S_{y:l} \leq H_{K:l}$. In FIG. 4, the convolution layer has $S_{x:l}=S_{y:l}=1$, while the pooling layer has $S_{x:l}=S_{y:l}=2$. For some layers, to help control the dimensions of the output to be the same as the input, the input may be "padded" with zeros along the width and height dimensions. Padding $P_{:l}$ captures how much such padding extends these dimensions; once again, padding values can differ along the width and height dimensions: $P_{x:l}$ and $P_{y:l}$. In FIG. 4(a), the convolution layer has $P_{x:l}=P_{y:l}=1$. Given these parameters, width (similarly height) of the output tensor may be given by the following formula:

$$W_{O:l}=(W_{I:l}-W_{K:l}+1+2\times P_{x:l})/S_{x:l} \quad (8)$$

As noted, deep convolutional neural network inferences tend to be computationally expensive, with convolution layers accounting for a bulk of the cost (90% or more). Thus, a rouge estimate the computational cost of inference may be determined by counting the number of fused multiply-add (FMA) floating point operations (FLOPs) needed for the convolution layers. For example, applying a convolution filter with dimensions ($C_{I:l}$, $H_{K:l}$, $W_{K:l}$) to compute one element of the output tensor requires $C_{I:l} \cdot H_{K:l} \cdot W_{K:l}$ FLOPs, with each FLOP corresponding to one FMA. Thus, the total computational cost $Q_{:l}$ of a layer that produces output $O_{:l}$ of dimensions ($C_{O:l}$, $H_{O:l}$, $W_{O:l}$) and the total computational cost Q of the entire set of convolution layers of a given convolutional neural network f can be calculated as per Equations (9) and (10).

$$Q_{:l} = (C_{I:l} \cdot H_{K:l} \cdot W_{K:l})(C_{O:l}, H_{O:l}, W_{O:l}) \quad (9)$$

$$Q = \sum_{l \text{ in } f} Q_{:l} \quad (10)$$

When applying approximate inference optimizations for occlusion-based explanation (OBE), the machine learning engine 110 may be configured to trade off the accuracy and visual quality of the generated heatmap in favor of faster execution. Structured Similarity (SSIM) Index may be used to measure this drop of accuracy, with one of the widely used approaches being to measure the human-perceived difference between two similar images. When applying the structured similarity index, the original heatmap may be treated as a reference image with no distortions and the perceived image similarity of the heatmap generated by the machine learning engine 110 may be calculated with reference to the original heatmap. The structured similarity index may be a value between −1 and 1, where 1 corresponds to perfect similarity. Typically, structured similarity index values in the range of 0.90-0.95 may be used in practical applications, such as image compression and video encoding, as such values correspond to distortions that are imperceptible to the human eye.

In relational incremental view maintenance (IVM), when a portion of the input relation is updated, only the part of output is changed as a result is updated. Applied to convolutional neural networks, a layer of the convolutional neural network may be a "query" and the materialized feature tensor associated with the layer may be the "relation." Since the task of occlusion-based explanation updates only a portion of the image, only a portion of the tensors require re-computation. Given the convolutional neural network f and the occlusion patch, various implementations of the present disclosure provides an algebraic framework for determining, using "static analysis" over the convolutional neural network f, how many FLOPs can be saved, thus yielding an upper bound on the speedups that are realized with incremental inferences.

More precisely, let the output tensor dimensions of layer l be ($C_{O:l}$, $H_{O:l}$, $W_{O:l}$). An incremental update may recompute a smaller local spatial context with width $W_{P:l} \leq W_{O:l}$ and height $H_{P:l} \leq H_{O:l}$. Thus, the computational cost of incremental inference for layer l, denoted by $Q_{inc:l}$, may be equal to the volume of the individual filter kernel times the total volume of the updated output, as given by Equation (11) below. The total computational cost for incremental inference, denoted $Q_{inc}$, is given by Equation (12).

$$Q_{inc:l} = (C_{I:l} \cdot H_{K:l} \cdot W_{K:l})(C_{O:l}, H_{P:l}, W_{P:l}) \quad (11)$$

$$Q_{inc} = \sum_{l \text{ in } f} Q_{inc:l} \quad (12)$$

The foregoing computation costs may be much smaller than $Q_{:l}$ and Q in Equations (9) and (10) earlier. This theoretical speedup may be defined as the ratio $$\frac{Q}{Q_{inc}},$$

which indicates how beneficial incremental inference can be in the best case without performing the inference itself. Since the theoretical speedup depends on several factors (e.g., the occlusion patch size, its location, the parameters of layers (kernel dimensions, stride, etc.), and/or the like), its calculation is non-trivial and requires careful analysis. The location of patch may affect this ratio because a patch placed in the corner of an image leads to fewer updates overall than one placed in the center of the image. Thus, the "worst-case" theoretical speedup is determined by placing the patch at the center of the image.

Figure 6:
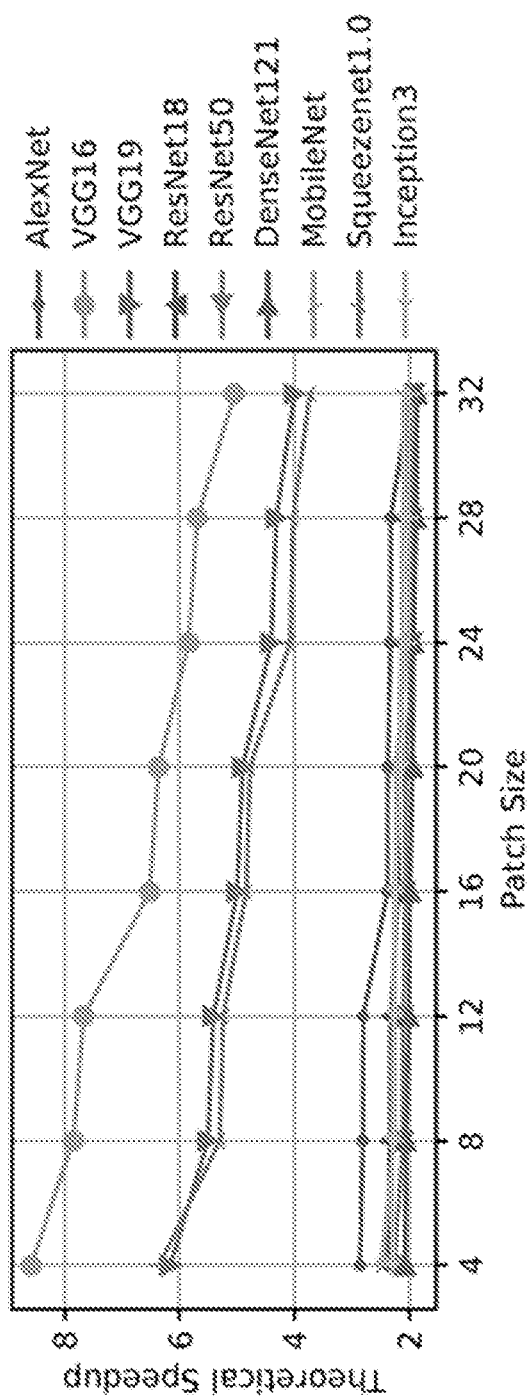
FIG. 6 depicts a graph illustrating a speed ups for convolutional neural networks performing incremental inference, in accordance with some example embodiments.

A sanity check experiment may be performed to ascertain the theoretical speedups for a few variations of convolutional neural networks. For varying occlusion patch sizes (with a stride of 1), these theoretical speedups are plotted in FIG. 6, which shows VGG-16 as having the highest theoretical speedups and DenseNet-121 as having the lowest. Most types of convolutional neural networks exhibit a speedup in the 2×-3× range. Such differences may arise due to the specifics of network architectures. For example, VGG-16 has small convolution filter kernels and strides, which means full inference incurs a high computational cost (Q=15 gigaflops). Thus, VGG-16 may benefit the most from incremental inference. Note that the image size is assumed to be 224×224 for the plot shown in FIG. 6. It should be appreciated that the theoretical speedups may be higher for larger images.

While a 2×-3× speedup may sound "not that significant" in practice, we find that they indeed are significant for at least two reasons. First, users often wait in the loop for occlusion-based explanation (OBE) workloads for performing interactive diagnoses and analyses. Thus, even a small speedup may lead to a large increase in productivity, e.g., reducing the time taken on a central processing unit (CPU) from about 6 minutes to just 2 minutes, or on a graphic processing unit (GPU) from 1 minutes to just 20 seconds. Second, incremental inference is the foundation for approximate inference optimizations, which further amplify the speedups achieved for occlusion-based explanation. For instance, the speedup for Inception3 goes up from only 2× for incremental inference to up to 8× with additional optimizations.

In some example embodiments, the machine learning engine 110 may apply an algebraic framework for incremental updates to the materialized output tensor of a convolutional neural network layer. The focus may be maintained on the non-trivial layers of the network that operate at the granularity of a local spatial context (e.g., the convolution layers and the pooling layers). The modified version of such layers may be referred to as "incremental inference operations."

Figure 7:
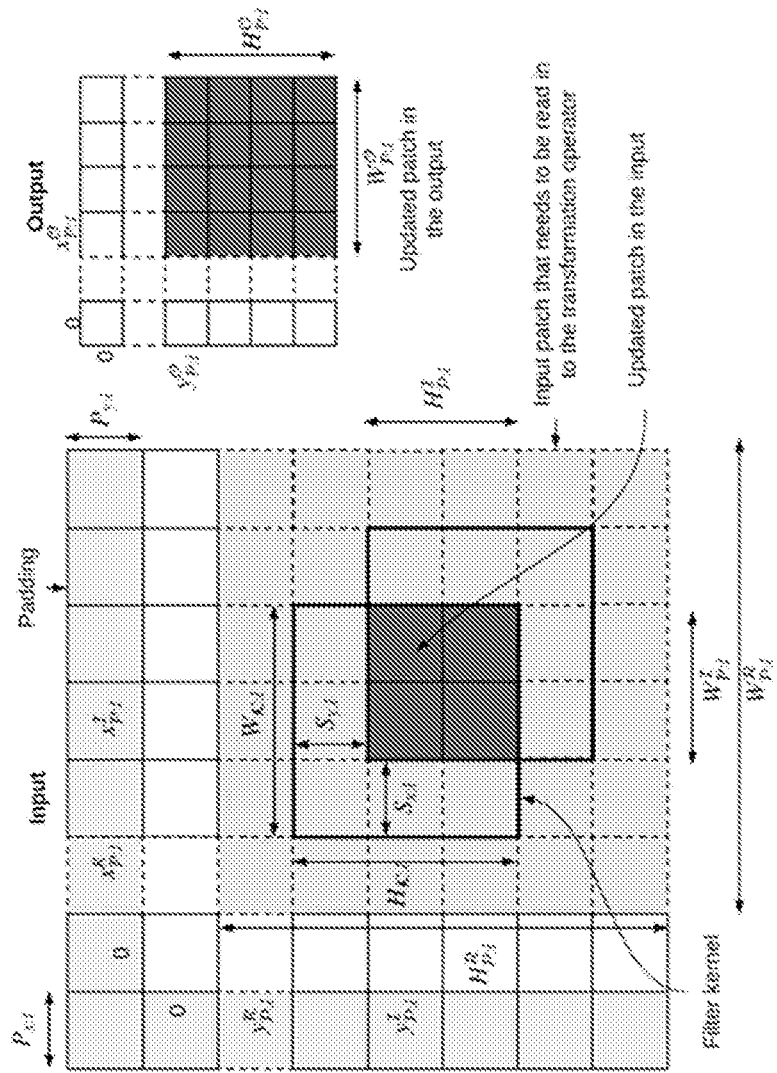
FIG. 7 depicts a schematic diagram illustrating an example of an input update patch and an output update patch for the convolutional layers and/or pooling layers of a convolutional neural network, in accordance with some example embodiments.

In some example embodiments, the machine learning engine 110 may calculate the coordinates and dimensions of the output update patch of layer 1 given the input update patch and layer-specific parameters. FIG. 7 illustrates these calculations. The origin of the coordinate system origin is at the top left corner. The input update patch is shown in red/dark color and starts at $(x_{P:l}^I, y_{P:l}^I)$, with height $H_{P:l}^I$ and width $W_{P:l}^I$. The output update patch starts at $(x_{P:l}^O, y_{P:l}^O)$ and has a height $H_{P:l}^O$ and width $W_{P:l}^O$. Due to overlaps among filter kernel positions during inference, computing the output update patch requires reading a slightly larger spatial context than the input update patch (e.g., "read-in context"), and it is illustrated by the blue/shaded region in FIG. 7. The read-in context may start at $(x_{P:l}^R, y_{P:l}^R)$, with its dimensions denoted by $W_{P:l}^R$ and $H_{P:l}^R$. Table 2 below summarizes additional notation for this section. The relationship between these quantities along the width dimension (similarly along the height dimension) can be expressed as follows:

$$x_{P:l}^O = \max(\lceil (P_{x:l} + x_{P:l}^I - W_{K:l} + 1)/S_{x:l} \rceil, 0) \quad (13)$$

$$W_{P:l}^O = \min(\lceil (W_{P:l}^I + W_{K:l} - 1)/S_{x:l} \rceil, W_{O:l}) \quad (14)$$

$$x_{P:l}^R = x_{P:l}^O \times S_{x:l} - P_{x:l} \quad (15)$$

$$W_{P:l}^R = W_{K:l} + (W_{P:l}^O - 1) \times S_{x:l} \quad (16)$$

Equation (13) calculates the coordinates of the output update patch. As shown in FIG. 7, padding effectively shifts the coordinate system and thus, $P_{x:l}$ is added to correct it. Due to overlaps among the filter kernels, the affected region of the input update patch (blue/shaded region in FIG. 7) may be increased by $W_{K:l}-1$, which needs to be subtracted from the input coordinate $x_{P:l}^I$. A filter of size $W_{K:l}$ that is placed starting at $x_{P:l}^I - W_{K:l} + 1$ will see an update starting from $x_{P:l}^I$. Equation (14) calculates the width of the output update patch, which is essentially the number of filter kernel stride positions on the read-in input context. However, this value cannot be larger than the output size. As such, a start coordinate and width of the read-in context are given by Equations (15) and (16). It should be appreciated that similar equations hold for the height dimension.

TABLE 2

| Symbol | Meaning |
| --- | --- |
| $x_{P:l}^I, y_{P:l}^I$ | Start coordinates of input update patch for layer l |
| $x_{P:l}^R, y_{P:l}^R$ | Start coordinates of read-in context for layer l |
| $x_{P:l}^O, y_{P:l}^O$ | Start coordinates of output update patch for layer l |
| $H_{P:l}^I, W_{P:l}^I$ | Height and width of input update patch for layer l |
| $H_{P:l}^R, W_{P:l}^R$ | Height and width of read-in context for layer l |
| $H_{P:l}^O, W_{P:l}^O$ | Height and width of output update patch for layer l |
| τ | Projective field threshold |
| $r_{drill-down}$ | Drill-down fraction for adaptive drill-down |

For layer l, given the transformation function $T_{:l}$, the prematerialized input tensor $I_{:l}$, input update patch $P_{:l}^O$, and the above calculated coordinates and dimensions of the input, output, and read-in context, the output update patch $P_{:l}^O$ may be computed as follows:

$$u = I_{:l}[:, x_{P:l}^R : x_{P:l}^R + W_{P:l}^R, y_{P:l}^R : y_{P:l}^R + H_{P:l}^R] \quad (17)$$

$$u = u^O_{(x_{P:l}^I - x_{P:l}^R), (y_{P:l}^I - y_{P:l}^R)} P_{:l}^I \quad (18)$$

$$P_{:l}^O = T_{:l}(u) \quad (19)$$

Equation (17) slices the read-in context u from the prematerialized input tensor $I_{:l}$. Equation (18) superimposes the input update patch $P_{:l}^I$ on it. This may be an in-place update of the array holding the read-in context. Finally, Equation (19) computes the output update patch $P_{:l}^O$ by invoking $T_{:l}$ on u. Performing inference on all of $I_{:l}$ may be obviated, thus achieving incremental inference and reducing the number of floating point operations (FLOPs).

Figure 8:
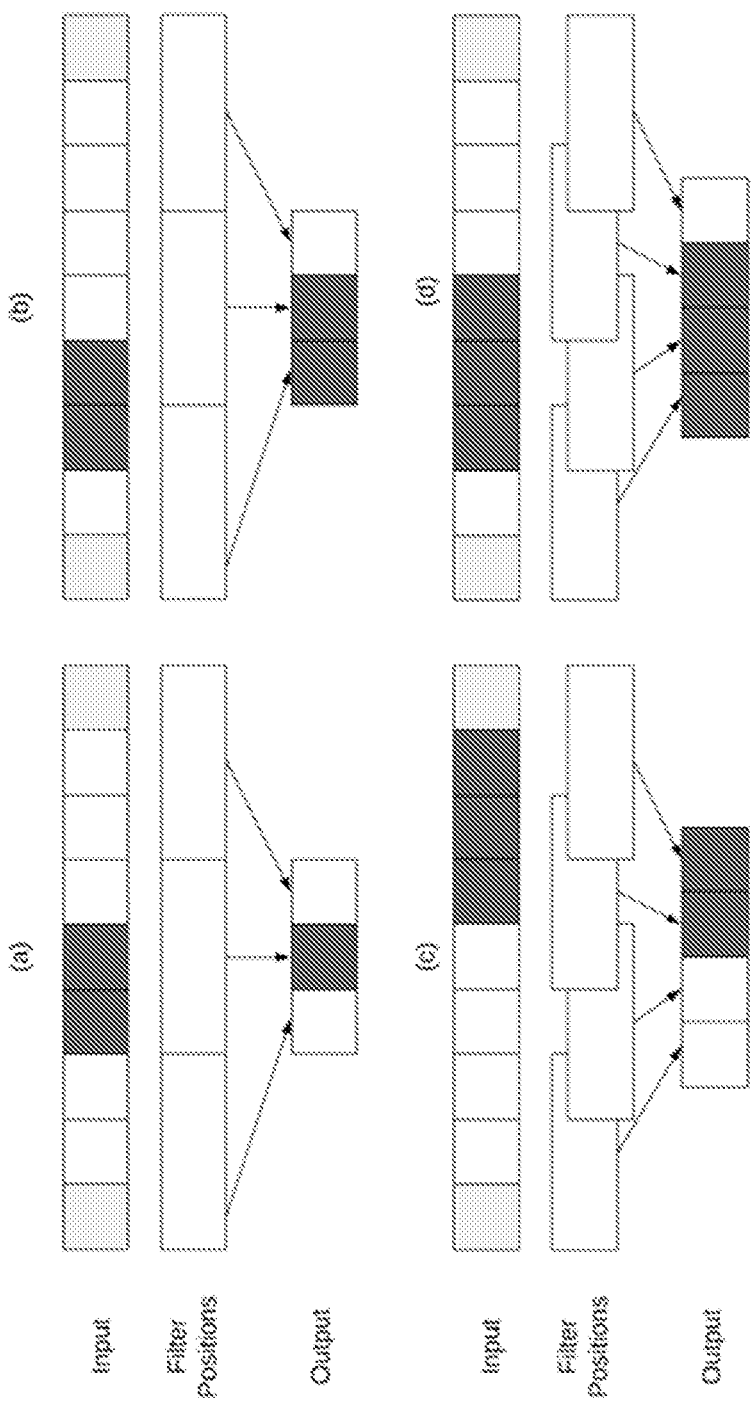
FIG. 8 depicts an example of a special case for the output size of a convolutional neural network, in accordance with some example embodiments.

There may be special cases under which the output patch size can be smaller than the values calculated above. For example, consider the simplified 1-D case shown in FIG. 8(a), where the filter stride is the same as the filter size. In this case, the size of the output update patch may be one less than the value calculated by Equation (14). However, the same is not true for the case shown in FIG. 8(b), which has the same input patch size but placed at a different location. Another special case may arise when the modified patch is placed at the edge of the input, as shown in FIG. 8(c). In this case, it may be impossible for the filter to move freely through all positions, since it hits the input boundary. However, it is not the case for the modified patch shown in FIG. 8(d). The machine learning engine 110 does not treat these cases separately but may use the values calculated by Equation (14) for the width dimension (similarly for the height dimension), since they act as an upper bound. In the case of a smaller output patch, the machine learning engine 110 may read and update a slightly bigger patch in order to preserve uniformity. This also requires updating the starting coordinates of the patch, as shown in Equation (20). This sort of uniform treatment may be required for performing batched inference operations, which gives significant speedups compared to per-image inference.

$$\text{If } x_P^O + W_P^O > W_O: x_P^O = W_O - W_P^O; x_P^I = W_I - W_P^I; \\ x_P^R = W_I - W_P^R \quad (20)$$

The foregoing analysis focuses on use cases where convolutional neural networks, such as the convolutional neural network 115, are used on image data. However, convolutional neural networks may also be applied to sequence data, such as time-series, by splitting the sequence into equal sized windows. In the case of time series data, this may be done along the time axis. Windowed sequences may be considered as a special type of image where the height is always one and width is equal to the window size. The quantity of channels in the image will be equal to the quantity of attributes in a multi-variate sequence. All convolution operations will be applied only over the windowing axis and hence they are called 1-dimensional convolutional neural networks. Occlusion-based explanation is still useful in these scenarios to explain predictions made by the convolutional neural network. However, in this case, the output of the occlusion-based explanation task may be a sequence of probabilities instead of a heatmap. It should be appreciated that the machine learning engine 110 may accelerate occlusion-based explanations for 1-D convolutional neural networks through incremental inference by setting the height of the occlusion patch to one.

Unlike relational incremental view maintenance (IVM), a convolutional neural network such as the convolutional neural network 115 may have many layers, often in a sequence. This may be analogous to a sequence of queries, each requiring incremental view maintenance to be performed on its predecessor's output. It therefore becomes necessary to correctly and automatically configure the update patches across all layers of a CNN. Specifically, output update patch $P_{:l}^O$ of layer l becomes the input update patch of layer l+1. Doing so may require care at the boundary of a local context transformation and a global context transformation, e.g., between a convolution (or pooling) layer and a fully-connected layer. In particular, the full updated output may need to be materialized, and not just the output update patches, since global context transformations lose spatial locality for subsequent layers.

Figure 9:
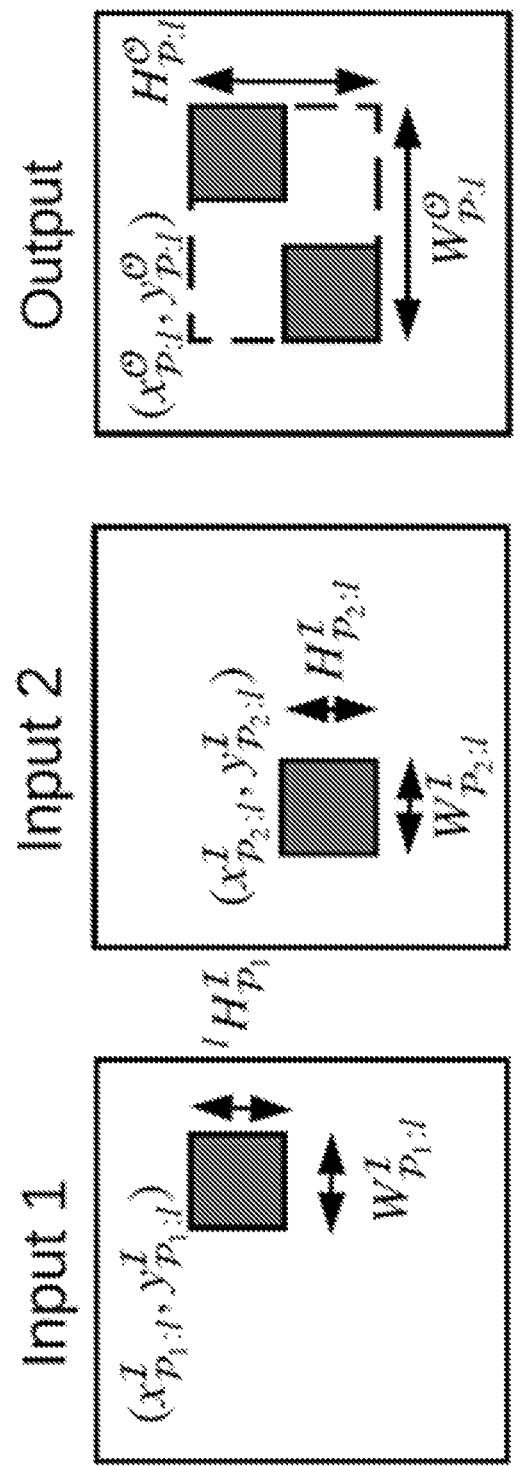
FIG. 9 depicts an example of bounding box calculation for different input update patch locations for element-wise addition and depth-wise concatenation layers in a directed acyclic graph (DAG) convolutional neural network, in accordance with some example embodiments.

Some convolutional neural networks may have a more general directed acyclic graph (DAG) structure for layers, with two new kinds of layers that "merge" two branches in the directed acyclic graph (e.g., element-wise addition and depth-wise concatenation). Element-wise addition requires two input tensors with all dimensions being identical whereas depth-wise concatenation takes two input tensors with the same height and width dimensions. This gives rise to the challenge of calculating the output update patch when the two input tensors differ on their input update patches locations and sizes. FIG. 9 depicts an example of a solution in which the first input has its update patch starting at coordinates $(x_{P_1:l}^I, y_{P_1:l}^I)$, with dimensions $H_{P_1:l}^I$ and $W_{P_1:l}^I$, while the second input has its update patch starting at coordinates $(x_{P_2:l}^I, y_{P_2:l}^I)$ with dimensions $H_{P_2:l}^I$ and $W_{P_2:l}^I$. This issue can arise with both element-wise addition and depth-wise concatenation.

A simple unified solution may include computing the bounding box of the input update patches. Thus, as shown in FIG. 9, the coordinates and dimensions of both read-in contexts and the output update patch may be identical. While this may potentially require a re-computation of parts of the output are not modified, this trade-off is acceptable at least because the gains are likely to be marginal for the additional complexity introduced into the framework. Overall, the output update patch coordinate and width dimension are given by the following (similarly for the height dimension):

$$x_{P:l}^O = \min(x_{P_1:l}^I, x_{P_2:l}^I)$$

$$W_{P:l}^O = \max(x_{P_1:l}^I + W_{P_1:l}^I, x_{P_2:l}^I + W_{P_2:l}^I) - \min(x_{P_1:l}^I, x_{P_2:l}^I) \quad (21)$$

To perform the task of occlusion-based explanation, the machine learning engine 110 may issue |G| re-inference requests in one go. Viewing each request as a "query" makes the connection with multi-query optimization (MQO) clear. The |G| queries are also not disjoint, since the occlusion patch is typically small, which means most pixels are the same for each query. Thus, we now extend the incremental view maintenance (IVM) framework for re-inference with multi-query optimization (MQO) that fuses multiple re-inference requests. An analogy with relational queries would be executing many incremental update queries on the same relation at once, with each query receiving a different incremental update.

Multi-query optimization (MQO) in this context may include materializing all convolutional neural network tensors at once and reusing them for incremental inferences across all |G| queries. Since the occluded images share most of their pixels, parts of the tensors are likely to be identical as well. Accordingly, the cost of materialization may be amortized. Materializing the tensors of the convolutional neural network in this manner may be preferable to merely performing a "batched" inference for the |G| queries at least because batched execution is standard practice on high-throughput computing hardware like (e.g., graphic processing units (GPUs) because batching amortizes the convolutional neural network set up costs, data movement costs, and/or the like. Batch sizes may also be tuned to optimize hardware utilization. Nevertheless, batching is an orthogonal (albeit trivial) optimization compared to our multi-query optimization. As such, batching and multi-query optimization may be combined to execute incremental inferences in a batched manner (e.g., "batched incremental inference"). Empirically, batching alone yields limited speedups (under 2×) whereas batched incremental inference amplifies the speedups. Algorithm 1 below formally presents the batched incremental inference operation for layer l.

---

Algorithm 1 BATCHEDINCREMENTALINFERENCE

---

Input:
$T_{:l}$ : Original Transformation function
$I_{:l}$ : Pre-materialized input from original image
$[P_{1:l}^I, \ldots, P_{n:l}^I]$ : Input patches
$[(x_{P_1:l}^I, y_{P_1:l}^I), \ldots, (x_{P_n:l}^I, y_{P_n:l}^I)]$:Input patch coordinates
$W_{P:l}^I, H_{P:l}^I$ : Input patch dimensions
1: procedure BATCHEDINCREMENTALINFERENCE
2:    Calculate $[(x_{P_1:l}^O, y_{P_1:l}^O), \ldots, (x_{P_n:l}^O, y_{P_n:l}^O)]$
3:    Calculate $(W_{P:l}^O, H_{P:l}^O)$
4:    Calculate $[(x_{P_1:l}^R, y_{P_1:l}^R), \ldots, (x_{P_n:l}^R, y_{P_n:l}^R)]$
5:    Calculate $(W_{P:l}^R, H_{P:l}^R)$
6:    Initialize $u \in \mathbb{R}^{n \times depth(I_{:l}) \times H_{P:l}^R \times W_{P:l}^R}$
7:    for i in [1, ...,n] do
8:       $T_1 \leftarrow I_{:l} [:, x_{P_i:l}^R : x_{P_i:l}^R + W_{P:l}^R, y_{P_i:l}^R : y_{P_i:l}^R + H_{P:l}^R]$ Algorithm 1 BATCHEDINCREMENTALINFERENCE

```
9:     T₂ ← T₁ ∘₍ₓₚᵢ:ⱼᴵ₋ₓₚᵢ:ⱼᴿ₎,₍yₚᵢ:ⱼᴵ₋yₚᵢ:ⱼᴿ₎ Pᵢ:ₗ
10:    u[i, :, :] ← T₂
11:    [P₁:ₗᴼ, . . ., Pₙ:ₗᴼ] ← T(u)              ▷ Batched version
12:    return [P₁:ₗᴼ, . . ., Pₙ:ₗᴼ],
13:    [(x_{P₁:ₗ}ᴼ, y_{P₁:ₗ}ᴼ), . . ., (x_{Pₙ:ₗ}ᴼ, y_{Pₙ:ₗ}ᴼ)], (W_{P:ₗ}ᴼ, H_{P:ₗ}ᴼ)
```

Referring to Algorithm 1, the procedure BATCHEDINCREMENTALINFERENCE may calculate the geometric properties of the output update patches and read-in contexts. A temporary tensor u is initialized to hold the input update patches with their read-in contexts. The for loop iteratively populates u with corresponding patches. Finally, $T_{:J}$ may be applied to u to compute the output patches. It should be appreciated that for the first layer in occlusion-based explanation, all input update patches will be identical to the occlusion patch. But for the later layers, the update patches will start to deviate depending on their locations and read-in contexts.

Figure 10:
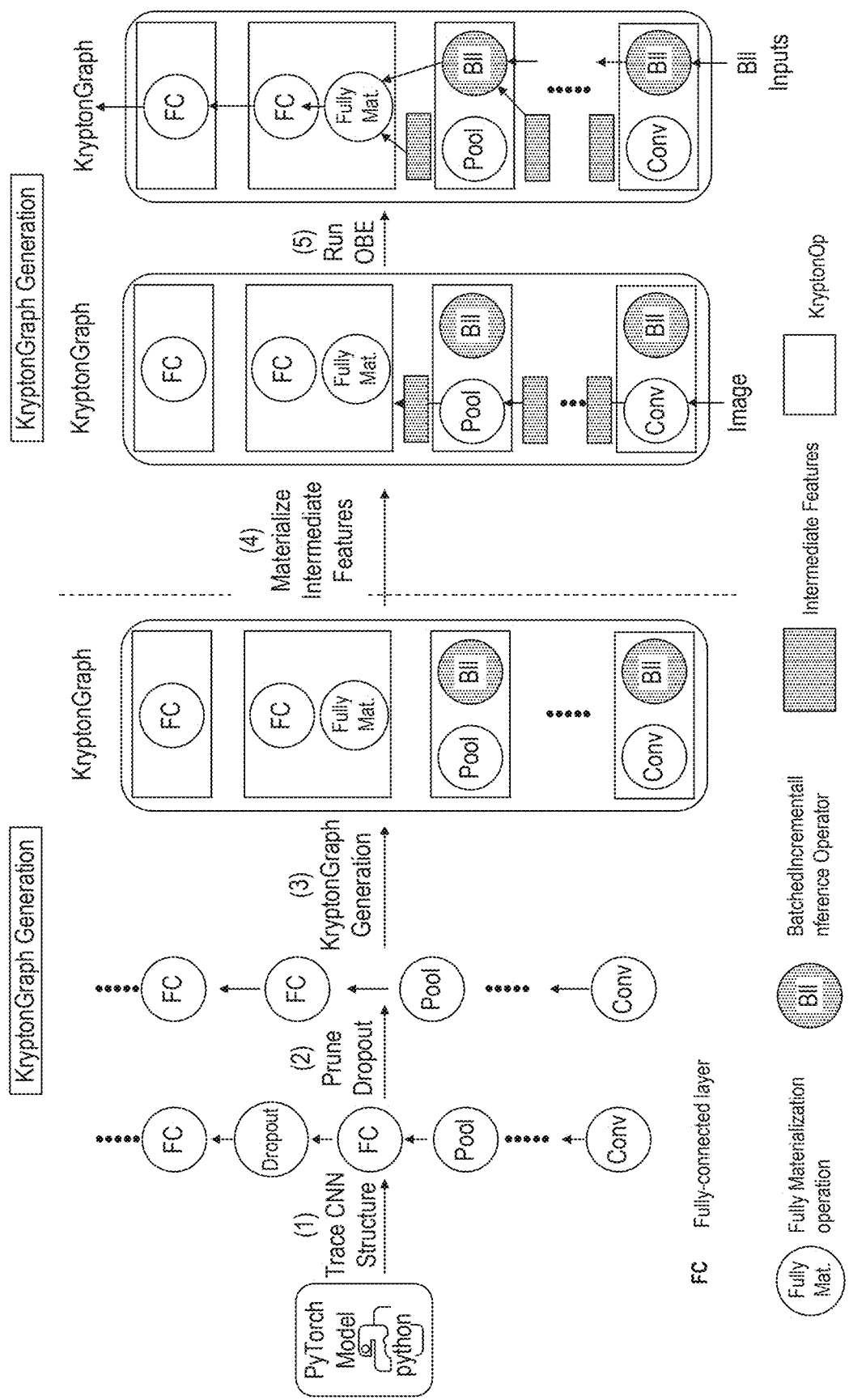
FIG. 10 depicts a schematic diagram illustrating an example of a process for generating and executing a graph corresponding to an incremental convolutional neural network inference, in accordance with some example embodiments.

In some example embodiments, the machine learning engine 110 may accelerate the task of occlusion-based explanation for any arbitrary type of convolutional neural networks. This may be achieved through a high-level graph abstraction and automating the generation and execution of the graphs. For a given convolutional neural network, the graph procedure may handle the incremental inference of that convolutional neural network, for example, by using PyTorch. The high-level process for graph generation and execution is shown in FIG. 10 and includes the following:

(1) Given a convolutional neural network model f, the utilities available in PyTorch may be used to trace the structure of the convolutional neural network by providing a sample image as input. Since all convolutional neural networks are static in nature (e.g., the order of operator execution is not dependent on data), the structure obtained by tracing is guaranteed to be correct. The trace output is then exported to ONNX format, which is a convenient representation format for subsequent analysis.

(2) Dropout operators in the convolutional neural network model may be ignored as they do not have any effect on the inference performed by the convolutional neural network.

(3) The exported convolutional neural network model may be traversed in a topological order to create a corresponding graph. For each operator T in the original convolutional neural network f there will be a corresponding operation OP in the graph that implements the BatchedIncrementalInference procedure (from Algorithm 1) for local context operators. Each operation Op may also have a reference to the original convolutional neural network operator T, which will be used in the BatchedIncrementalInference method or directly invoked for global context operators that do not support incremental inference (e.g., fully-connected). Under the hood, the operation OP may rely on the PyTorch framework for the actual execution of the corresponding convolutional neural network operator. The first global context operator that succeeds a local context operator will first fully materialize the updated input before invoking the full inference operator. Since all convolutional neural networks are created using a small number of low-level operators (e.g., convolution, pooling, and fully-connected), by implementing all corresponding types of operations Ops, any arbitrary type of convolutional neural network may be acceptable as an input.

(4) The generated graph may be used for performing convolutional neural network inferences for the task of occlusion-based explanation. Given an input $I_{img}$ image, all intermediate outputs corresponding to incremental inference operators may be materialized using one full inference.

(5) The occluded images ($I'_{(x,y):img}$) may be prepared for all positions in G. For batches of $I'_{(x,y):img}$ as the input, the graph procedure may be invoked in topological order to calculate the corresponding entries of heatmap M.

Empirically, a dichotomy exists between central processing units (CPUs) and graphics processing units (GPUs) in that the BATCHEDINCREMENTALINFERENCE procedure yielded expected speedups on central processing units but performed poorly on graphics processing units. In fact, a naive implementation of BATCHEDINCREMENTALINFERENCE on graphics processing units was slower than full re-inference.

Figure 11:
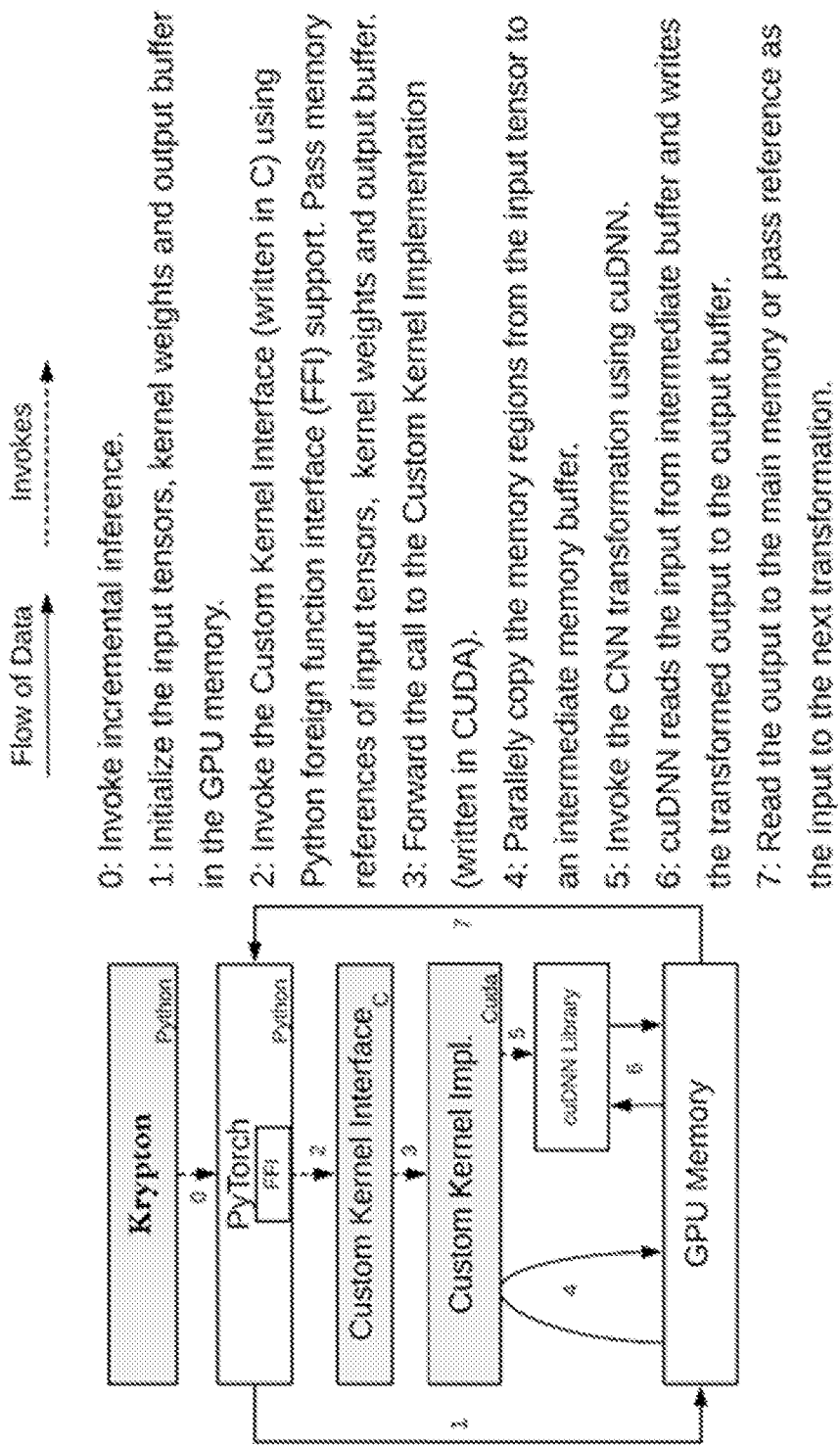
FIG. 11 depicts a schematic diagram illustrating an example of a custom graphic processing unit (GPU) kernel integration architecture, in accordance with some example embodiments.

This is because the for loop in line 7 of Algorithm 1 is essentially preparing the input for $T_{:J}$ by copying values (slices of the materialized tensor) from one part of GPU memory to another sequentially. A detailed profiling of the GPU showed that these sequential memory copies are a bottleneck for GPU throughput, since they throttle it from exploiting its massive parallelism effectively. To overcome this issue, a custom compute unified device architecture (CUDA) kernel is created to perform input preparation more efficiently by copying memory regions in parallel for all items in the batched inference request. This is akin to a parallel for loop tailored for slicing the tensor followed by an invocation of $T_{:J}$, which is already hardware-optimized by modern deep learning tools. This custom kernel may be integrated to PyTorch using Python foreign function interface (FFI). An example of the high-level architecture of the custom kernel integration is shown in FIG. 11. Python FFI may integrate with the Custom Kernel Interface layer which then invokes the Custom Memory Copy Kernel Implementation. Also, since GPU memory might not be enough to fit all |G| queries, the batch size for GPU execution might be smaller than |G|.

Since incremental inference is exact in that it yields the same occlusion-based explanation heatmap as a full inference, incremental inference does not exploit the tolerance to some degradation in visual quality. Accordingly, in some example embodiments, the incremental view maintenance (IVM) framework may be extended to create two heuristic approximate inference optimizations that trade off the heatmap's quality in a user-tunable manner to further accelerate occlusion-based explanations. These optimizations may operate at the logical level and may be complementary to more physical-level optimizations such as low-precision computation and model pruning.

In some example embodiments, the task of occlusion-based explanation (OBE) may be further optimized by applying projective field thresholding. The projective field of a neuron in a convolutional neural network may refer to the slice of the output tensor that is connected to it. It is a term from neuroscience to describe the effects of a retinal cell on the output of the eye's neuronal circuitry. This notion sheds light on the growth of the size of the update patches through the layers of a convolutional neural network such as the convolutional neural network 115. The 3 kinds of layers populating a convolutional neural network may affect the projective field size growth differently.

Figure 12:
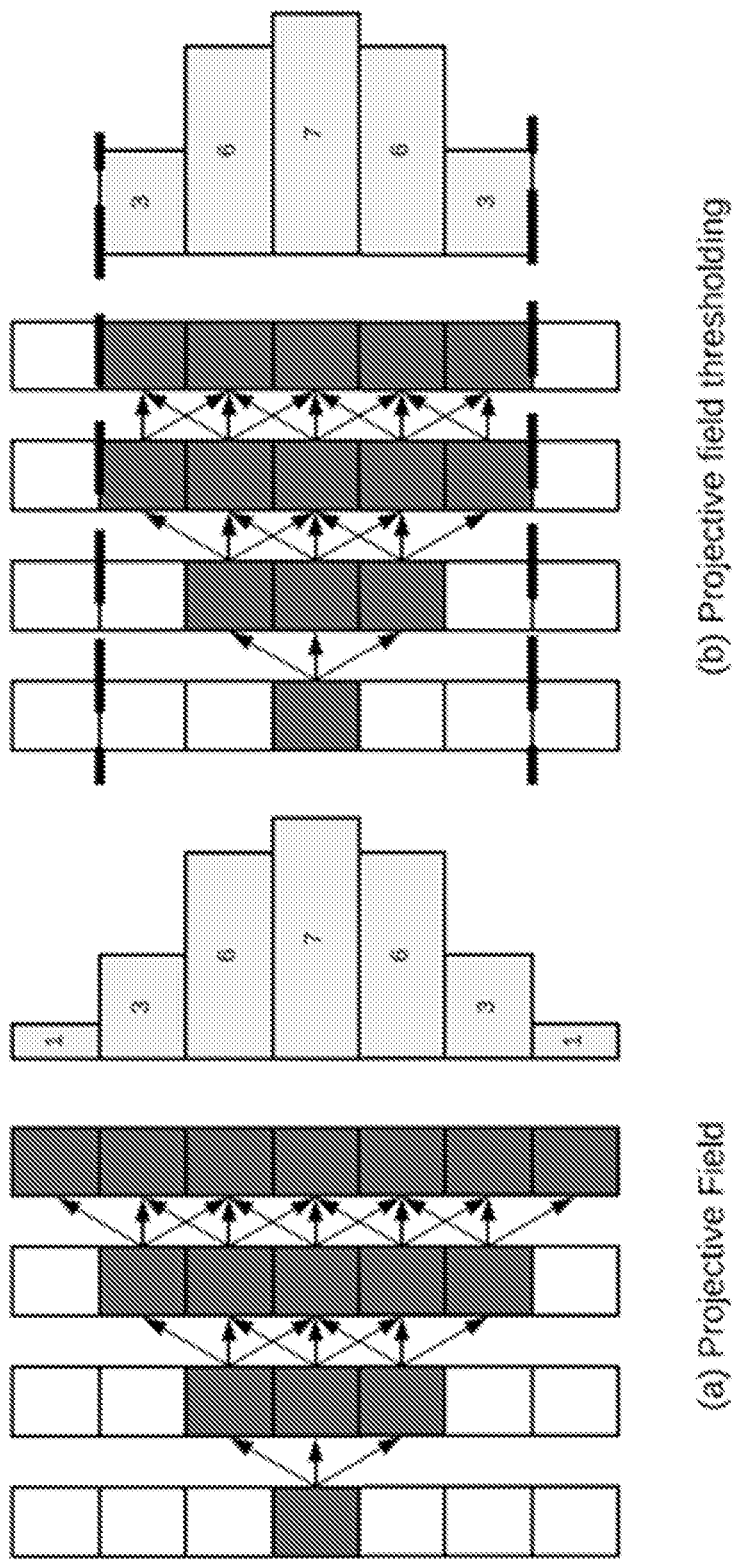
FIG. 12 depicts a schematic diagram illustrating an example of a projective field growth and projective field thresholding, in accordance with some example embodiments.

Transformations at the granularity of individual elements do not alter the projective field size whereas global context transformations increase it to the whole output. However, local spatial context transformations, which are the most crucial in optimizing computational costs, increase it gradually at a rate determined by the filter kernel's size and stride (e.g., additively in the size and multiplicatively in the stride). The growth of the projective field size implies the amount of FLOPs saved by the incremental view maintenance strategy decreases deeper into a convolutional neural network 115. Eventually, the output update patch becomes as large as the output tensor. This growth is illustrated in FIG. 12(a), which shows the projective field growth for 1-D convolution with a filter size of 2 and a stride of 1.

This observation motivates the concept of projective field thresholding, which includes truncating the projective field from growing beyond a given threshold fraction τ (0<τ≤1) of the output size. This means that inferences in subsequent layers of the convolutional neural network are approximate. FIG. 12(b) illustrates the concept of projective field thresholding for a filter size of 3 and a stride of 1. One input element may be updated (shown in red/dark) and the change may propagate to 3 elements in the next layer and then to 5 elements in the following layer before being truncated because we set a threshold τ=5/7. This approximation may alter the accuracy of the output values and the visual quality of the resulting heatmap. Nevertheless, a modest truncation may still be tolerable, without degrading the visual quality of the heatmap to a significant degree.

To provide intuition on why the above happens, consider histograms on the side of FIGS. 12(a) and (b) that list the number of unique "paths" from the updated element to each element in the last layer. It resembles a Gaussian distribution, with the maximum paths concentrated on the middle element. Thus, for most of the output patch updates, truncation will only discard a few values at the "fringes" of what contributes to an output element. Under some assumptions on the values of the weights, this distribution does indeed converge to a Gaussian. Thus, while the concept of thresholding is a heuristic, it is grounded in a common behavior of real convolutional neural networks. The following proposition formalizes the effective projective field growth for a one dimensional convolutional neural network with n convolutions layers. It may be assumed that all layers of the network have the same weight normalized filter kernel (i.e. sum of the weights add up to one).

PROPOSITION 5.1. For a one dimensional CNN with n layers which uses the same weight normalized filter kernel, the theoretical projective field will grow O(n) and the effective projective field will grow O(√n).

PROOF. The input is u(t) and t=0, 1, −1, 2, −2, . . . indexes the input pixels. Assume u(t) is such that $$u(t) = \begin{cases} 1, & t = 0 \\ 0, & t \neq 0 \end{cases} \quad (22)$$

Each layer has the same kernel v(t) of size k. The kernel signal can be formally defined as $$v(t) = \sum_{m=0}^{k-1} w(m)\delta(t-m) \quad (23)$$

where w(m) is the weight for the $m^{th}$ pixel in the kernel. Without loosing generality, it may be assumed that the weights are normalized, i.e. $\Sigma_m w(m)=1$. The output signal of the $n^{th}$ layer o(t) is simply o=u*v* . . . *v, convolving u with n such vs. To compute the convolution, a Discrete Time Fourier Transform may be to convert the signals into the Fourier domain, and obtain $$U(\omega) = \sum_{t=-\infty}^{\infty} u(t)e^{-j\omega t} = 1, V(\omega) \quad (24)$$

$$= \sum_{t=-\infty}^{\infty} v(t)e^{-j\omega t} = \sum_{m=0}^{k-1} w(m)e^{-j\omega t}$$

Applying the convolution theorem, we get the Fourier transform of o $$F(0) = F(u*v* \ldots *v)(\omega) = U(\omega) \cdot V(\omega)^n \quad (25)$$

$$= \left(\sum_{m=0}^{k-1} w(m)e^{-j\omega t}\right)^n$$

With inverse Fourier transform $$o(t) = \frac{1}{2\pi} \int_{-\pi}^{\pi} \left(\sum_{m=0}^{k-1} w(m)e^{-j\omega t}\right)^n e^{j\omega t} d\omega \quad (26)$$

The space domain signal o(t) may be given by the coefficients of $e^{-j\omega t}$. It can be shown that if $\Sigma_m w(m)=1$ and w(m)≥0∀m, then $$o(t) = p(S_n = t) \quad (27)$$

$$\text{where } S_n = \sum_{i=1}^{n} X_i \text{ and } p(X_i = m) = w(m)$$

From the central limit theorem, as n→∞, √n(1/n $S_n$− $\mathbb{E}[X])$~N(0, V ar[X]) and $S_n$~N(n$\mathbb{E}[X]$), nV ar[X]). As o(t)=p($S_n$=t), o(t) also has a Gaussian shape with $$\mathbb{E}[S_n] = n\sum_{m=0}^{k-1} mw(m) \quad (28)$$

$$Var[S_n] = n\left(\sum_{m=0}^{k-1} m^2 w(m) - \left(\sum_{m=0}^{k-1} mw(m)\right)^2\right) \quad (29)$$

This indicates that o(t) decays from the center of the projective field squared exponentially according to the Gaussian distribution. As the rate of decay is related to the variance of the Gaussian and assuming the size of the effective projective field is one standard deviation, the size can be expressed as $$\sqrt{Var[S_n]} = \sqrt{nVar[X_i]} = O(\sqrt{n}) \quad (30)$$

On the other hand stacking more convolution layers would grow the theoretical projective field linearly. But the effective projective field size is shrinking at a rate of $O(1/\sqrt{n})$. Overall, since most of the contributions to the output elements are concentrated around the center, projective field truncation is often affordable. Note that this optimization may be feasible in conjunction with the incremental inference framework to reuse the remaining parts of the tensors and save FLOPs. The formulas for the output-input coordinate calculations may be extended to account for $\tau$. For the width dimension, the new formulas are as follows (similarly for the height dimension):

$$W_{P:l}{}^O = \min(\lceil (W_{P:l}{}^I + W_{K:l} - 1)/S_{x:l} \rceil, W_{P:l}{}^O) \quad (31)$$

$$\text{If } W_{P:l}{}^O > \text{round}(\tau \times W_{:l}{}^O): \quad (32)$$

$$W_{P:l}{}^O = \text{round}(\tau \times W_{:l}{}^O) \quad (33)$$

$$W_{P_{new}:l}{}^I = W_{P:l}{}^O \times S_{x:l} - W_{K:l} + 1 \quad (34)$$

$$x_{P:l}{}^I += (W_{P:l}{}^I - W_{P_{new}:l}{}^I)/2 \quad (35)$$

$$W_{P:l}{}^I = W_{P_{new}:l}{}^I \quad (36)$$

$$x_{P:l}{}^O = \max(\lceil (P_{x:l} + x_{P:l}{}^I - W_{K:l} + 1)/S_{x:l} \rceil, 0) \quad (37)$$

Equation (31) calculates the width assuming no thresholding. But if the output width exceeds the threshold, it is reduced as per Equation (33). Equation (34) calculates the input width that would produce an output of width $W_{P:l}{}^O$. This may be akin to making $W_{P:l}{}^I$ the subject of Equation (31). If the new input width is smaller than the original input width, the starting x coordinate may be updated as per Equation (35) such that the new coordinates correspond to a "center crop" compared to the original. Equation (36) sets the input width to the newly calculated input width. Equation (37) calculates the x coordinate of the output update patch.

Figure 13:
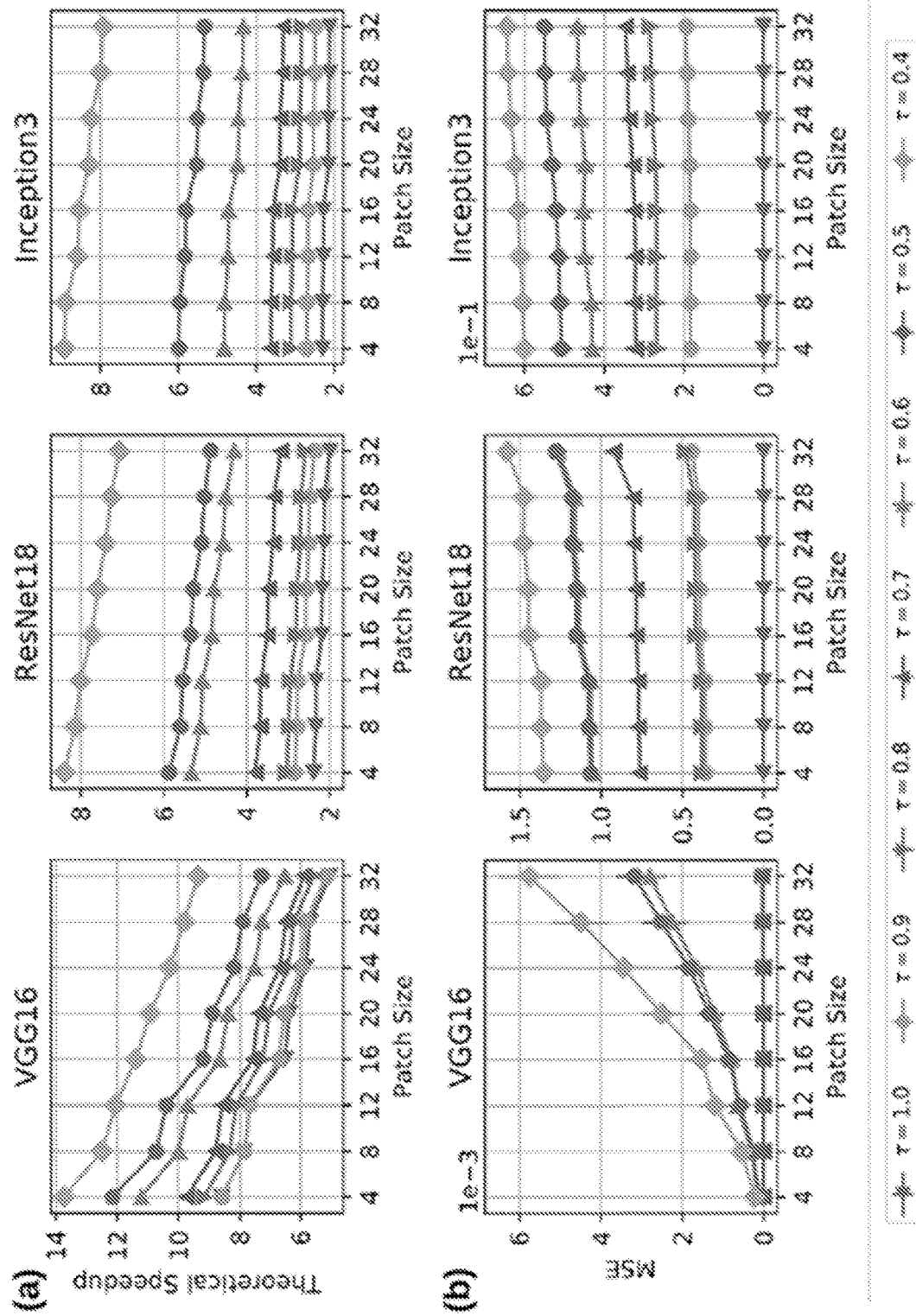
FIG. 13 depicts graphs illustrating the speedup achieved with projective field thresholding and the mean square error between exact output and approximate output, in accordance with some example embodiments.

The "static analysis" framework may be modified to determine the theoretical speedup of incremental inference to also include this optimization using the above formulas. Consider a square occlusion patch placed on the center of the input image. FIG. 13(a) plots the new theoretical speedups for varying patch sizes for 3 different types of convolutional neural networks at different $\tau$ values. As expected, as $\tau$ goes down from 1, the theoretical speedup goes up for all types of convolutional neural networks. Since lowering $\tau$ approximates the heatmap values, the mean square error (MSE) of the elements of the exact and approximate output tensors produced by the final convolution layers or pooling layers on a sample (n=30) of real-world images may be plotted with the results shown in FIG. 13(b). As expected, as $\tau$ drops, the mean square error (MSE) may increase. But interestingly, the trends differ across different types of convolutional neural networks due to their different architectural properties. For example, mean square error may be especially low for VGG-16, since its projective field growth is slow compared to the other convolutional neural networks.

Figure 14:
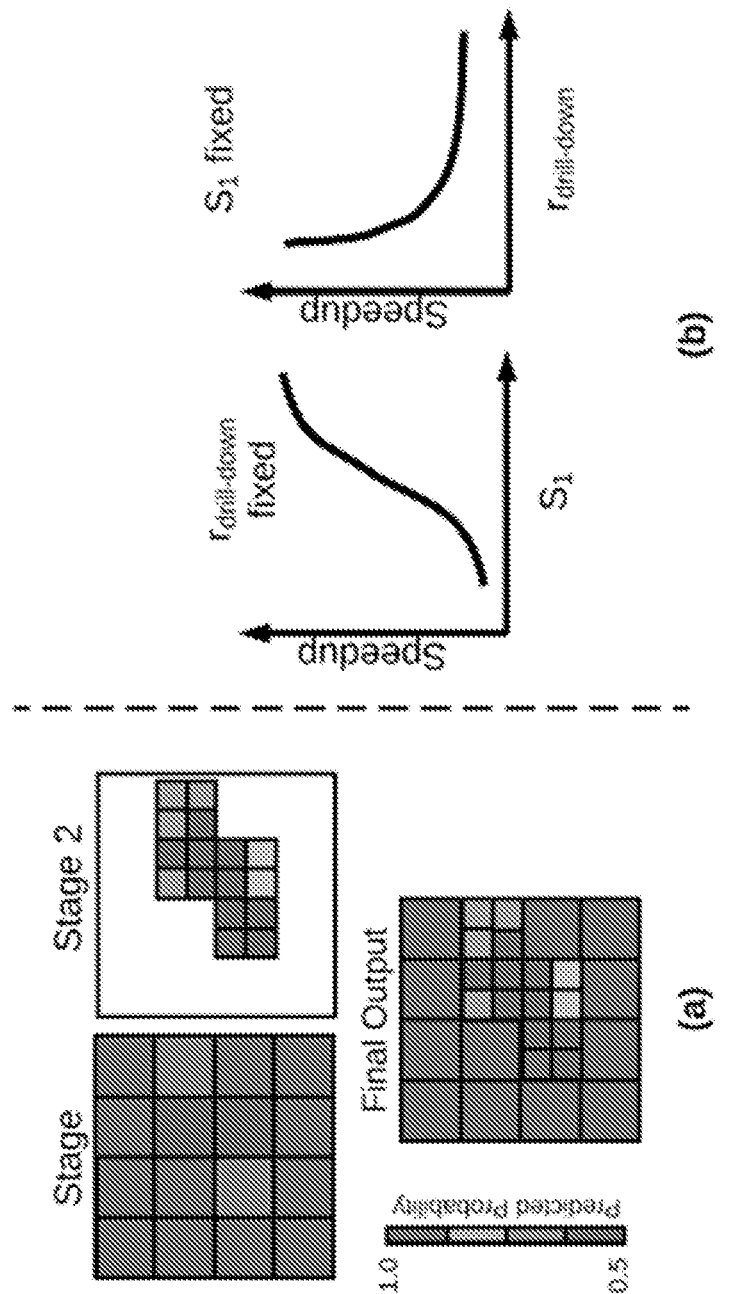
FIG. 14 depicts a schematic diagram illustrating an example of an adaptive drill-down and graphs illustrating the effects of adaptive drill-down, in accordance with some example embodiments.

This heuristic optimization of adaptive drilldown may be based on the observation about a peculiar semantics of occlusion-based explanation (OBE) that enables a modification to how G (the set of occlusion patch locations) is specified and handled, especially in the non-interactive specification mode. For example, consider a radiologist explaining a convolutional neural network prediction for diabetic retinopathy on a tissue image. The region of interest typically occupies only a tiny fraction of the image. Thus, it may be an overkill to perform regular occlusion-based explanation for every patch location since most of the (incremental) inference computations are effectively "wasted" on uninteresting regions. In such cases, the occlusion-based explanation workflow may be modified to produce an approximate heatmap using a two-stage process shown in FIG. 14(a).

Referring to FIG. 14(a), in stage one, a lower resolution heatmap may be produced by using a larger stride (e.g., stage one stride $S_1$). Using this heatmap, regions of the input having the largest drops in predicted probability of the label L may be identified. Given a predefined parameter drill-down fraction, denoted $r_{drill-down}$, a proportional number of regions may be selected based on the probability drops. In stage two, occlusion-based explanation may be performed for these regions with the original stride value (e.g., stage two stride $S_2$) for the occlusion patch to yield a portion of the heatmap at the original higher resolution. It should be appreciated that this process "drills down" adaptively based on the lower resolution heatmap. Moreover, this optimization also builds upon the incremental inference optimizations described earlier, but may be orthogonal to projective field thresholding and can therefore be used in unison.

The notion of theoretical speedup for the adaptive drill-down optimization may be independent of the theoretical speedup associated with incremental inference. At the outset, setting the parameters $r_{drill-down}$ and $S_1$ may be an application-specific balancing act. For example, if $r_{drill-down}$ is low, only a small region will require re-inferencing at the original resolution, which will save a lot of FLOPs. However, this may miss some regions of interest and thus compromise important explanation details. Similarly, a large $S_1$ may also save a lot of FLOPs by reducing the number of re-inference queries in stage one but doing so may run the risk of misidentifying interesting regions, especially when the size of those regions are smaller than the occlusion patch. Accordingly, the theoretical speedup of adaptive drill-down optimization may be defined as the ratio of the number of re-inference queries for regular occlusion-based explanation without the optimization to the number of re-inference queries with this optimization. Only the re-inference query counts may be required because the occlusion patch dimensions are unaltered, leaving the cost of each re-inference query the same with and without the optimization. Given a stride 5, the number of re-inference queries is $$\frac{H_{I_{img}}}{S} \cdot \frac{W_{I_{img}}}{S}.$$

Thus, the theoretical speedup is given by the following equation. FIG. 14(b) illustrates how this ratio varies with $S_1$ and $r_{drill-down}$.

$$\text{speedup} = \frac{S_1^2}{S_2^2 + r_{drill-down} \cdot S_1^2} \quad (38)$$

In some example embodiments, the machine learning engine 110 may implement automated parameter tuning techniques for configuring the approximate inference optimizations described above. For example, for the tuning of projective field thresholding in which the value of $\tau$ controls the visual quality of the heatmap, there may be a spectrum of visual quality degradation from imperceptible changes to major structural changes. However, mapping $\tau$ to visual quality directly may not be intuitive for users. As such, to measure visual quality more intuitively, the machine learning engine 110 may adopt a cognitive science-inspired metric called Structural Similarity (SSIM) Index, which is used to quantify human-perceptible differences between two images. In the context of occlusion-based explanation (OBE), the two "images" may be a heatmap generated without projective field thresholding and a heatmap generated with projective field thresholding. Structural Similarity (SSIM) Index may be a number in the range of [−1, 1], with 1 indicating a perfect match. Structural Similarity (SSIM) Index values in the range of [0.90, 0.95] are considered to include nearly imperceptible distortions for many practical multimedia applications such as image compression and video encoding.

Figure 15:
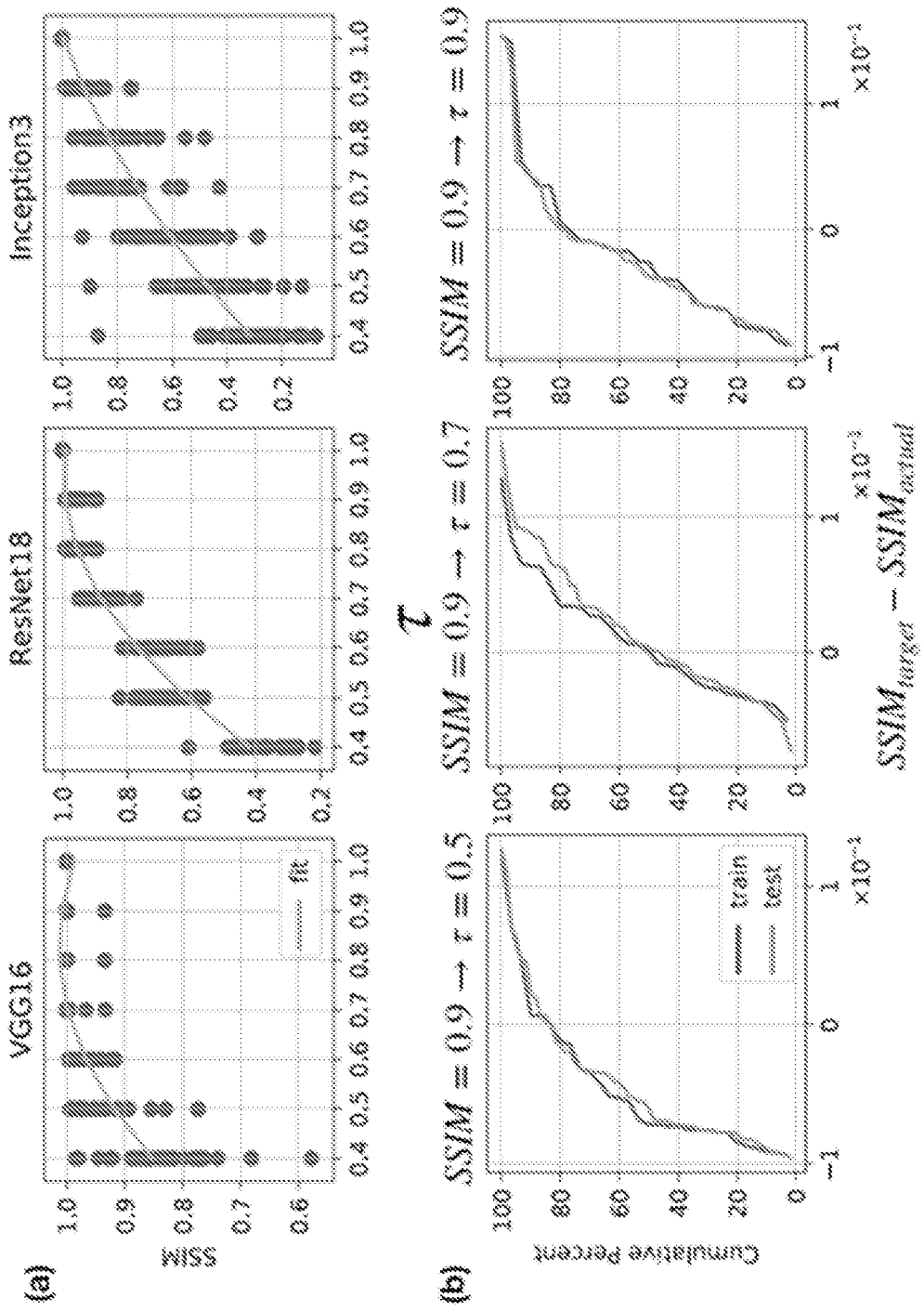
FIG. 15 depicts graphs illustrating the effects of tuning projective field thresholding, in accordance with some example embodiments.

The tuning process for $\tau$ may have an offline "training" phase and an online usage phase. The offline phase may rely on a set of sample images from the same application domain and a Structural Similarity (SSIM) Index may be computed for the approximate and exact heatmaps for all sample images for different $\tau$ values (e.g., 1.0, 0.9, 0.8, ..., 0.4). A second-degree polynomial curve for the Structural Similarity (SSIM) Index may be learned as a function of $\tau$ with these data points. FIG. 15(a) illustrates this phase and the fit SSIM-$\tau$ curves for 3 different types of convolutional neural networks using sample images from an optical coherence tomography (OCT) dataset. In the online phase, when occlusion-based explanation is being performed on a given image, the machine learning engine 110 may provide the user, for example, at the client device 120, a target Structural Similarity (SSIM) Index for a desired quality-runtime trade-off (e.g., with 1 yielding the exact heatmap). The learned curve may be used to map a target Structural Similarity (SSIM) Index to the lowest $\tau$. FIG. 15(b) shows the CDFs of differences between a target Structural Similarity (SSIM) Index (0.9) and the actual Structural Similarity (SSIM) Index that is yielded when using an auto-tuned $\tau$ on both the training set and a holdout test set (also 30 images). In 80% of the cases, the actual Structural Similarity (SSIM) Index was better than the user-given target. Moreover, as shown in FIG. 15(b), never once did the actual Structural Similarity (SSIM) Index go 0.1 below the target Structural Similarity (SSIM) Index. This suggests that the auto-tuning method for $\tau$ works, is robust, and is applicable to different types of convolutional neural networks.

As noted, the speedup offered by adaptive drilldown is controlled by the stage one stride $S_1$ and the drill-down fraction $r_{drill-down}$. In practice, the user may provide, for example, via the client device 120, a value for the drill-down fraction $r_{drill-down}$ (default 0.25) because the parameter captures the user's intuition about how large or small the region of interest is likely to be in the images in their specific application domain and dataset. The user may also be able to provide a "target speedup" ratio (default 3) for using this optimization to capture a desired quality-runtime trade-off. For example, the higher the user's target speedup, the more may be sacrificed in terms of the quality of the "non-interesting regions" ($1-r_{drill-down}$ fraction of the heatmap). The automated tuning process may set $S_1$ based on user inputs for the drill-down fraction $r_{drill-down}$ and the target speedup. Unlike the tuning of $\tau$, setting $S_1$ may be more direct because this optimization relies on the number of re-inference queries and not on Structural Similarity (SSIM) Index. Letting target denote the target speedup and the original occlusion patch stride being $S_2$, Equation (39) below shows the calculation of $S_1$. The value of $S_1$ may be obtained by making $S_1$ the subject of Equation (38). Since $S_1$ cannot be larger than the image width $W_{img}$ (similarly $H_{img}$) and due to the constraint of $(1-r_{drill-down}\cdot\text{speedup})$ being positive, there is an upper bound on the possible speedups as per Equation (40).

$$S_1 = \sqrt{\frac{target}{1 - r_{drill-down}\cdot target}}\cdot S_2 \quad (39)$$

$$speedup < \min\left(\frac{W_{img}^2}{S_2^2 + r_{drill-down}\cdot W_{img}^2}, \frac{1}{r_{drill-down}}\right) \quad (40)$$

As noted, the machine learning engine 110 may also perform incremental inference in order to optimize the task of object recognition in videos (ORV). In particular, the ability to reduce the necessary recalculations across similar images may provide a unique opportunity for accelerating convolutional neural network-based object recognition in fixed-angle camera videos. This is because frame-to-frame differences in the video are unlikely to be significant, which means that the machine learning engine 110 may exploit the similarities between frames to limit re-inferencing to only the region of change. Subsequent to performing an initial full inference using a base frame, the machine learning engine 110 may only need to perform incremental inference on the changed regions, whereas the naive approach will perform full inference across all video frames. Reducing strain on systems for video analytics is an area of high importance, as the various applications of object recognition in videos (e.g., traffic monitoring, surveillance, animal tracking, and/or the like) will largely run on edge devices without high computing power. In these settings, the incremental inference performed by the machine learning engine 110 may allow for faster and more efficient inference on video inputs, thus improving the operation of these devices.

However, accelerating the task of object recognition in videos poses several unique challenges. At the outset, unlike in occlusion-based explanation (OBE) where the changed region is exact and of rectangular shape, changed region in object recognition in videos may be of any arbitrary shape. Furthermore, due to the inherent noise in video frames there can be more than one potentially small changed regions. Hence, finding the most important changed region from a given frame is a non-trivial pursuit. Moreover, over time the materialized intermediate features can become invalid, for example, due to slight changes in camera angle, lighting, and/or the like. To overcome these issues, the machine learning engine 110 may implement frame differencing and scene separation, which may incorporate approximations to cast the task of object recognition in videos as a variant of the occlusion-based explanation problem.

Figure 16:
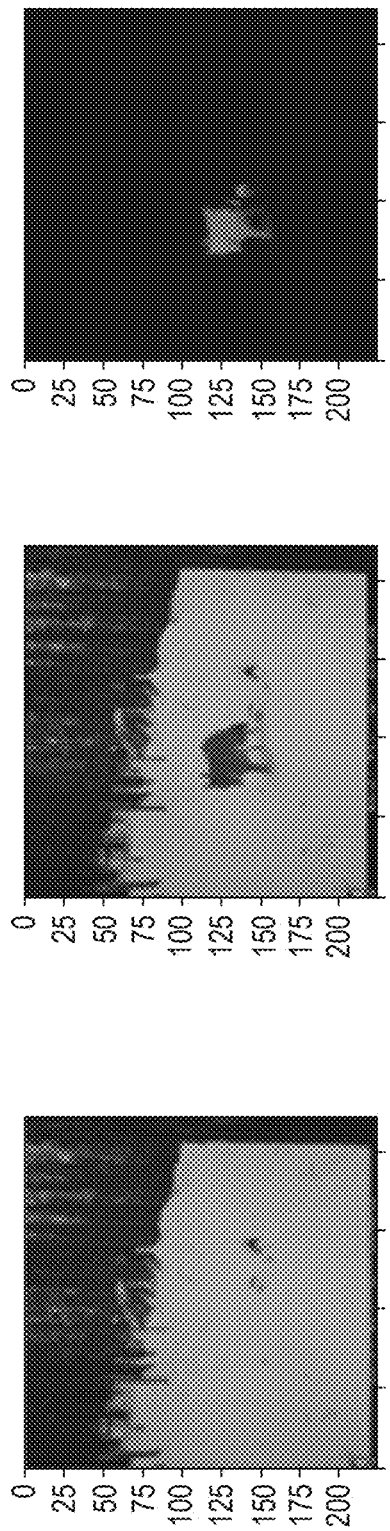
FIG. 16 depicts an example of a process for frame differencing, in accordance with some example embodiments.
Figure 16:
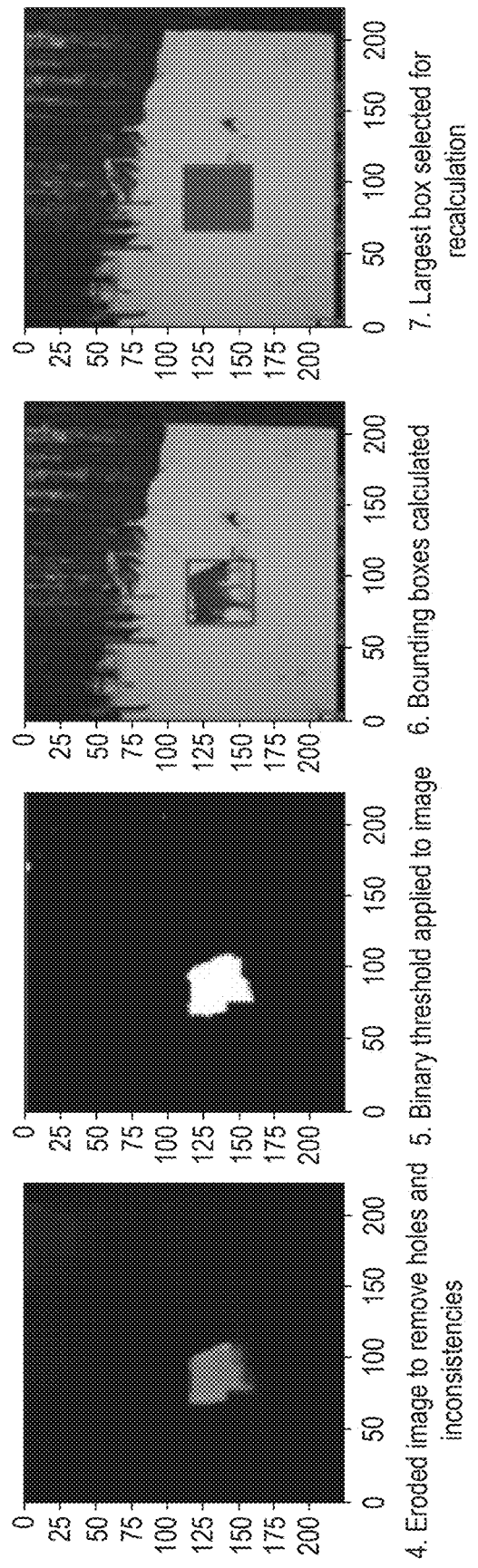

The machine learning engine 110 may apply an approximate frame differencing technique to identify the single most important changed region for incremental inference in each frame. This technique is formally present in Algorithm 2 and pictorially presented in FIG. 16. Approximate frame differencing may be performed based on inputs including a base_frame which is treated as the background, a new_frame from which to identify the changed region, and a threshold which will be used to identify the changed pixels. By using pixel-subtraction, the machine learning engine 110 may identify all of the changes between the current_frame and the base_frame on a per-pixel basis. Thresholding the resultant data may eliminate noise and restrict the necessary re-inferencing to a more limited scope. The machine learning engine 110 may also calculate bounding boxes for the remaining areas of difference, thereby providing a more regular shape for subsequent inference. These bounding boxes can often overlap, which is why they may be collapsed into larger bounding boxes to eliminate any overlaps. The largest of the resultant bounding boxes may be selected as the most important changed region for incremental inference, with the coordinates and the dimensions of this box being the output of approximate frame differencing. It should be appreciated that smaller threshold values tend to select smaller changed regions and result in higher speedups. However, a smaller threshold may also reduce the accuracy of the generated predictions. The most optimal value for threshold (value between 0 and 255) may be largely dependent on the chosen use case. Empirically, a threshold value of 40 was found to provide a reasonable trade-off between runtime and accuracy.

fraction of 50% may achieve a satisfactory balance to this tradeoff and still obtain good speedups without too much compromise to accuracy. Upon reaching the 50% fraction, for example, the machine learning engine 110 may re-materializes all the intermediate features for the current base frame for use in subsequent incremental inference of the next scene.

Algorithm 3 formalizes the object recognition in videos (ORV) workflow at the machine learning engine. For example, Algorithm 3 receives, as input, a video V, a threshold for frame differencing, a max_patch_size for scene separation, a KryptonGraph kg for performing the incremental inference, and a batch_size for batching multiple incremental inference requests. The base frame is initialized to the first frame of the video followed by an iteration

---

Algorithm 2 FRAMEDIFFERENCING

---

Input:
    base_frame : Base frame (background of the video)
    new_frame : New frame with a potential object
    threshold : Pixel-wise change identification threshold
Output:
    $x_P, y_P$ : Starting coordinates of the largest changed region
    $w_P, h_P$ : Width and the height of the largest changed region
1: procedure FRAMEDIFFERENCING (base_frame, new_frame, threshold)
2:     binary_img ← abs(new_frame - base_frame) // threshold
3:     bboxes ← Calculate bounding boxes for objects in binary_img
4:     collapsed_bboxes ← Collapse overlapping bounding boxes in bboxes
5:     $x_P, y_P, w_P, h_P$ ← Find the largest bounding box from collapsed_bboxes
6:     return $x_P, y_P, w_P, h_P$

---

The foregoing approach for object recognition in videos may assume a fixed background on which an object may appear. This background may be the base frame. When starting, the first frame in a video may be designated as the base frame. However, as time passes, it is possible that the background of the current frame is different to the selected base frame. This change in background may interfere with efforts to perform frame differencing, for example, by incorrectly identifying very large changed regions and diminishing the gains of incremental inference. To address this problem, the machine learning engine 110 may be configured to recognize the notion of a scene when performing the task of object recognition in videos. For instance, when the size of the selected changed region is larger than some significant fraction of the size of the base frame, the machine learning engine 110 may create a new scene and reset the base frame to the current frame. The fraction that controls the switch in base frame may determine the tradeoff between how often a frame is fully materialized and how often the materialized features are subsequently reused. In practice, a through successive frames in video V calling the procedure FrameDifferencing to find the changed region before appending the result to a batch. Two possible events may occur to trigger an incremental inference on the compiled batch of changed regions. The first event being the changed region size exceeding the max_patch_size and upon encountering a new scene, and the second being the current batch size reaching the max_batch_size. This max_batch_size may be necessary to avoid the possibility of exhausting hardware resource such as graphic processing unit (GPU) memory. Unlike in occlusion-based explanation where all patches are of a same size, changed regions in object recognition in videos are of arbitrary size. As such, when invoking incremental inference on a batch of changed regions, the machine learning engine 110 may first find the maximum size of the patches as the final patch size. This operation is formally presented in the RunIncrementalInference procedure. Finally, Algorithm 3 may return the predicted class labels for all the frames in V as output.

---

Algorithm 3 OBJECTRECOGNITIONINVIDEO

---

Input:
    V : Input Video
    threshold : Pixel-wise change identification threshold
    max_patch_size : Maximum size of a patch for separating scenes
    batch_size : Batch size for incremental inference
    kg : KryptonGraph
Output:
    predictions : Predicted label for eachframe
1: procedure OBJECTRECOGNITIONINVIDEO
2:     $X_P$ ← [ ]; $Y_P$ ← [ ]; $W_P$ ← [ ]; $H_P$ ← [ ]; frames ← [ ]; predictions ← [ ]
3:     base_frame ← V.next( ); new_frame ← V.next( )
4:     while new_frame ≠ NULL do
5:         $x_P, y_P, w_P, h_P$ ← FrameDifferencing(base_frame, new_frame, threshold)
6:         if $w_P × h_P ≥$ max_patch_size then     ▷ new scene -continued Algorithm 3 OBJECTRECOGNITIONINVIDEO

```
 7:        labels ← RunIncrementalInference(frames, X_P, Y_P, W_P, H_P, kg)
 8:        predictions.extend(labels)
 9:        label ← kg.materialize_intermediate_data(new_frame)
10:        predictions.append(label)
11:        base_frame ← new_frame
12:        X_P ← [ ]; Y_P ← [ ]; W_P ← [ ]; H_P ← [ ]; frames ← [ ]
13:      else                                          ▷ same scene
14:        X_P.append(x_P), Y_P.append(y_P), W_P.append(w_P), H_P.append(h_P)
15:        frames.append(new_frame)
16:        if len(frames) == batch_size then           ▷ batch size reached
17:          labels ← RunIncrementalInference(frames, X_P, Y_P, W_P, H_P, kg)
18:          predctions.extend(labels)
19:          X_P ← [ ]; Y_P ← [ ]; W_P ← [ ]; H_P ← [ ]; frames ← [ ]
20:      new_frame ← V.next( )
21:    return predictions
22:
23:  procedure RUNINCREMENTALINFERENCE(frames, X_P, Y_P, W_P, H_P, kg)
24:    W_{Pmax} ← max(W_P); H_{Pmax} ← max(H_P); P ← [ ]
25:    for i ∈ [1, . . ., len(X_P)] do
26:      if X_P [i] + W_{Pmax} > width(frames[i]) then
27:        X_P [i] ← width(frames[i]) - W_{Pmax}
28:      if Y_P [i] + H_{Pmax} > height(frames [i]) then
29:        Y_P [i] ← height(frames[i]) - H_{Pmax}
30:      P.append(frames[i][X_P[i]: X_P[i]+ W_{Pmax}, Y_P[i]: Y_P[i] + H_{Pmax}])
31:    labels ← kg.incremental_inference(P, X_P, Y_P, W_{Pmax}, H_{Pmax})
32:    return labels
```

The speedups yielded by the machine learning engine 110 performing incremental inference for occlusion-based explanation and for object recognition in videos may be evaluated for different types of convolutional neural networks and datasets.

Four diverse real-world datasets, OCT, Chest X-Ray, ImageNet, and HAR, may be used for evaluating occlusion-based explanation (OBE). The OCT dataset includes about 84,000 optical coherence tomography retinal images with 4 classes: CNV, DME, DRUSEN, and NORMAL; CNV (choroidal neovascularization), DME (diabetic macular edema), and DRUSEN are varieties of diabetic retinopathy. The Chest X-Ray dataset has about 6,000 X-ray images with three classes: VIRAL, BACTERIAL, and NORMAL; VIRAL and BACTERIAL are varieties of pneumonia. The HAR dataset is a time series dataset of sensor data collected from body worn accelerometers and gyroscopes at 50 Hz and has 6 modalities (acceleration and orientation along x,y,z axes). It has about 10,000 data points with each having a window size of 2.56 seconds and has six classes: SITTING; STANDING; WALKING; WALKING UP; WALKING DOWN; and LAYING. Both the OCT dataset and the Chest X-Ray dataset are from a recent radiology study that applied deep CNNs to detect the respective diseases. The ImageNet datasaet is a benchmark dataset in computer vision from which a sample of 1,000 images with 200 classes is used. The HAR dataset is also a benchmark dataset used for human activity recognition. For occlusion-based explanations, a sample (n=5) of fixed-angle trail camera videos with 106 seconds of video data is used.

Figure 20A:
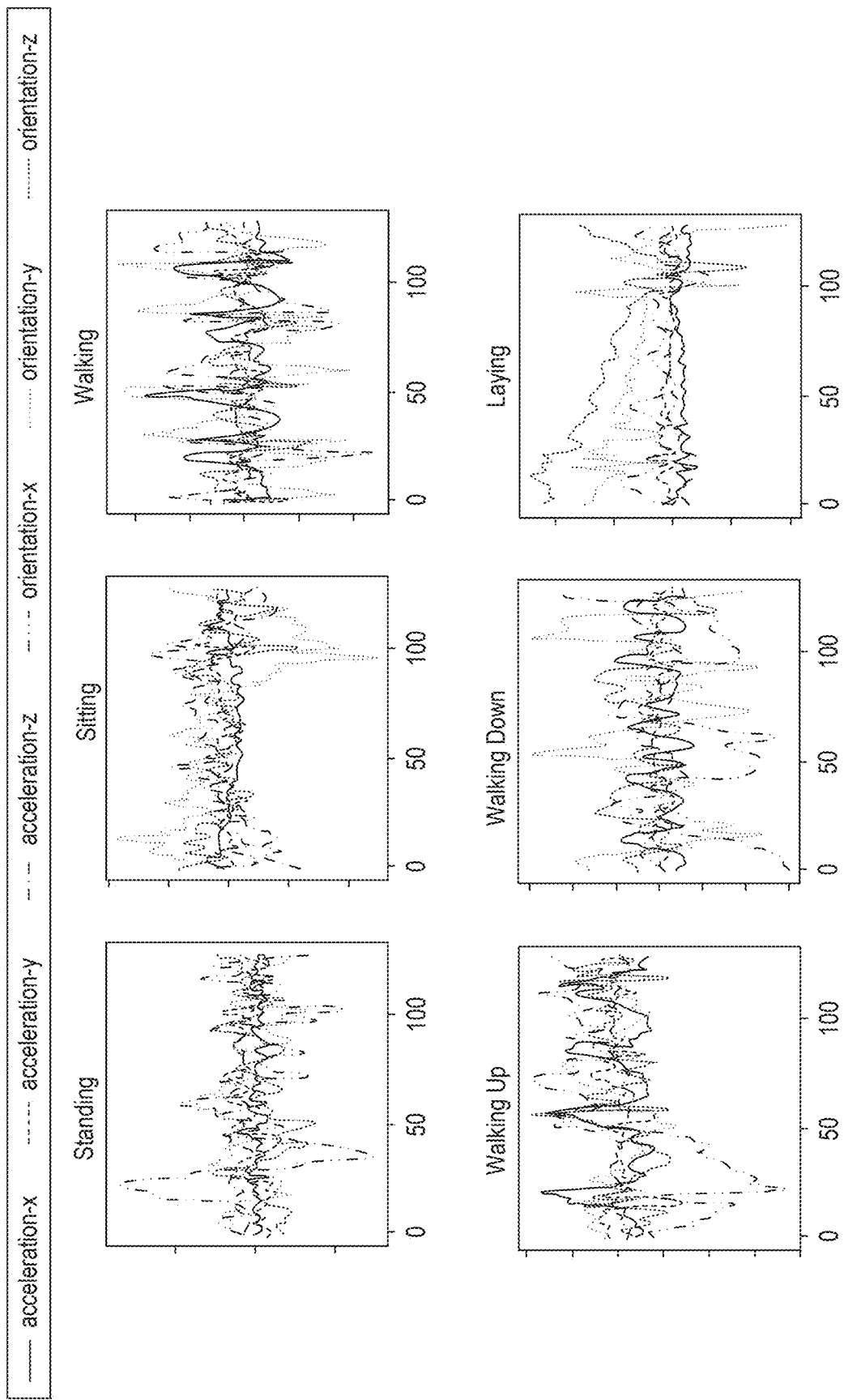
FIG. 20 depicts examples of outputs for occlusion-based explanation (OBE) tasks for sample time series windows corresponding to difference activities, in accordance with some example embodiments.

For occlusion-based explanations on image data, 3 diverse ImageNet-trained deep convolutional neural networks are used: VGG16 [9], ResNet18 [35], and Inception3 [36]. They complement each other in terms of model size, architectural complexity, computational cost, and our predicted theoretical speedups (see, e.g., FIG. 3). For the OCT and Chest X-Ray datasets, the 3 convolutional neural networks were fine-tuned by retraining their final fully-connected layers as per standard practice. The occlusion-based explanation heatmaps are plotted using Python Matplotlib's imshow method using the jet_r color scheme. The maximum threshold may be set to min(1, 1.25p) and minimum to 0.75p, where p is predicted class probability on a given image. All images are resized to the input size required by the convolutional neural networks (224×224 for VGG16 and ResNet18; 299×299 for Inception3) with no additional preprocessing. For occlusion-based explanations on the HAR dataset, a custom 1-dimensional convolutional neural network is used. The architecture of the convolutional neural network is similar to other 1-dimensional convolutional neural networks used in similar tasks in practice and is shown in FIG. 20(*a*). A window size of 2.56 seconds is used and after training it yielded a test accuracy of 85%. For object recognition in videos, an ImageNet-trained VGG16 model was used to recognize animals from video frames. All central processing unit-based experiments were executed with a thread parallelism of 8.

With a focus on a frequent occlusion-based explanation scenario of producing a whole heatmap, G may be automatically created ("non-interactive" mode) with an occlusion patch of size 16 and stride of 4. The evaluation compares two variations of the machine learning engine 110, one using incremental inference and the other using approximate inference optimizations. The main baseline may be Naive, which is the current dominant practice of performing full inference for occlusion-based explanation with batching only. Another baseline on graphic processing units may be Naive Inc. Inference-Exact, which is a direct implementation of Algorithm 1 in PyTorch/Python without using the GPU-optimized CUDA kernel. Note that Naive Inc. Inference-Exact is not relevant on CPU.

Figure 17:
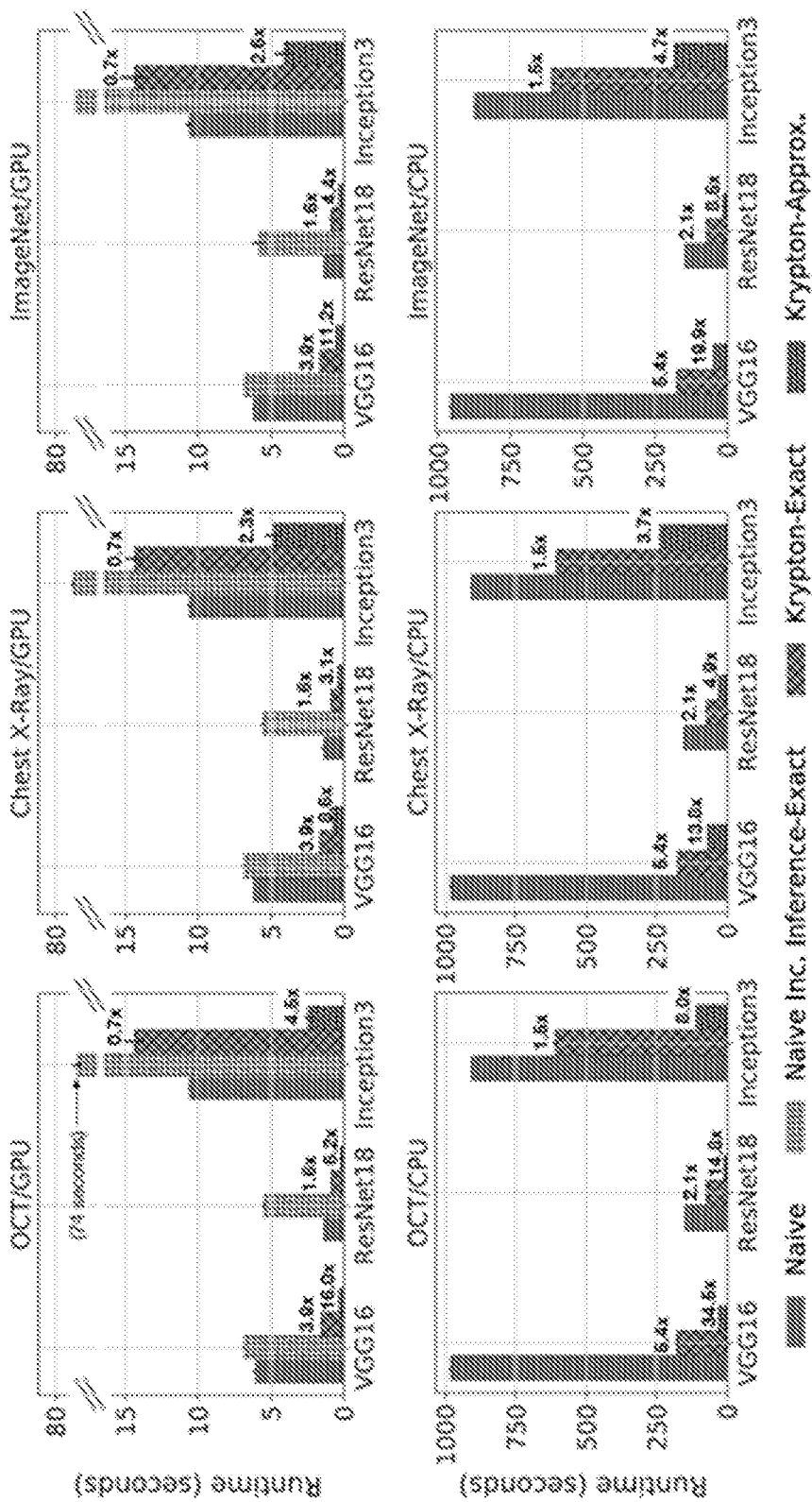
FIG. 17 depicts graphs illustrating an improvement in the runtime associated with query-based convolutional neural network inferences, in accordance with some example embodiments.

The adaptive drill-down parameters may be set based on the semantics of each dataset's prediction task. For the OCT dataset, since the region of interest is likely to be small, the evaluzation is performed with $r_{drill-down}$=0.1 and target=5. For the Chest X-Ray dataset, the region of interest can be large, which is why the evaluation is performed with $r_{drill-down}$=0.4 and target=2. For the ImageNet dataset, which is in between, the evaluation applies default values of $r_{drill-down}$=0.25 and target=3. Throughout, τ may be auto-tuned with a target Structural Similarity (SSIM) Index of 0.9. All GPU-based experiments use a batch size of 128; for CPUs, the batch size is 16. FIG. 17 presents the results.

Overall, the machine learning engine 110 performing incremental inference may offer significant speedups across the board on both GPU and CPU, with the highest speedups seen with the approximate inference optimizations on the OCT dataset with VGG16 (e.g., 16× on GPU and 34.5× on CPU). The highest speedups for exact incremental inference were also observed on the VGG16 (e.g., 3.9× on GPU and 5.4× on CPU). The speedups for exact incremental inferences are identical across datasets for a given convolutional neural network, since it does not depend on the image semantics, unlike when approximate inference optimizations are applied due to its parameters. The approximate inference optimization sees the highest speedups on the OCT dataset at least because auto-tuning yielded the lowest $r_{drill-down}$, highest target speedup, and lowest $\tau$ on that dataset.

The speedups are lower with ResNet18 and Inception3 than VGG16 due to their architectural properties (kernel filter dimensions, stride, etc.) that make the projective field grow faster. Moreover, Inception3 has a complex directed acyclic graph (DAG) architecture with more branches and depth-wise concatenation, which limits GPU throughput for incremental inference. In fact, exact incremental inferences on GPU shows a minor slow-down (0.7×) with Inception3. But the approximate inference optimization still offers speedups on GPU with Inception3 (up to 4.5×). Moreover, ResNet18 and VGG16 are shown to almost near their theoretical speedups (see FIG. 6) but Inception3 does not. Note that the theoretical speedup definition only counts FLOPs and does not account for memory stalls.

Figure 18A:
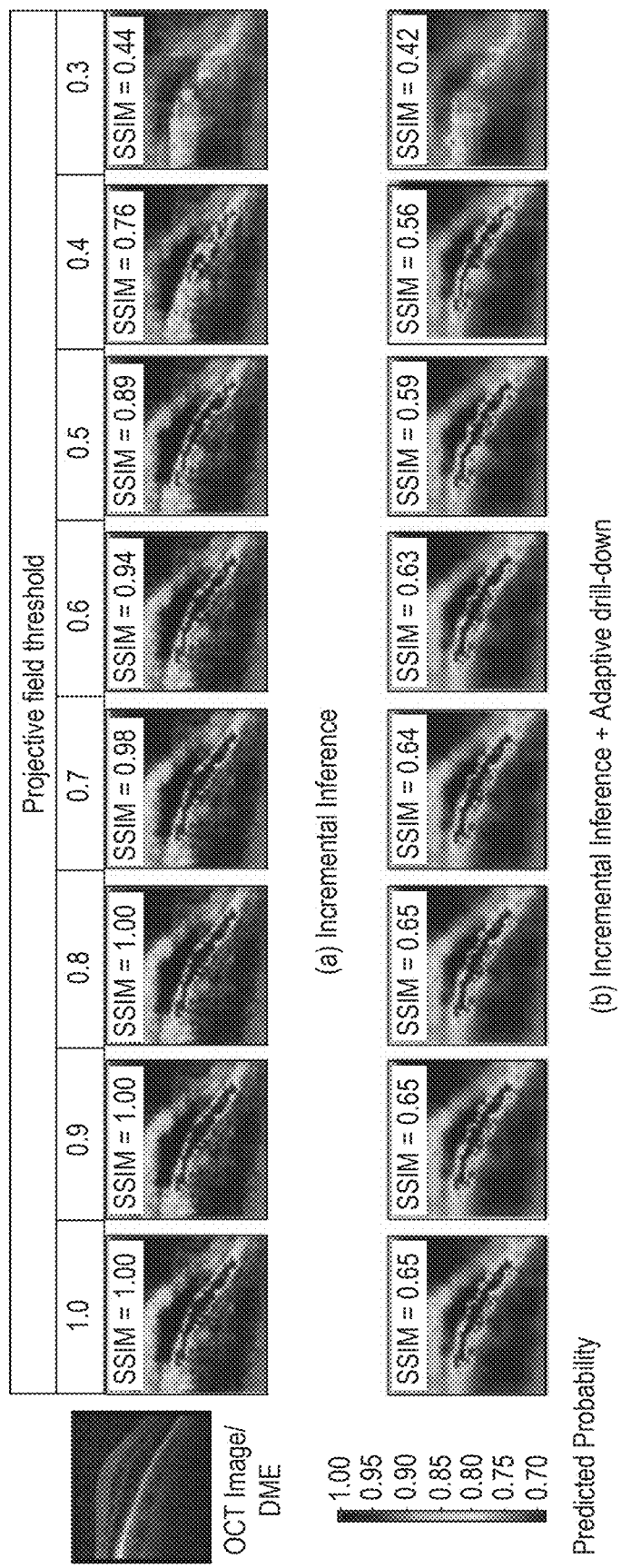
FIG. 18 depicts examples of heatmaps generated as a result of occlusion-based explanation (OBE) tasks, in accordance with some example embodiments.
Figure 18B:
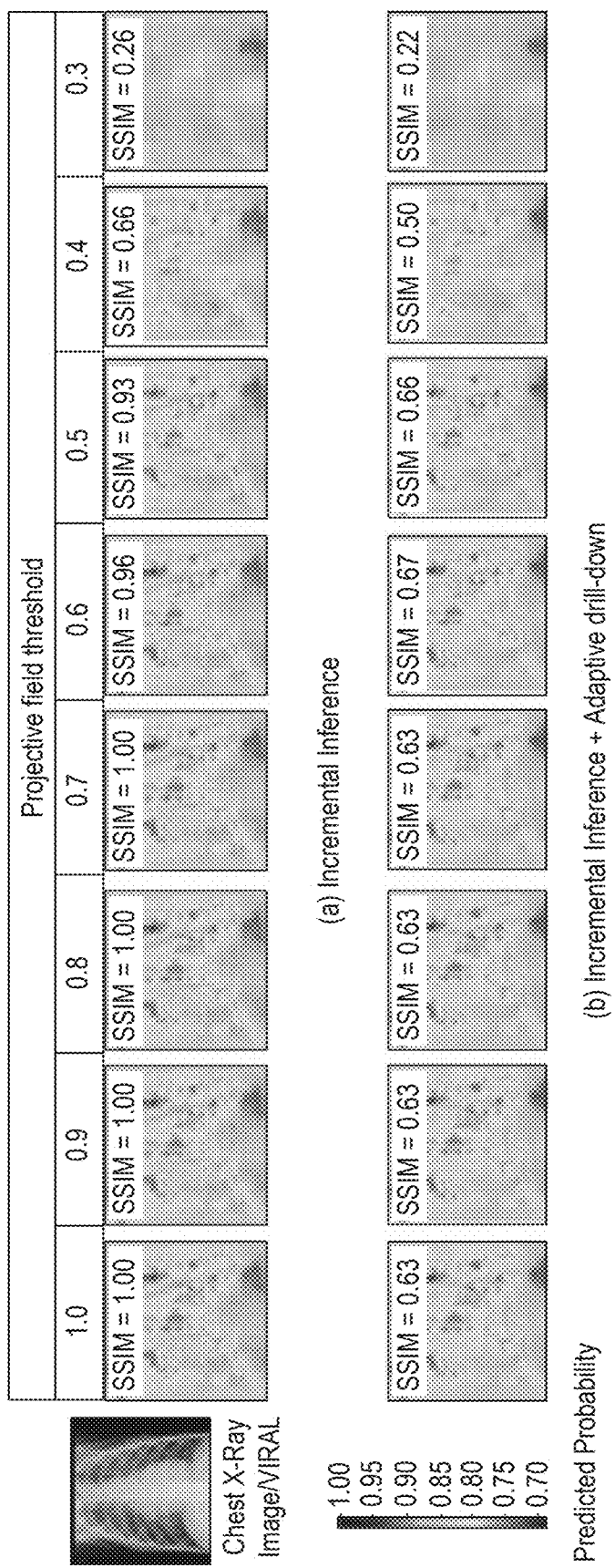
Figure 18C:
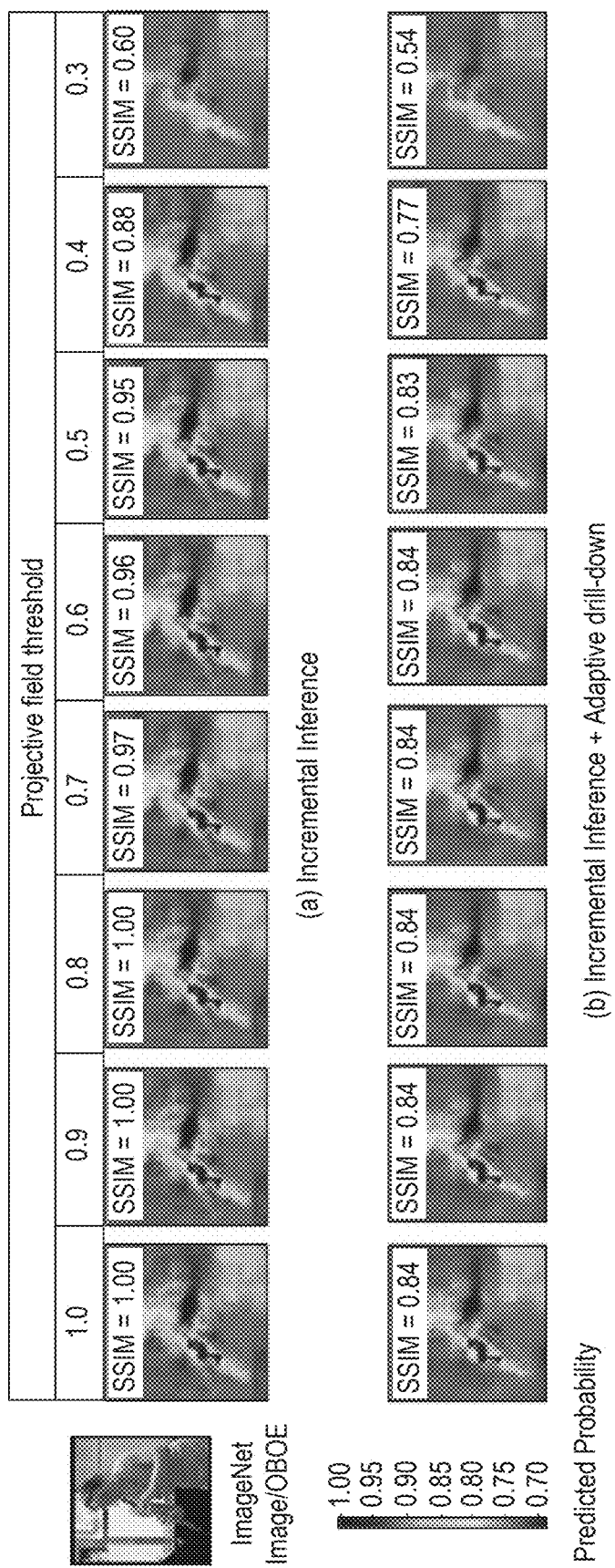
Figure 19:
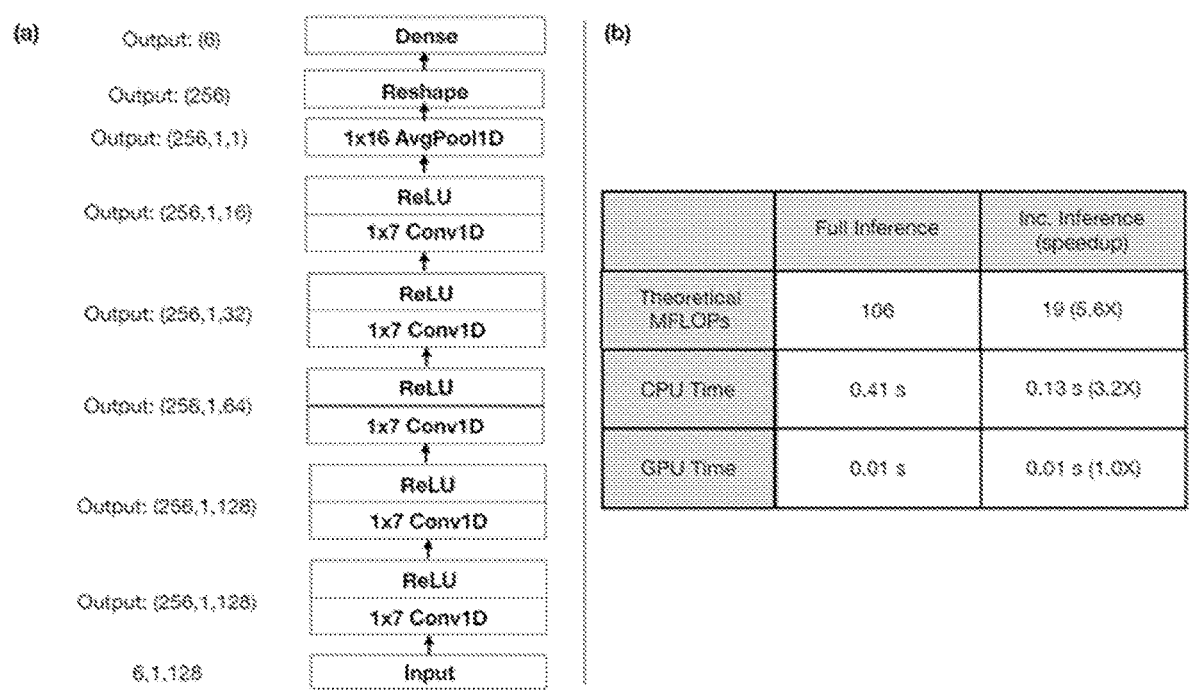
FIG. 19 depicts an improvement in the runtime associated with a one-dimensional convolutional neural network performing query-based inferences, in accordance with some example embodiments.

The speedups are also higher on CPU than GPU because CPU suffers less from memory stalls during incremental inferences. However, absolute runtimes are much lower on GPU as expected. Overall, the machine learning engine 110 performing incremental inference may substantially reduce the runtimes associated with occlusion-based explanations for multiple datasets and types of convolutional neural networks. An experiment was also ran in the "interactive" mode by reducing |G|. As expected, speedups go down with |G| due to the reduction in amortization benefits. FIG. 18 presents occlusion heatmaps for a sample image from each dataset with (a) incremental inference for different projective field threshold values and (b) incremental inference with adaptive drill-down for different projective field threshold values. The predicted class label for the OCT, Chest X-Ray, and ImageNet datasets are DME, VIRAL, and OBOE respectively.

Figure 20B:
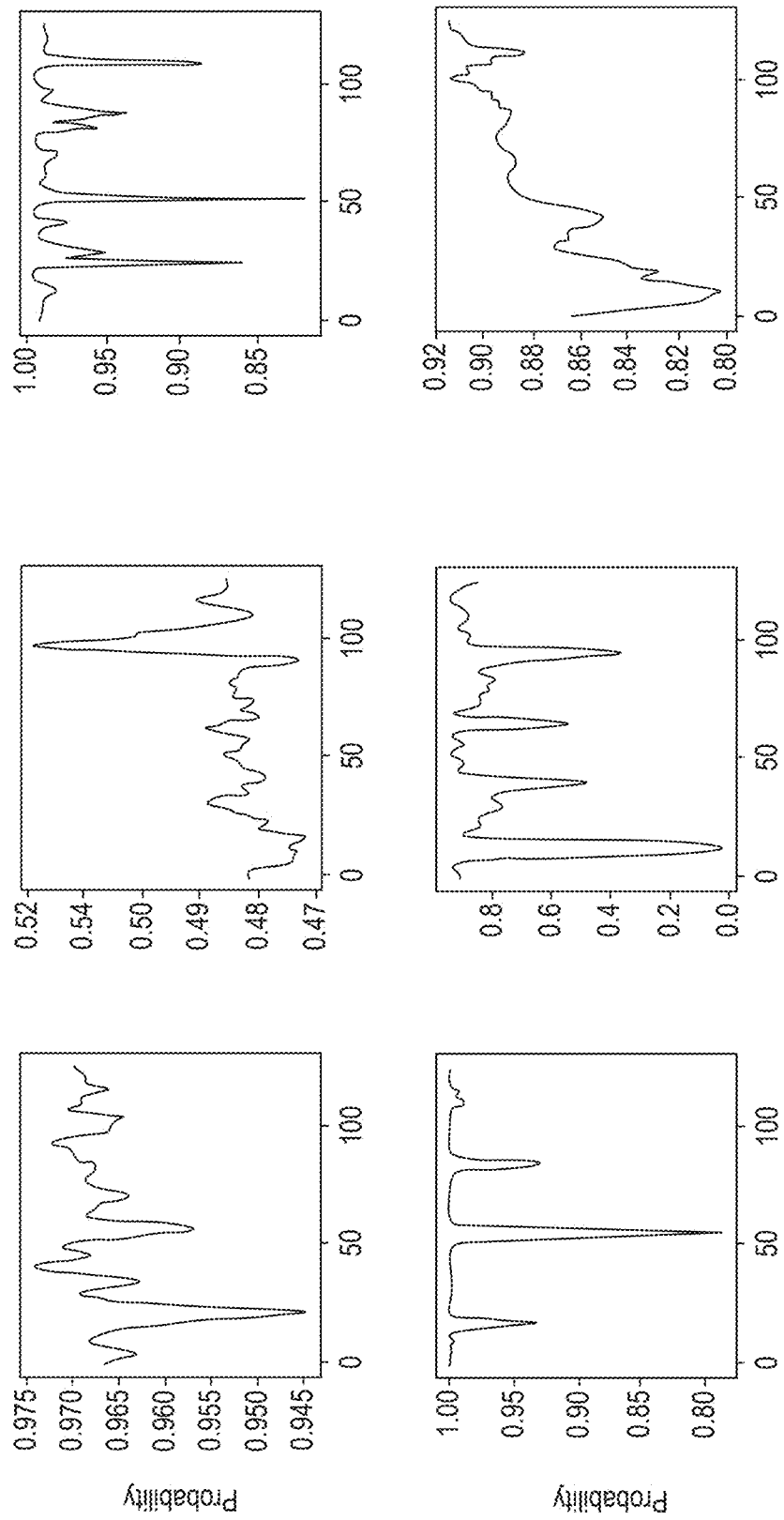

The time required to perform a full convolutional neural network inference is compared to the time required to perform an incremental inference for performing occlusion-based explanation using a convolutional neural network trained to identify different human postures from body worn sensor data. A zero valued occlusion patch of size 4 with a stride of 1 and a batch size of 125 is used. The runtime comparison is performed for central processing unit (CPU) and graphics processing unit (GPU) environments. The results of the comparison are shown in FIG. 20(b). As shown, a single full inference through a 1-dimensional convolutional neural network requires performing 106 mega floating point operations (MFLOPs) whereas for an incremental inference, the resource consumption drops to 19 MFLOPs to result in a theoretical 5× speedup in runtime.

It should be noted that the quantity of computations performed by a typical 1-dimensional convolutional neural network may be comparatively smaller than the quantity of computations performed by a 2-dimensional convolutional neural network operating on images. For example, VGG16 performs 16 GFLOPs versus 19 MFLOPs by a 1-dimensional convolutional neural network. In a CPU environment, performing incremental inference may reduce the runtime of occlusion-based explanation for a single time series window by 3×. However, no speedups were observed in a GPU environment because on a GPU, the relatively small quantities of computations needed for occlusion-based explanations means that the overhead associated with invoking GPU kernels dominates the overall runtime. FIG. 20 presents visuals on how the probability for the predicted class label change for a sample of time series windows as an occlusion patch is slid across the time-series data.

Figure 21:
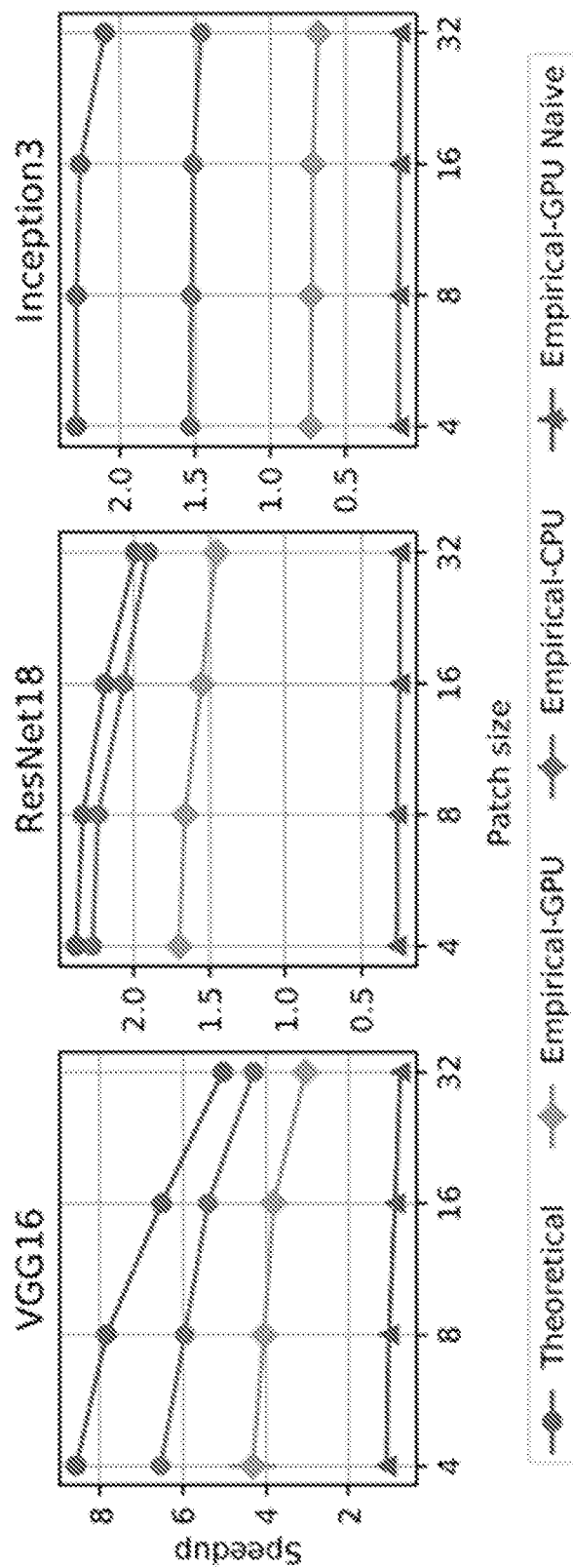
FIG. 21 depicts graphs illustrating the speedup achieved with incremental inference optimization, in accordance with some example embodiments.

The foregoing optimizations are also evaluated individually in the context of occlusion-based explanations (OBE). For example, the speedups achieved by the machine learning engine 110 may be compared to a naïve approach (e.g., batched inference) on a central processing unit (CPU) and a graphics processing unit (GPU), termed Empirical-CPU and Empirical-GPU respectively, against the theoretical speedups. For incremental inference, the evaluation may be performed for a variety of patch sizes and the stride set to 4. FIG. 21 shows the results. As expected, the speedups go down as the patch size increases. Empirical-GPU Naive yields no speedups because it does not use a GPU-optimized kernel, while Empirical-GPU does. But Empirical-CPU is closer to theoretical speedup and almost matches it on ResNet18. Thus, there may still some room for improvement to improve the efficiency of incremental inference in both environments.

Figure 22:
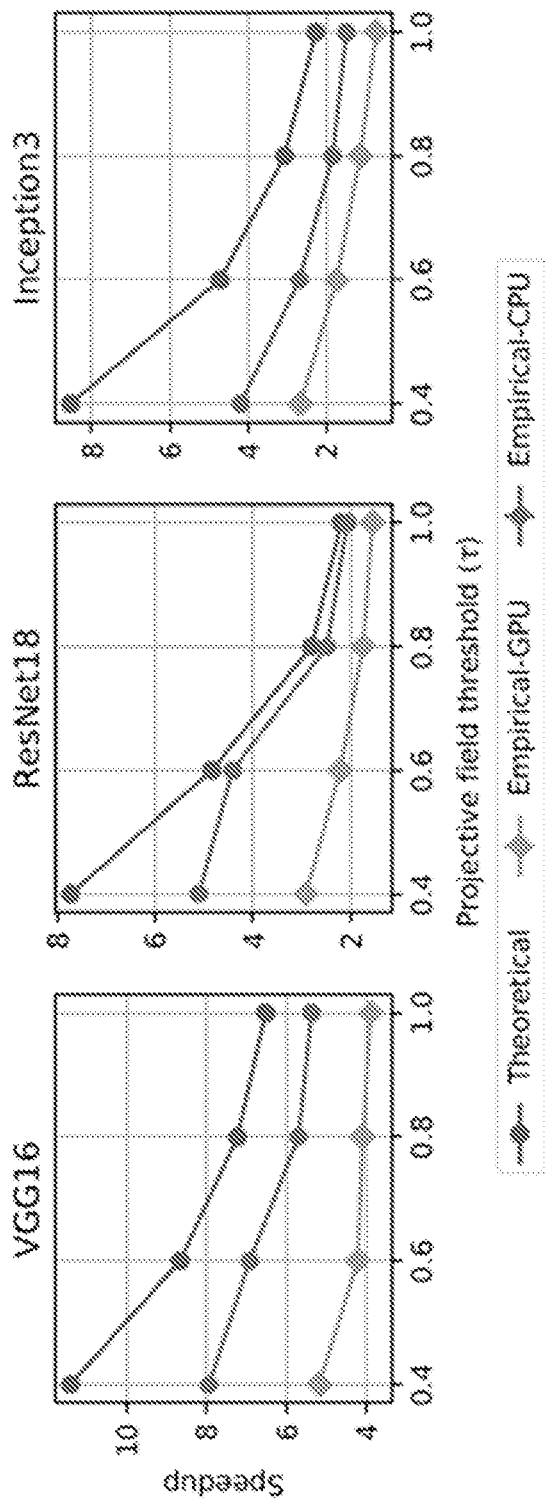
FIG. 22 depicts graphs illustrating the speedup achieved with incremental inference and projective field thresholding, in accordance with some example embodiments.

To evaluate the effects achieved by projective field thresholding, the value of $\tau$ may be varied from 1.0 (no approximation) to 0.4. Adaptive drilldown is disabled for this evaluation although the adaptive drilldown optimization may be built on top of incremental inference. The occlusion patch size for the evaluation is 16 and stride is 4. FIG. 22 22 shows the results. The speedups go up steadily as $\tau$ drops for all three variations of convolutional neural networks. Once again, Empirical-CPU nears the theoretical speedups on ResNet18, but the gap between Empirical-GPU and Empirical-CPU remains due to the disproportionate impact of memory stalls on GPU. Overall, this approximation offers some speedups in both environments, but has a higher impact on CPU than GPU.

Figure 23:
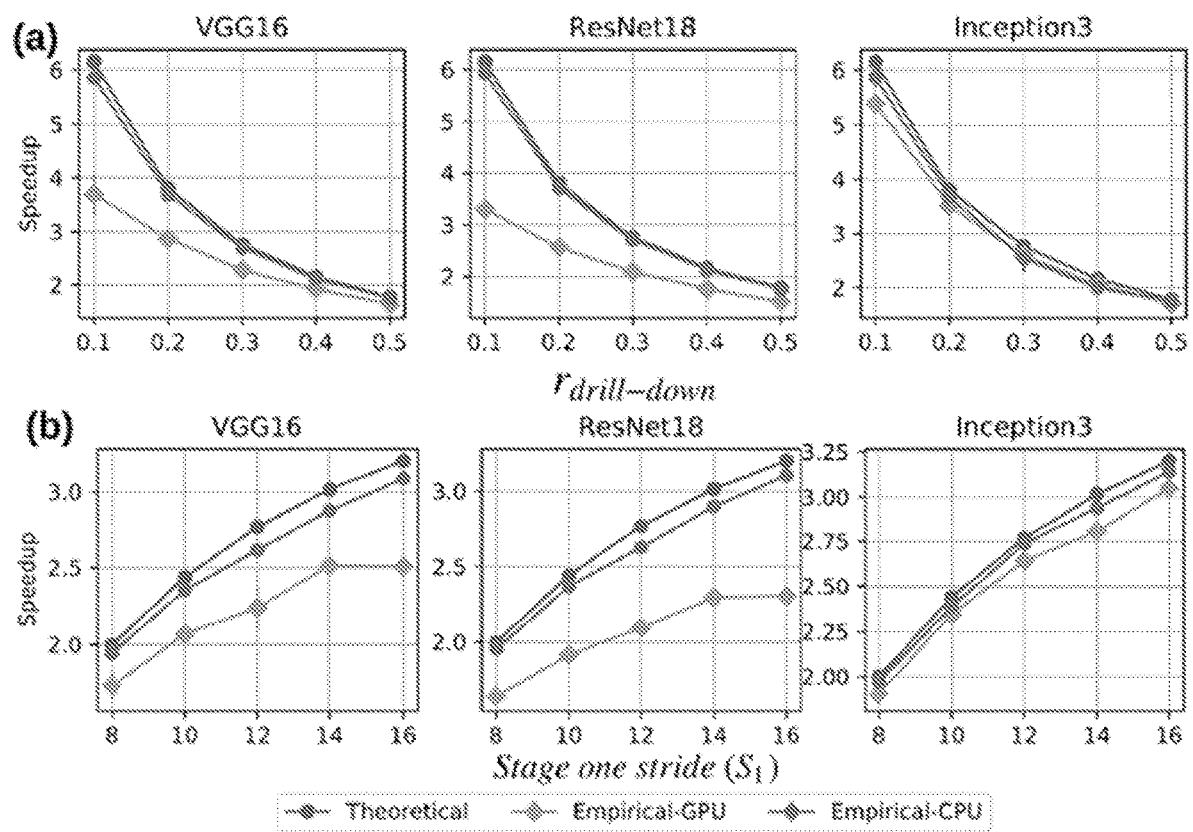
FIG. 23 depicts graphs illustrating the speedup achieved with incremental inference and adaptive drill-down, in accordance with some example embodiments.

The effects of adaptive drill-down on top of incremental inference but without the optimization of projective field thresholding is evaluated with an occlusion patch size of 16 and stage two stride of $S_2=4$. The evaluation is first performed with varying the value of $r_{drill-down}$ while fixing the stage one stride at $S_1=16$. FIG. 23(a) shows the results. The evaluation is next performed with various stage one strides $S_1$ and a fixed value for $r_{drill-down}=0.25$. These results are shown FIG. 23(b). As expected, the speedups go up as the value of $r_{drill-down}$ goes down or as the size of the stage one stride $S_1$ goes up, since fewer re-inference queries are generated in both cases. Empirical-CPU almost matches the theoretical speedups across the board. In fact, even Empirical-GPU almost matches theoretical speedups on Inception3. Empirical-GPU flattens out at high $S_1$, since the number of re-inference queries drops, thus resulting in diminishing returns for the benefits of batched execution on GPU. Overall, the optimization of adaptive drill-down has a major impact on speeding up occlusion-based explanation for various types of convolutional neural networks in both environments.

Figure 24:
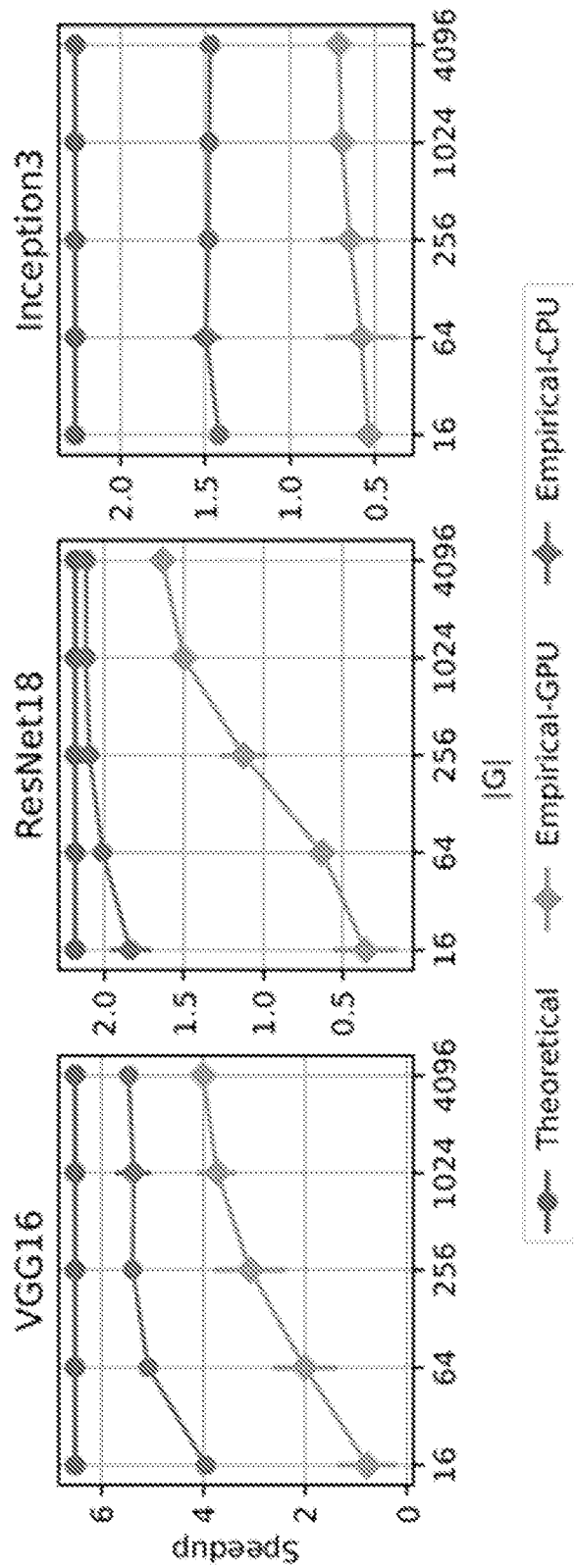
FIG. 24 depicts graphs illustrating interactive mode execution of incremental inference, in accordance with some example embodiments.

The effects of interactive-mode incremental inference execution (no approximate inference optimizations) may be evaluated with Gs of different sizes. Similar to non-interactive mode experiments, all experiments are run in batched mode with a batch size of 16 for CPU based experiments and a batch size 128 for GPU based experiments. If the size of G (formally |G|) or the remainder of G is smaller than the batch size, that value is used as the batch size (e.g. |G|=16 results in a batch size of 16). These results are shown in FIG. 24.

Figure 25:
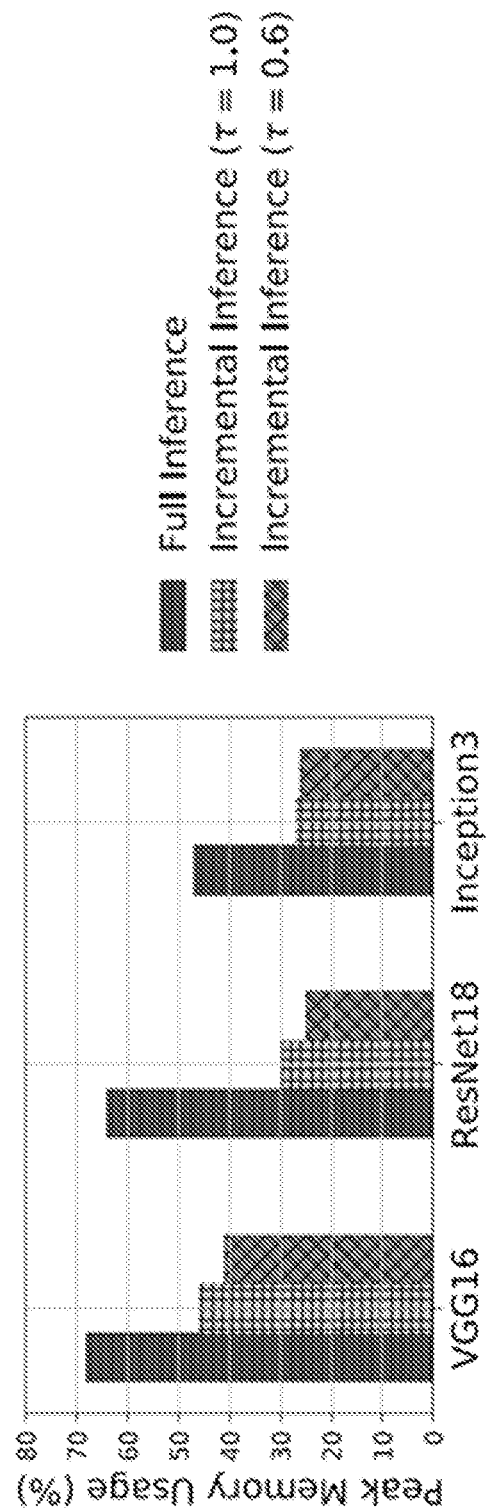
FIG. 25 depicts a graph illustrating a peak graphic processing unit (GPU) memory usage when performing convolutional neural network inference, in accordance with some example embodiments.

The memory overhead associated with incremental view maintenance (IVM) may be evaluated relative to full convolutional neural network inference with no projective field thresholding ($\tau=1.0$) and a projective field thresholding value of $\tau=0.6$. The peak GPU memory utilization while different convolutional neural network models perform inference on image batches of size 128 are recorded, with the result shown in FIG. 25 indicating that incremental inference approach can enable up to 58% lower memory overhead. The machine learning engine 110 materializes a single copy of all layers of a convolutional neural network corresponding to the unmodified image and reuses it across a batch of occluded images with incremental view maintenance. For incremental view maintenance, the size of required memory buffers may be much smaller than full inference because only the updated patches are propagated.

Figure 26:
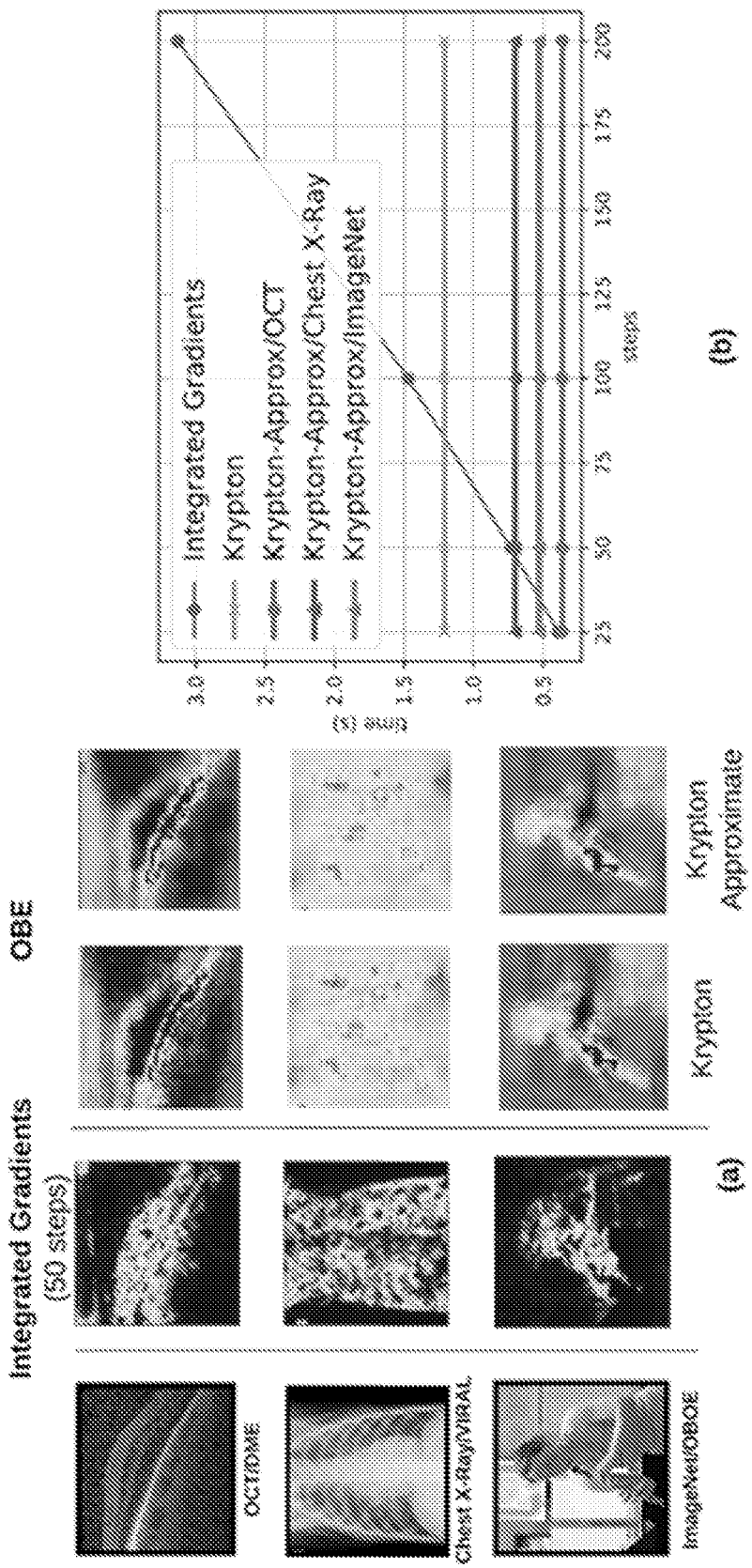
FIG. 26 depicts a comparison between an integrated gradients method and occlusion-based explanation (OBE), in accordance with some example embodiments.

Since explaining the predictions of deep convolutional neural networks is still an active area of research, techniques other than occlusion-based explanation (OBE) may be used for the same task. For example, integrated gradients (IG) is one alternative technique. The runtime and visual quality of the heatmaps generated by the integrated gradient method and by occlusion-based explanation are evaluated for three representative images from the datasets (see FIG. 26). In general, occlusion-based explanations may better localize relevant regions from the input images. The integrated gradient method requires tuning a hyper-parameter called steps, which determines the number steps to be used in the gradient integration approximation. Increasing steps may improve the runtime and heatmap quality of the integrated gradient method.

The effects of incremental inference on the runtime of object recognition in videos (ORV) may be analyzed by comparing the full convolutional neural network inference time versus incremental inference time for running object recognition on a sample of wildlife trail-camera videos. The frame differing threshold may be set to 40 and the frame sampling rate may be 30 frames per second. For CPU, the maximum batch size may be 1 whereas for GPU, the maximum batch size is 64. FIG. 27 presents the results.

At the selected frame differencing threshold value and frame sampling rate, the approximate incremental inference approach for object recognition in vidoes achieves 89% accuracy. Performing full inference for the task requires 53.4 tera floating point operations (TFLOPs) and performing incremental inference drops that computational cost to 9.3 TFLOPs to achieve a 5.8× theoretical speedup. On CPU, the machine learning engine 110 is able to yield a 4.4× speedup and drop inference time from 41.6 minutes to 9.4 minutes. As most use-cases for video-inferencing are on edge devices, CPU-based systems are likely to be the more common choice for applications requiring object recognition in videos. Hence, incremental inference optimizations are more likely to be applicable in those settings.

Figure 28:
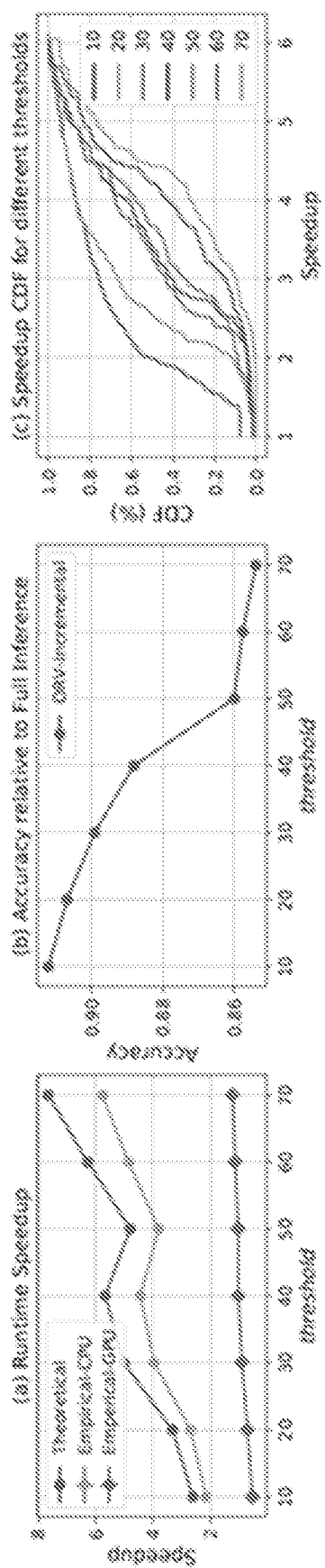
FIG. 28 depicts graphs illustrating the performance associated with incremental object recognition for videos (ORV), in accordance with some example embodiments.

The effects of frame differencing threshold may be evaluated by varying the frame differing threshold for the task of object recognition in videos with incremental inference and compare its effects on runtime and accuracy. The frame rate of the videos may be fixed at 30 frames per second. For CPU, the maximum batch size is 1 while for GPU, the maximum batch size is 64. FIG. 28 presents the results. On CPU, object recognition in videos with incremental inference provides significant speedups at all thresholds, though higher thresholds do perform better than lower ones. This may be due to a lower threshold causing larger areas to be selected for recalculation, increasing the runtime and inference costs. The effect of a lower threshold may be mitigated by the choice to select only the largest region for recalculation, but higher thresholds continue to have better runtime performance. The frame differencing threshold also presents a tradeoff between runtime and accuracy, as these lower thresholds with larger areas of recalculation make it more likely that the incremental inference system will produce an accurate result compared to the full inferencing system. For this particular dataset, a threshold value of 40 was found to provide an accuracy of 89% with 5× speedup on CPU.

The speedup does not monotonically increase with the threshold value. Instead, a sudden drop in speedup is observed from a threshold value 40 to a threshold value 50 with the speedups increasing thereafter. Thresholds above 40 may have fewer full materializations than those below 40 because a too large threshold value eliminates too large of a region in each frame differencing. As such, even though a larger threshold value may minimize patch size, scene separation is unlikely to ever trigger. While this phenomenon reduces computations performed by full inference, it adversely affects the subsequent incremental inference operations by selecting relatively larger regions due not picking an appropriate base frame. In other words, while the sizes of the changed regions are not too large, they are also not too small. As a result, the gains achieved by reduced full inferences are not sufficient to offset the added computations of larger incremental inference regions. The speedup CDF plots for thresholds 40 and 50 also confirm this observation. For example, CDF plot for 50 is towards the left of the CDF plot for 40 at lower speedup values. This issue may be largely data dependent. The intensity of changes across frames would affect the prevalence of this phenomenon. It also explain the sudden drop in accuracy at threshold 50. Since this problem only begins past threshold 40, all subsequent thresholds show significantly lower accuracy.

Figure 29:
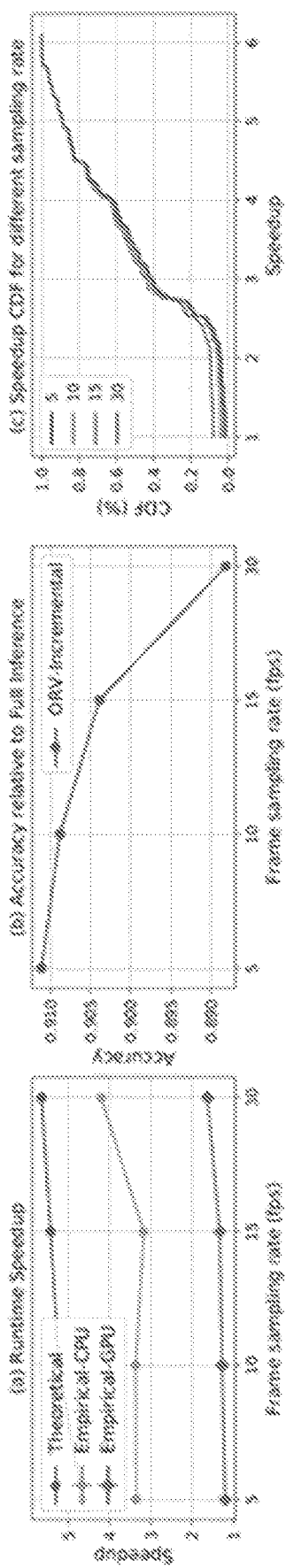
FIG. 29 depicts graphs illustrating the performance associated with incremental object recognition for videos (ORV), in accordance with some example embodiments.

The effects of frame sampling rate may be evaluated by varying the frame sampling rate for object recognition in videos with incremental inference and comparing its effects on runtime and accuracy. For these experiments, the frame differencing threshold may be fixed at 40. On CPU, the maximum batch size is 1 while for GPU, the maximum batch size is 64. FIG. 29 presents the results.

For object recognition in videos (ORV) with incremental inference and object recognition in videos with full inference, the relationship between the sampling rate and runtime is generally linear and the results are not surprising. The speedups remain quite consistent on CPU systems, ranging between 3-4.5× improvements. On GPU, there appears to be a more consistent improvement, but the rate of change is slight, and the difference is between a 1-1.6× improvement. Accuracy also appears to be affected, being reduced slightly as the frame sampling rate increases. This may be attributable to the fact that between two directly adjacent frames, there may not be a large change region that gets past the threshold, as not enough time has passed for any change to occur. Incremental inference may be applied to a very small portion of the image, thus limiting the model's ability to update to the new inputs.

Overall, the foregoing experiments show that the machine learning engine 110, by applying incremental inference with (or without) various optimizations, can substantially accelerate convolutional neural network inference for occlusion-based explanation (OBE) and object recognition in videos (ORV) workloads. For occlusion-based explanation, it yields up to 16× speedups on GPU and 34.5× speedups on CPU whereas for object recognition in videos, it yields up to 4.4× speedups on CPU. The benefits of these optimizations may depend on the architectural properties of the convolutional neural network such as the convolutional neural network 115. The effects of the approximate inference optimization may further depend on the dataset's properties due to their tunable parameters, which the machine learning engine 110 is able to tune automatically or set by the user. Finally, the machine learning engine 110 sees higher speedups on CPU than GPU but the runtimes are much lower on GPU. The optimizations applied by the machine learning model 110 therefore help reduce runtimes for occlusion-based explanation (OBE) and object recognition in videos (ORV) by improving efficient utilization of existing resources rather than increasing the quantity of resources.

Figure 30A:
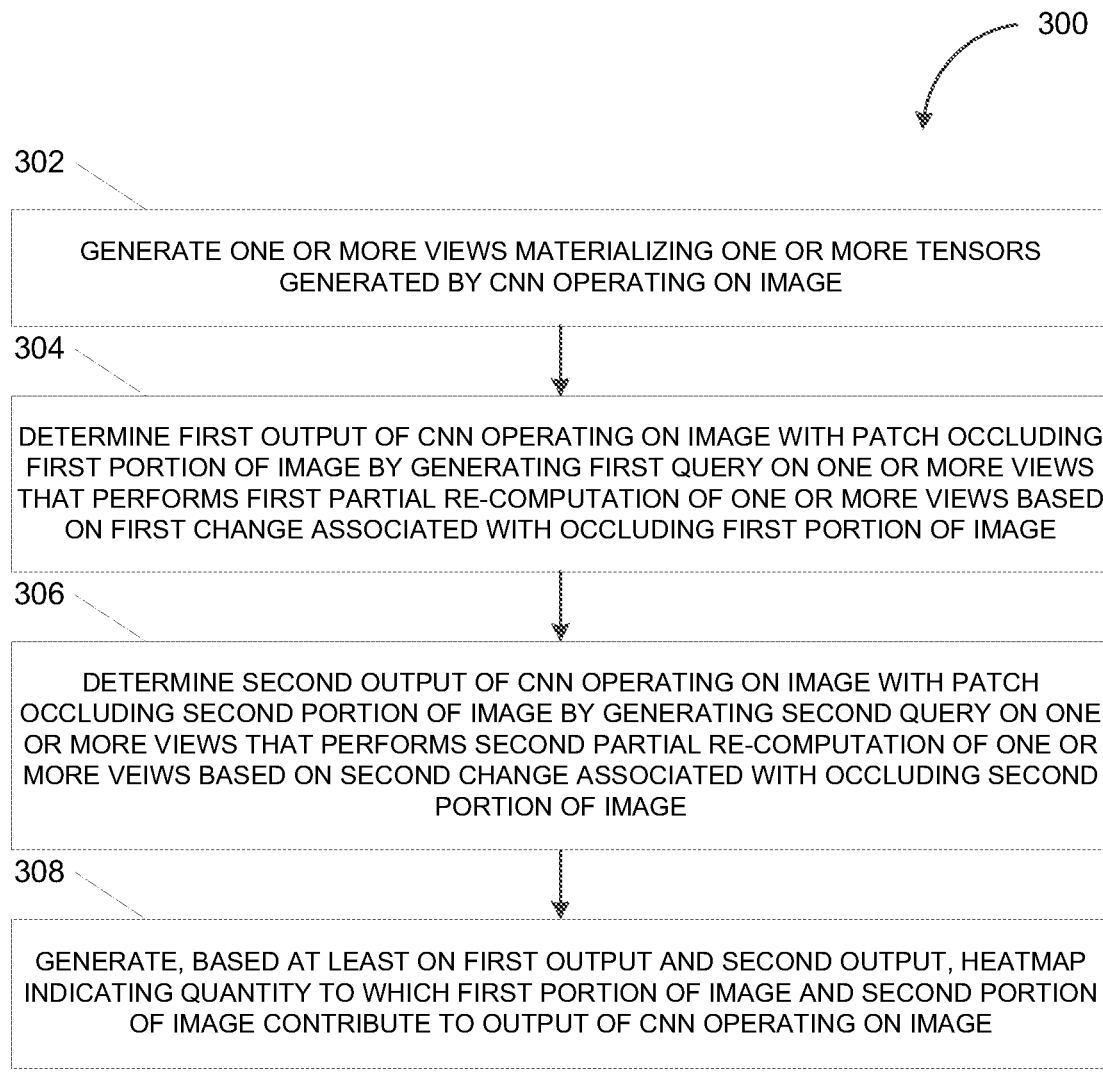
FIG. 30A depicts a flowchart illustrating an example of a process for occlusion-based explanation, in accordance with some example embodiments.

FIG. 30A depicts a flowchart illustrating an example of a process 300 for occlusion-based explanation, in accordance with some example embodiments. Referring to FIGS. 1-29 and 30A, the process 300 may be performed by the machine learning engine 110.

At 302, the machine learning engine 110 may generate one or more views materializing one or more tensors generated by a convolutional neural network operating on an image. For example, the machine learning engine 110 may generate one or more views materializing the tensors produced by the convolutional neural network 115 operating on the original image (e.g., without any occluding patches). The convolutional neural network 115 may be organized as layers of various types, each of which transforming one tensor (e.g., a multidimensional array that is typically 3-D) into another tensor. For instance, the convolution layer may use image filters from graphics to extract features, but with parametric filter weights (learned during training). The pooling layer may subsample features in a spatial-aware manner, the batch-normalization layer may normalize the output tensor, the non-linearity layer may apply an element-wise non-linear function (e.g., ReLU), and the fully-connected layer may include an ordered collection of perceptrons.

At 304, the machine learning engine 110 may determine a first output of the convolutional neural network operating on the image with a patch occluding a first portion of the image by generating a first query on the one or more views that performs a first partial re-computation of the one or more views based on a first change associated with occluding the first portion of the image. In some example embodiments, the performance of the convolutional neural network 115 performing the task of occlusion-based explanation may be optimized by incremental inferences. In some example embodiments, instead of responding to each re-inference request by rerunning each inference from scratch, each re-inference request may be treated as an incremental view maintenance (IVM) query on the "views" formed by the materialized tensors of the convolutional neural network 115. Computational redundancy may be minimized by rewriting the incremental view maintenance (IVM) queries to reuse the materialized views as much as possible and to re-compute only what is necessary.

At 306, the machine learning engine 110 may determine a second output of the convolutional neural network operating on the image with the patch occluding a second portion of the image by generating a second query on the one or more views that performs a second partial re-computation of the one or more views based on a second change associated with occluding the second portion of the image. In some example embodiments, the machine learning engine 110 may apply combine, with incremental inference, additional approximate optimizations such as projective field thresholding, adaptive drill-down, and/or the like. For example, projective field thresholding includes truncating the projective field from growing beyond a given threshold fraction τ (0<τ≤1) of the output size, meaning that inferences in subsequent layers of the convolutional neural network 115 are approximate. Alternatively and/or additionally, the adaptive drill-down optimization may be performed in two stages to first use a lower resolution heatmap to identify regions of the input having the largest drops in predicted probability of the label L and selecting a proportional number of regions for a further drill-down in which the original stride value for the occlusion patch is applied to yield a portion of the heatmap at the original higher resolution.

At 308, the machine learning engine 110 may generate, based at least on the first output and the second output, a heatmap indicating a quantity to which the first portion of the image and the second portion of the image contribute to an output of the convolutional neural network operating on the image. For example, the machine learning engine 110 may generate a heatmap having different representations (e.g., colors, symbols, and/or the like) for the first portion of the image and the second portion of the image in order to indicate that the first portion of the image is more (or less) responsible for the output of the convolutional neural network 115 than the second portion of the image.

Figure 30B:
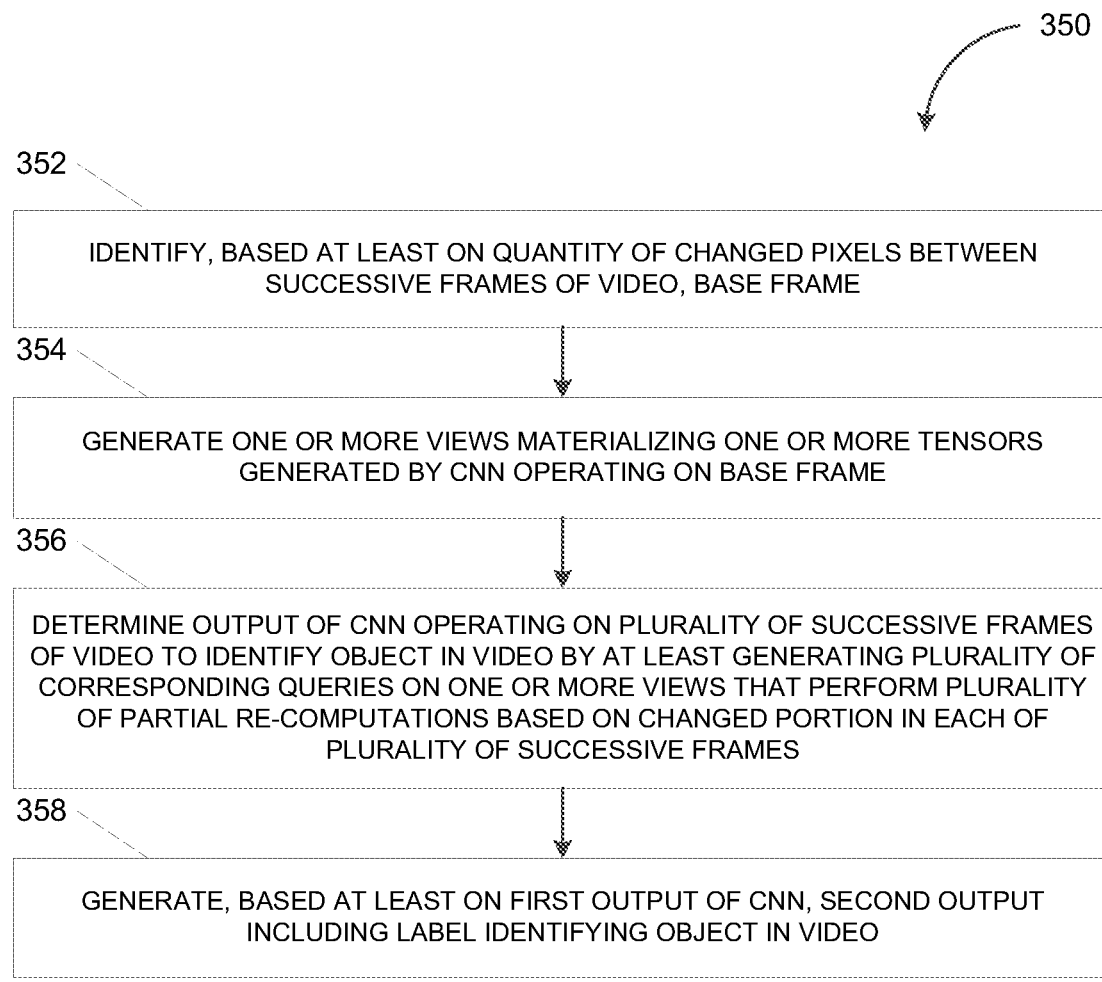
FIG. 30B depicts a flowchart illustrating an example of a process for object detection in videos, in accordance with some example embodiments.

FIG. 30B depicts a flowchart illustrating an example of a process 350 for object recognition in videos, in accordance with some example embodiments. Referring to FIGS. 1-29 and 30B, the process 350 may be performed by the machine learning engine 110.

At 352, the machine learning engine 110 may identify, based at least on a quantity of changed pixels between successive frames of a video, a base frame. In some example embodiments, the machine learning engine 110 may apply an approximate frame differencing technique to identify the single most important changed region for incremental inference in each frame. For example, approximate frame differencing may be performed based on inputs including a base_frame which is treated as the background, a new_frame from which to identify the changed region, and a threshold which will be used to identify the changed pixels. By using pixel-subtraction, the machine learning engine 110 may identify all of the changes between the current_frame and the base_frame on a per-pixel basis. Thresholding the resultant data may eliminate noise and restrict the necessary re-inferencing to a more limited scope. The machine learning engine 110 may also calculate bounding boxes for the remaining areas of difference, thereby providing a more regular shape for subsequent inference.

At 354, the machine learning engine 110 may generate one or more views materializing one or more tensors generated by a convolutional neural network operating on the base frame. For example, the machine learning engine 110 may generate one or more views materializing the tensors produced by the convolutional neural network 115 operating on the base frame. Changes in background may interfere with efforts to perform frame differencing, for example, by incorrectly identifying very large changed regions and diminishing the gains of incremental inference. To address this problem, the machine learning engine 110 may be configured to recognize the notion of a scene when performing the task of object recognition in videos. For instance, when the size of the selected changed region is larger than some significant fraction of the size of the base frame, the machine learning engine 110 may create a new scene and reset the base frame to the current frame. Upon reaching a threshold fraction, for example, the machine learning engine 110 may re-materializes all the intermediate features for the current base frame for use in subsequent incremental inference of the next scene.

At 356, the machine learning engine 110 may determine an output of the convolutional neural network operating on a plurality of successive frames of the video to identify an object in the video by at least generating a plurality of corresponding queries on the one or more views that perform a plurality of re-computations based on a changed portion in each of the plurality of successive frames. In some example embodiments, Algorithm 3, which formalizes the object recognition in videos workflow, may receive a video V, a threshold for frame differencing, a max_patch_size for scene separation, a KryptonGraph kg for performing the incremental inference, and a batch_size for batching multiple incremental inference requests. The base frame may be initialized to the first frame of the video followed by an iteration through successive frames in video V calling the procedure FrameDifferencing to find the changed region before appending the result to a batch. Two possible events may occur to trigger an incremental inference on the compiled batch of changed regions. The first event being the changed region size exceeding the max_patch_size and upon encountering a new scene, and the second being the current batch size reaching the max batch size. This max batch size may be necessary to avoid the possibility of exhausting hardware resource such as graphic processing unit (GPU) memory. Unlike in occlusion-based explanation where all patches are of a same size, changed regions in object recognition in videos are of arbitrary size. As such, when invoking incremental inference on a batch of changed regions, the machine learning engine 110 may first find the maximum size of the patches as the final patch size. This operation is formally presented in the RunIncrementalInference procedure.

At 358, the machine learning engine 110 may generate, based at least on a first output of the convolutional neural network operating on the successive frames, a second output including a label identifying the object present in the video. For example, the machine learning engine 110 may generate an output including one or more labels classifying the object appearing in the video.

Figure 31:
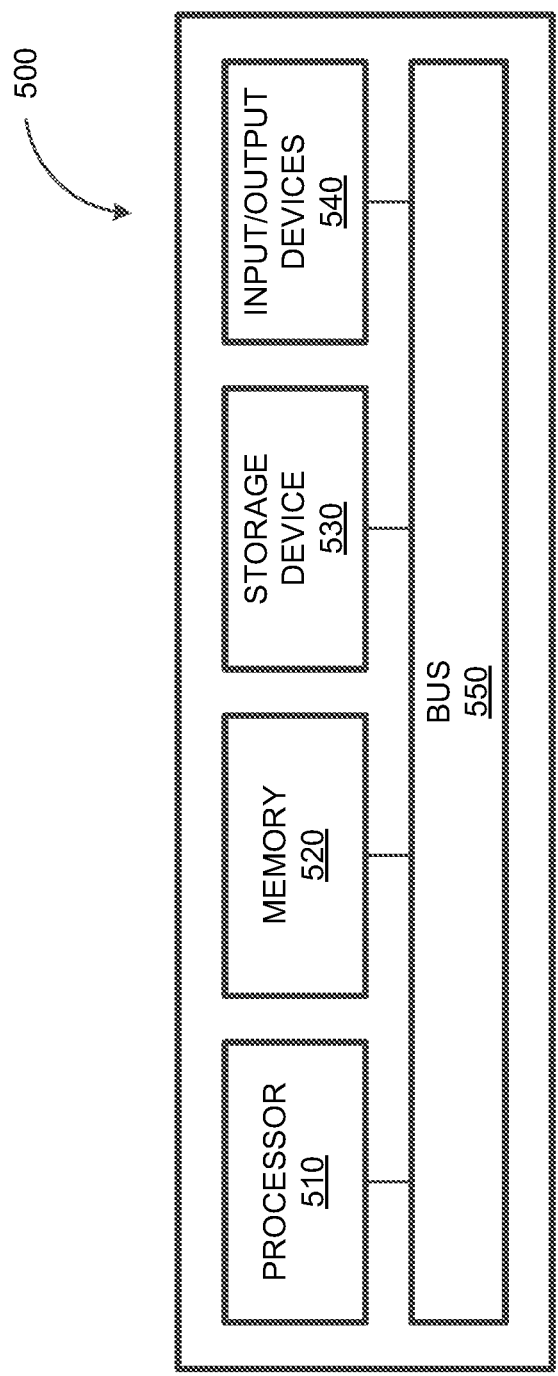
FIG. 31 depicts a block diagram illustrating an example of a computing system, in accordance with some example embodiments.

FIG. 31 depicts a block diagram illustrating a computing system 700, in accordance with some example embodiments. Referring to FIGS. 1, 2A-B, 3-29, 30A-B, and 31, the computing system 700 can be used to implement the machine learning engine 110 and/or any components therein.

As shown in FIG. 31, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. Such executed instructions can implement one or more components of, for example, the machine learning engine 110 and/or the like. In some implementations of the current subject matter, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some implementations of the current subject matter, the input/output device 740 includes a keyboard and/or pointing device. In various implementations, the input/output device 740 includes a display unit for displaying graphical user interfaces.

According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some implementations of the current subject matter, the computing system 700 can be used to execute various interactive computer software applications that can be used for organization, analysis and/or storage of data in various (e.g., tabular) format (e.g., Microsoft Excel®, and/or any other type of software). Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
at least one processor; and
at least one memory including program code which when executed by the at least one processor provides operations comprising:
generating one or more views materializing one or more tensors generated by a convolutional neural network operating on an image;
determining a first output of the convolutional neural network operating on the image with a patch occluding a first portion of the image, the first output being determined by generating a first query on the one or more views, the first query performing, based at least on a first change associated with occluding the first portion of the image, a first partial re-computation of the one or more views;
generating, based at least on the first output, a first heatmap indicating a first quantity to which the first portion of the image contributes to an output of the convolutional neural network operating on the image;
generating, at a first stride size, a second heatmap;
identifying, based at least on the second heatmap, one or more regions of the image exhibiting a largest contribution to the output of the convolutional neural network operating on the image, a quantity of the one or more regions being proportional to a threshold fraction of the image; and
determining, at a second stride size, the first output, the second stride size being smaller than the first stride size such that the first heatmap generated based on the first output has a higher resolution than the second heatmap.

2. The system of claim 1, further comprising:
determining a second output of the convolutional neural network operating on the image with the patch occluding a second portion of the image, the second output being determined by generating a second query on the one or more views, the second query performing, based at least on a second change associated with occluding the second portion of the image, a second partial re-computation of the one or more views; and
generating, based at least on the second output, the first heatmap to further indicate a second quantity to which the second portion of the image contributes to the output of the convolutional neural network operating on the image.

3. The system of claim 2, wherein the performing of the first query and the second query is batched.

4. The system of claim 1, wherein the first change corresponds to a size of the patch occluding the first portion of the image, a size of a filter kernel associated with the convolutional neural network, and a size of a stride associated with the filter kernel.

5. The system of claim 1, wherein the first partial re-computation is performed by at least propagating the first change through successive layers of the convolutional neural network.

6. The system of claim 5, further comprising:
limiting, to a threshold value, a quantity of elements in each layer of the convolutional neural network affected by the propagation of the first change, the limiting generating an approximation of an output at each layer of the convolutional neural network.

7. The system of claim 6, further comprising:
generating, based on one or more sample images, an approximate heatmap and an exact heatmap at a plurality of different threshold values; and determining, based at least on an index measuring a difference between the approximate heatmap and the exact heatmap, the threshold value.

8. The system of claim 1, wherein the threshold fraction is specified by one or more user inputs, and wherein the first stride size is determined based on a target speedup specified by the one or more user inputs.

9. The system of claim 1, wherein the first partial re-computation of the one or more views is limited to the first change associated with occluding the first portion of the image.

10. A computer-implemented method, comprising:
generating one or more views materializing one or more tensors generated by a convolutional neural network operating on an image;
determining a first output of the convolutional neural network operating on the image with a patch occluding a first portion of the image, the first output being determined by generating a first query on the one or more views, the first query performing, based at least on a first change associated with occluding the first portion of the image, a first partial re-computation of the one or more views;
generating, based at least on the first output, a first heatmap indicating a first quantity to which the first portion of the image contributes to an output of the convolutional neural network operating on the image;
generating, at a first stride size, a second heatmap;
identifying, based at least on the second heatmap, one or more regions of the image exhibiting a largest contribution to the output of the convolutional neural network operating on the image, a quantity of the one or more regions being proportional to a threshold fraction of the image; and
determining, at a second stride size, the first output, the second stride size being smaller than the first stride size such that the first heatmap generated based on the first output has a higher resolution than the second heatmap.

11. The method of claim 10, further comprising:
determining a second output of the convolutional neural network operating on the image with the patch occluding a second portion of the image, the second output being determined by generating a second query on the one or more views, the second query performing, based at least on a second change associated with occluding the second portion of the image, a second partial re-computation of the one or more views; and
generating, based at least on the second output, the first heatmap to further indicate a second quantity to which the second portion of the image contributes to the output of the convolutional neural network operating on the image.

12. The method of claim 11, wherein the performing of the first query and the second query is batched.

13. The method of claim 10, wherein the first change corresponds to a size of the patch occluding the first portion of the image, a size of a filter kernel associated with the convolutional neural network, and a size of a stride associated with the filter kernel.

14. The method of claim 10, wherein the first partial re-computation is performed by at least propagating the first change through successive layers of the convolutional neural network.

15. The method of claim 14, further comprising:
limiting, to a threshold value, a quantity of elements in each layer of the convolutional neural network affected by the propagation of the first change, the limiting generating an approximation of an output at each layer of the convolutional neural network.

16. The method of claim 15, further comprising:
generating, based on one or more sample images, an approximate heatmap and an exact heatmap at a plurality of different threshold values; and
determining, based at least on an index measuring a difference between the approximate heatmap and the exact heatmap, the threshold value.

17. The method of claim 10, wherein the first partial re-computation of the one or more views is limited to the first change associated with occluding the first portion of the image.

18. A non-transitory computer readable medium storing instructions, which when executed by at least one data processor, result in operations comprising:
generating one or more views materializing one or more tensors generated by a convolutional neural network operating on an image;
determining an output of the convolutional neural network operating on the image with a patch occluding a portion of the image, the output being determined by generating a query on the one or more views, the query performing, based at least on a change associated with occluding the portion of the image, a partial re-computation of the one or more views;
generating, based at least on the output, a heatmap indicating a quantity to which the portion of the image contributes to an output of the convolutional neural network operating on the image;
generating, at a first stride size, a second heatmap;
identifying, based at least on the second heatmap, one or more regions of the image exhibiting a largest contribution to the output of the convolutional neural network operating on the image, a quantity of the one or more regions being proportional to a threshold fraction of the image; and
determining, at a second stride size, the first output, the second stride size being smaller than the first stride size such that the first heatmap generated based on the first output has a higher resolution than the second heatmap.

* * * * *